US006112324A

United States Patent [19]

Howe et al.

[11] Patent Number: 6,112,324

[45] Date of Patent: Aug. 29, 2000

[54] DIRECT ACCESS COMPACT DISC, WRITING AND READING METHOD AND DEVICE FOR SAME

[75] Inventors: Dennis George Howe; Babak Tehranchi, both of Tucson, Ariz.

[73] Assignee: The Arizona Board of Regents acting on behalf of The University of Arizona, Tucson, Ariz.

[21] Appl. No.: 08/594,604

[22] Filed: Feb. 2, 1996

[51] Int. Cl.[7] .................................................... G11C 29/00

[52] U.S. Cl. .................... 714/763; 395/500.05; 714/752; 714/756; 714/758; 714/762; 714/766; 714/799; 711/4; 711/112; 707/205; 369/53; 369/54

[58] Field of Search ................................ 369/53, 32, 48, 369/54, 50, 124, 59; 707/205, 101; 711/4, 112; 714/763, 752, 756, 762, 758, 766, 799

[56] References Cited

U.S. PATENT DOCUMENTS

| | | | |
|---|---|---|---|
| 4,053,752 | 10/1977 | DeJohn et al. | 235/302.1 |
| 4,761,772 | 8/1988 | Murakami | 369/32 |
| 4,785,451 | 11/1988 | Sako et al. | 371/37 |
| 4,819,236 | 4/1989 | Sako et al. | 371/38 |
| 4,974,197 | 11/1990 | Blount et al. | 369/32 |
| 5,016,240 | 5/1991 | Strandjord et al. | 369/288 |
| 5,060,221 | 10/1991 | Sako et al. | 369/59 |
| 5,161,150 | 11/1992 | Namba et al. | 369/275.4 |
| 5,172,381 | 12/1992 | Karp et al. | 371/42 |
| 5,220,568 | 6/1993 | Howe et al. | 371/37.1 |
| 5,293,565 | 3/1994 | Jaquette et al. | 364/952 |
| 5,335,215 | 8/1994 | Yoshiyama | 369/50 |
| 5,343,452 | 8/1994 | Maeda et al. | 369/32 |
| 5,493,571 | 2/1996 | Engdahl et al. | 370/105.4 |
| 5,504,484 | 4/1996 | Wilson | 341/67 |
| 5,517,484 | 5/1996 | Takagi et al. | 369/275.3 |
| 5,535,414 | 7/1996 | Burge | 395/827 |
| 5,579,052 | 11/1996 | Artieri | 348/416 |

OTHER PUBLICATIONS

"PD and CD–E: Are Phase–Change/CD–ROM Combo Drives Threatening Another Format Ware?", *CD–ROM Professional,* Sep. 1995, p. 16.

1994 Topical Meeting on Optical Data Storage '94, May 16–18, 1994, Dana Point, California.

*Primary Examiner*—William Grant
*Assistant Examiner*—McDieunel Marc
*Attorney, Agent, or Firm*—Staas & Halsey LLP

[57] ABSTRACT

A system that redefines how data is distributed on a conventional writable compact disc (CD-R/E). A rearrangement of the data on the disc provided during the writing operation preserves eight-to-fourteen channel frames and the control and display (C&D) channel and burst error mitigation while providing a direct access storage device (DASD) format and capability. The CD-DASD format is suitable for preformatting the CDs and has constant size sectors recorded contiguously along the spiral track. Each sector is independently addressable and synchronous with the C&D data word and ATIP channel words on the CD-R disc. The system uses the components of a conventional CD device and a mapping controller address translator to encode and decode the data bytes using a conventional CIRC encoder/decoder. A rectangular product code of C1 and C2 CIRC subcodes is provided that is interleaved to mitigate the effects of handling. The system provides for locking in on the changing data frequency that occurs when moving between spirals of the CD allowing reading and writing to occur while the CD is coming to the proper speed.

48 Claims, 16 Drawing Sheets

Microfiche Appendix Included
(1 Microfiche, 20 Pages)

FIG. 12A

TO FIG. 12B →

| | | | | 00 20 40 | | | | 02 22 42 | | | | 04 24 44 | | | | 06 26 46 | | | | 08 28 48 | | | | 0A 2A 4A | | | | 0C 2C 4C | | | | 0E 2E 4E | | | |
|---|---|---|---|---|---|---|---|---|---|---|---|---|---|---|---|---|---|---|---|---|---|---|---|---|---|---|---|---|---|---|---|---|---|---|---|
| 00 | 40 | 80 | C0 | | | | | | | | | | | | | | | | | W | W | | | | | | | | | | | | | | |
| 02 | 42 | 82 | C2 | | | | | | | | | | | | | | | | | W | W | | | | | | | | | | | | | | |
| 04 | 44 | 84 | C4 | | | | | | | | | | | | | | | | | W | W | | | | | | | | | | | | | | |
| 06 | 46 | 86 | C6 | | | | | | | | | | | | | | | | | W | W | | | | | | | | | | | | | | |
| 08 | 48 | 88 | C8 | | | | | | | | | | | | | | | | | W | W | | | | | | | | | | | | | | |
| 0A | 4A | 8A | CA | | | | | | | | | | | | | | | | | W | W | | | | | | | | | | | | | | |
| 0C | 4C | 8C | CC | | | | | | | | | | | | | | | | | W | W | | | | | | | | | | | | | | |
| 0E | 4E | 8E | CE | | | | | | | | | | | | | | | | | W | W | | | | | | | | | | | | | | |
| 10 | 50 | 90 | D0 | | | | | | | | | | | | | | | | | W | W | | | | | | | | | | | | | | |
| 12 | 52 | 92 | D2 | | | | | | | | | | | | | | | | | W | W | | | | | | | | | | | | | | |
| 14 | 54 | 94 | D4 | | | | | | | | | | | | | | | | | W | W | | | | | | | | | | | | | | |
| 16 | 56 | 96 | D6 | | | | | | | | | | | | | | | | | W | W | | | | | | | | | | | | | | |
| 18 | 58 | 98 | D8 | | | | | | | | | | | | | | | | | W | W | | | | | | | | | | | | | | |
| 1A | 5A | 9A | DA | | | | | | | | | | | | | | | | | W | W | | | | | | | | | | | | | | |
| 1C | 5C | 9C | DC | | | | | | | | | | | | | | | | | W | W | | | | | | | | | | | | | | |
| 1E | 5E | 9E | DE | | | | | | | | | | | | | | | | | W | W | | | | | | | | | | | | | | |
| 20 | 60 | A0 | E0 | | | | | | | | | | | | | | | | | W | W | | | | | | | | | | | | | | |
| 22 | 62 | A2 | E2 | | | | | | | | | | | | | | | | | W | W | | | | | | | | | | | | | | |
| 24 | 64 | A4 | E4 | | | | | | | | | | | | | | | | | W | W | | | | | | | | | | | | | | |
| 26 | 66 | A6 | E6 | | | | | | | | | | | | | | | | | W | W | | | | | | | | | | | | | | |
| 28 | 68 | A8 | E8 | | | | | | | | | | | | | | | | | W | W | | | | | | | | | | | | | | |
| 2A | 6A | AA | EA | | | | | | | | | | | | | | | | | W | W | | | | | | | | | | | | | | |
| 2C | 6C | AC | EC | | | | | | | | | | | | | | | | | W | W | | | | | | | | | | | | | | |
| 2E | 6E | AE | EE | | | | | | | | | | | | | | | | | W | W | | | | | | | | | | | | | | |
| 30 | 70 | B0 | F0 | | | | | | | | | | | | | | | | W | W | | | | | | | | | | | | | | | |
| 32 | 72 | B2 | F2 | | | | | | | | | | | | | | | | W | W | | | | | | | | | | | | | | | |
| 34 | 74 | B4 | F4 | | | | | | | | | | | | | | | | W | W | | | | | | | | | | | | | | | |
| 36 | 76 | B6 | F6 | | | | | | | | | | | | | | | | W | W | | | | | | | | | | | | | | | |
| 38 | 78 | B8 | F8 | | | | | | | | | | | | | | | | W | W | | | | | | | | | | | | | | | |
| 3A | 7A | BA | FA | | | | | | | | | | | | | | | | W | W | | | | | | | | | | | | | | | |
| 3C | 7C | BC | FC | | | | | | | | | | | | | | | | W | W | | | | | | | | | | | | | | | |
| 3E | 7E | BE | FE | | | | | | | | | | | | | | | | W | W | | | | | | | | | | | | | | | |

TO FIG. 12B →

FIG. 15A

TO FIG. 15B

| | | | | 00<br>20<br>40 | | | | 02<br>22<br>42 | | | | 04<br>24<br>44 | | | | 06<br>26<br>46 | | | | 08<br>28<br>48 | | | | 0A<br>2A<br>4A | | | | 0C<br>2C<br>4C | | | | 0E<br>2E<br>4E | | | |
|---|---|---|---|---|---|---|---|---|---|---|---|---|---|---|---|---|---|---|---|---|---|---|---|---|---|---|---|---|---|---|---|---|---|---|---|
| 00 | 40 | 80 | C0 | | | | | | | | | | | | | | | | | W | W | | | | | | | | | | | | | | |
| 02 | 42 | 82 | C2 | | | | | | | | | | | | | | | | | W | W | | | | | | | | | | | | | | |
| 04 | 44 | 84 | C4 | | | | | | | | | | | | | | | | | W | W | | | | | | | | | | | | | | |
| 06 | 46 | 86 | C6 | | | | | | | | | | | | | | | | | W | W | | | | | | | | | | | | | | |
| 08 | 48 | 88 | C8 | | | | | | | | | | | | | | | | | W | W | | | | | | | | | | | | | | |
| 0A | 4A | 8A | CA | | | | | | | | | | | | | | | | | W | W | | | | | | | | | | | | | | |
| 0C | 4C | 8C | CC | | | | | | | | | | | | | | | | | W | W | | | | | | | | | | | | | | |
| 0E | 4E | 8E | CE | | | | | | | | | | | | | | | | | W | W | | | | | | | | | | | | | | |
| 10 | 50 | 90 | D0 | | | | | | | | | | | | | | | | | W | W | | | | | | | | | | | | | | |
| 12 | 52 | 92 | D2 | | | | | | | | | | | | | | | | | W | W | | | | | | | | | | | | | | |
| 14 | 54 | 94 | D4 | | | | | | | | | | | | | | | | | W | W | | | | | | | | | | | | | | |
| 16 | 56 | 96 | D6 | | | | | | | | | | | | | | | | | W | W | | | | | | | | | | | | | | |
| 18 | 58 | 98 | D8 | | | | | | | | | | | | | | | | | W | W | | | | | | | | | | | | | | |
| 1A | 5A | 9A | DA | | | | | | | | | | | | | | | | | W | W | | | | | | | | | | | | | | |
| 1C | 5C | 9C | DC | | | | | | | | | | | | | | | | | W | W | | | | | | | | | | | | | | |
| 1E | 5E | 9E | DE | | | | | | | | | | | | | | | | | W | W | | | | | | | | | | | | | | |
| 20 | 60 | A0 | E0 | | | | | | | | | | | | | | | | | W | W | | | | | | | | | | | | | | |
| 22 | 62 | A2 | E2 | | | | | | | | | | | | | | | | | W | W | | | | | | | | | | | | | | |
| 24 | 64 | A4 | E4 | | | | | | | | | | | | | | | | | W | W | | | | | | | | | | | | | | |
| 26 | 66 | A6 | E6 | | | | | | | | | | | | | | | | | W | W | | | | | | | | | | | | | | |
| 28 | 68 | A8 | E8 | | | | | | | | | | | | | | | | | W | W | | | | | | | | | | | | | | |
| 2A | 6A | AA | EA | | | | | | | | | | | | | | | | | W | W | | | | | | | | | | | | | | |
| 2C | 6C | AC | EC | | | | | | | | | | | | | | | | | W | W | | | | | | | | | | | | | | |
| 2E | 6E | AE | EE | | | | | | | | | | | | | | | | | W | W | | | | | | | | | | | | | | |
| 30 | 70 | B0 | F0 | | | | | | | | | | | | | | | | W | W | | | | | | | | | | | | | | | |
| 32 | 72 | B2 | F2 | | | | | | | | | | | | | | | | W | W | | | | | | | | | | | | | | | |
| 34 | 74 | B4 | F4 | | | | | | | | | | | | | | | | W | W | | | | | | | | | | | | | | | |
| 36 | 76 | B6 | F6 | | | | | | | | | | | | | | | | W | W | | | | | | | | | | | | | | | |
| 38 | 78 | B8 | F8 | | | | | | | | | | | | | | | | W | W | | | | | | | | | | | | | | | |
| 3A | 7A | BA | FA | | | | | | | | | | | | | | | | W | W | | | | | | | | | | | | | | | |
| 3C | 7C | BC | FC | | | | | | | | | | | | | | | | W | W | | | | | | | | | | | | | | | |
| 3E | 7E | BE | FE | | | | | | | | | | | | | | | | W | W | | | | | | | | | | | | | | | |

TO FIG. 15B

DIRECT ACCESS COMPACT DISC, WRITING AND READING METHOD AND DEVICE FOR SAME

MICROFICHE APPENDIX 1 sheet of microfiche containing a total of 20 frames is included herein.

BACKGROUND OF THE INVENTION

1. Field of the Invention

The present invention is directed to a compact disc (CD) system of the optical or optomagnetic type capable of reading discs recorded in the standard CD-Audio and CD-Read Only Memory (CD-ROM) formats, reading and writing discs in the CD-recordable (CD-R) format and/or the newly proposed CD-erasable (CD-E) format, as well as reading/writing in a direct access storage device (DASD) format, and, more particularly, to a system that uses the typical components of a CD-Audio/ROM system and low cost additional components to write/read data on a disc in both the CD-Audio/ROM and CD-DASD formats.

2. Description of the Related Art

The Compact Disc™ (CD) optical data storage system was originally designed as a consumer product that would read (playback) digitized audio information in a sequential fashion, much like a tape, from unprotected plastic discs that would be extensively handled. Accordingly, the recording format (i.e., the precise manner in which the data stored on the disc is mapped to the trail of physical marks written on the disc's surface) of this system is optimized for the continuous retrieval of data from the disc and also to mitigate the affects of relatively large defects (such as scratches and fingerprints) on the reliability of the data recovered from the disc. The CD-Audio recording format therefore handles (during reads & writes) input and output data (i.e., user digital audio data) in small, contiguous 24-byte blocks called "frames" and further causes the data that comprises a single frame to be widely distributed on the surface of the disc when it is recorded. Moreover, there is no provision in the recording format for the precise addressing of an individual frame (i.e., allowing the CD playback device to determine the exact physical location of any of the constituent bytes in a frame on the disc). In fact, the only means of locating information on the disc is via the information carried by a separate control & display (C&D) channel that is multiplexed with the main (digital audio) data channel.

The specific item of information carried by the C&D channel that provides the vehicle for locating information on the disc is the "absolute-time-on-disc" which is the elapsed disc playing time relative to the beginning of the recorded disc information area. Absolute time information is updated with a granularity of 1/75th of a second. Since exactly ninety-eight 24-byte frames of audio data are played each 1/75th second, the C&D channel can be used to "segment" the contiguous audio data stream channel on the disc into data blocks that contain 98×24=2352 bytes. A main (audio) data channel block that consists of 98 contiguous frames, or 2352 bytes of digital audio data, is called a "C&D Section". However, a given 2352-byte C&D Section cannot be precisely located on a disc; this is due to the fact that the CD-Audio disc recording standards provide for a tolerance of ±1 second between the start of the C&D channel's absolute-time-on-disc information and the start of audio program data on the disc. (Note: The absolute time value is specified to be 0 minutes, 0 seconds and 0 seventy-fifth seconds at the start of the first data (audio) track of the disc, which immediately follows the disc's lead-in track. The lead in track is the first track in the disc's information area: absolute time increases from some negative value during the lead-in track such that it becomes zero exactly at the end of the lead-in track)

In 1984, or thereabouts, a new version of the CD system known as Compact Disc Read-Only-Memory (CD-ROM) was introduced. CD-ROM was designed as a playback-only computer peripheral and CD-ROM drives connected to a computer could be used to retrieve files of data from a prerecorded disc in response to commands from a requesting application program. To control the cost of the CD-ROM drives and to provide them with the capability to "play" CD-Audio discs, the recording format of the CD-Audio system was fully retained in the CD-ROM system. This enables CD-ROM discs, which each may hold over 600 Mbytes of data, to be produced on the same manufacturing line as CD-Audio discs and allows CD-ROM drives to share components with CD-Audio players. The CD-ROM system has proven to be a commercially successful, low cost means of distributing very large data sets and application programs to computer users.

Computer operating systems (i.e., the programs that, among other things, manage the storage and retrieval of data needed by application programs that are running on a computer) are designed to move data between the central processing unit (CPU) and the computer's storage peripherals in units, or blocks, called "data clusters". Clusters always contain $2^n$ bytes, where n is an integer (usually $n \geqq 10$). Computer peripherals, such as hard disk drives, therefore, are designed to handle data in blocks called sectors that each contain $2^m$ bytes of arbitrary-valued data that could be assigned to a specific cluster that belongs to some user data file (usually m is an integer $\geqq 8$). Because of the way that information on a compact disc is segmented by the timing information in the C&D channel, the CD-ROM system employs sectors that contain 2352 bytes and, in the most widely used embodiment of CD-ROM, each sector holds 2048 "user bytes", or arbitrarily valued bytes that could belong to a user data file.

The 2352 byte CD-ROM sectors are logically defined by exactly mapping them. i.e., assigning their contents to, 98 contiguous 24-byte frames. However, as was mentioned previously, the data in each of these frames is widely distributed along the disc's spiral data track. In fact, data stored on the disc data track is organized as contiguous 33-byte blocks called "eight-to-fourteen modulation (EFM) frames." Each EFM-frame contains one byte of (multiplexed) C&D channel information, eight bytes of error correction code (ECC) parity data and 24-bytes of user data. Each byte of user data in a given EFM-frame is obtained from twenty-four different 24-byte data frames that are distributed over 106 contiguous data frames. Thus, the 24 bytes of a given data frame are distributed over 106 consecutively recorded EFM-frames on the disc. But, in order to recover the 24 bytes of a single data frame from the disc, 111 consecutive EFM-frames have to be retrieved (the additional 5 EFM-frames contain all the ECC parity data needed to complete, and thereby render decodable, the ECC codewords that protect the specific 24-byte data frame).

Recall that the C&D channel's absolute-time-on-disc information segments the main data channel on the disc into 2352-byte C&D Sections (this is true for CD-ROM discs as well as CD-Audio discs because their low-level recording formats are exactly the same). Unfortunately, this segmentation cannot be used to precisely define where (on a CD-ROM disc) the boundaries, or start, of a given sector resides. This is due to the fact that the control & display (C&D) and main data channels are not aligned (as noted previously). Thus, since a sector may start in (that is, the first byte of the recorded sector may occur in) any arbitrary 33-byte EFM-frame on the disc, the "offset" between the boundaries of CD-ROM sectors and the C&D Sections on the disc will be <±98 EFM-frames (or equivalently, <±1/75 second since EFM-frames are synchronous with data-frames; one EFM-frame is formed for each data frame that is input to the CD-Audio/ROM encoder). To facilitate locating information on a CD-ROM disc each sector contains "address" data, which is used by the CD-ROM drive's controller to identify specific sectors (the computer operating system also uses a translation of this address data, together with the disc directory and file allocation tables, to identify how the user data in the sectors relates to the files on the disc). Thus, to retrieve a specific sector from a disc the CD-ROM drive must first read approximately 300 sequential 33-byte EFM-frames from the disc and then deliver the data contained in them to the drive's controller which "finds" the 98 sequential 24-byte data frames that comprise the sector and extracts the desired user data. Even if the offset between sectors and C&D Sections is zero, more than 200 contiguous EFM-frames still must be read to retrieve a single sector. This is because entire or complete error correction codewords must be recovered before decoding of the ECC words can be accomplished; the data needed to complete all of the error correction codewords that protect data that resides in the sector of interest is distributed over 208 contiguous EFM-frames. The underlying CD-Audio recording format specifies this wide scattering of the data that comprise individual codewords to enable the correction of long data error bursts that may be caused by large defects on the disc caused by handling.

In 1990, the Compact Disc-Recordable (CD-R) system was introduced. A CD-R "writer" can write digital audio data or logical CD-ROM sectored data to recordable discs that can subsequently be read in any CD-Audio player or CD-ROM drive (and in the CD-R writer as well). CD-R writers can write entire discs at once, or they can write a portion of a disc called a "session". In addition, the CD-R standards provide for the writing of small segments of data, e.g., a single CD-ROM sector, in one writing operation; this is called "packet writing". When appending any new information to a disc (i.e., when performing session or packet writing), however, a CD-R writer must always add the new information directly to the end of the already written portion of the spiral data track on the disc. Moreover, in packet writing, at least four "link sectors" (and usually seven to eight sectors, in practice) that contain useless (padding) data must be appended to the sectors of user data that one wants to record. These recording characteristics (i.e., sequential appending to the previously written portion of the data track and link sector overhead) result directly from the nature of the CD-ROM recording format and the underlying CD-Audio recording format.

High performance computer data storage peripherals, otherwise known as Direct Access Storage Devices (DASDs.), have recording formats that enable them to operate in a manner that is consistent with the way computer operating systems handle files. In particular, the recording formats used by DASDs cause all bytes that comprise a specific sector to be contiguously recorded along a continuous segment of the data track on the storage medium and further cause sectors to synchronously occur along the data track so that DASDs know the exact physical location of every sector recorded on their storage medium. Moreover, a DASD storage medium is subdivided into sectors prior to writing file data to it (this is done via a process known as "formatting"). Thus, a DASD can write, or read, a single sector as an independent unit and it can locate a sector anywhere on its storage medium, regardless of how much of, or what portion of, the medium is already written. These operational features allow fast file access (e.g., only a single sector might have to be rewritten if only a small part of a file is to be updated) and they are critical to overall data reliability (sectors that begin to experience data recovery errors, as reported by the DASD error correction subsystem, are retired and their contents rewritten to a new location on a portion of the storage medium that is known to be error-free).

The use of CD-writers to produce small numbers of discs that can be distributed to business and/or consumer computer users (who have a CD-ROM drive installed in their computers) is an important emerging application. However, the incorporation of CD-writers into personal computers and work stations is being impeded by the fact that they cannot perform DASD-like operations, i.e., the limited usefulness of a CD-writer makes it a very expensive peripheral from the perspective of a general user. One attempt at solving this problem is the Power Disc (PD) optical disc system recently introduced by Panasonic, which can read any compact disc (i.e., a disc that conforms to the standards for CD Audio/ROM discs) and which, in addition, will operate as a DASD. When operating as a DASD, the PD drive uses a proprietary recording format. Two drawbacks of the PD system is that it cannot use standard recordable CD discs when operating in the DASD mode and it cannot write compact discs that can be read on standard CD-Audio or CD-ROM players. The PD drive uses a proprietary disc and recording format when operating in DASD mode, i.e., it cannot write at all using a standard CD-R disc, nor can it write using the soon-to-be available CD-erasable, or CD-E disc.

An important problem to be solved, therefore, is to provide a CD-device that can write/read information in all standard CD recording formats and which has the additional capability of operating as a direct access storage device (DASD), and to do this using common CD components (i.e., conventional CD hardware and discs).

SUMMARY OF THE INVENTION

It is an object of the present invention to provide a compact disc (CD) with direct access storage device (DASD) capability (i.e., a CD that has information recorded using a CD-DASD recording format) and to provide the system for reading and writing such a CD.

It is another object of the present invention to provide a system compatible with prior CD standard formats.

It is also an object of the present invention to provide a system that uses existing standard CD-audio/CD-ROM components and a small number of additional low cost components in providing the CD-DASD capability.

It is a further object of the present invention to use the basic Reed Solomon (RS) error correction codes of the CD-Audio format in a DASD format.

It is also an object of the present invention to utilize the eight-to-fourteen (EFM) modulation scheme and the 588-channel bit frames utilized in the CD-Audio format in the CD-DASD format (that is, the low-level physical manifestation of the CD-Audio format is not altered).

It is another object of the present invention to accommodate variance in switching times between modes among different CD-DASD drives.

It is an additional object of the present invention to provide a system that improves the access time to recorded data by allowing reading or writing while the disc is changing speed.

It is an object of the present invention to preserve the Control and Display Subcode channel in CD-DASD format.

It is another object of the present invention to provide a means of decoding the RS error correction codes that will provide high recovered data reliability and enable fast access to certain recorded information fields (such as sector ID fields).

The above objects can be accomplished by a system that redefines how logical data is distributed on the compact disc (CD). The redistribution produces a DASD-like format that features a writable (or re-writable) CD that is formatted. The system uses the components of a conventional CD reader/writer (including conventional writable/re-writable CD discs) and a mapping or translation controller to alter the data byte interleaving employed in the conventional Cross Interleaved Reed Solomon Code (CIRC) coding used in the CD-Audio format. A rectangular product code is formed using the C1 and C2 CIRC subcodes. This product code can be interleaved to mitigate the effects of user handling of the disc. The system also provides synchronous voltage-frequency oscillator (VFO) fields for locking a write/read channel clock to the changing data frequency that may occur when radial disc seeks are performed. This feature will assist data reading and writing while the CD is acquiring proper rotational speed (assuming a constant linear velocity system).

These, together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is directed to methods and apparatus for using a CD-writer/reader as a direct access storage device (DASD) within the confines and context of the physical (recorded marks and lands) and logical (eight-to-fourteen modulation, CIRC error correction coding, multiplexed data/control and display channels, 588-channel bit EFM frames, etc.) data recording format that is used in all currently defined CD systems (e.g., CD-Audio, CD-ROM, CD-i, CD-R). The present invention defines a recording format that (i) enables full support of DASD operation and (ii) which is realized by redefining how the logical 33-byte EFM-frames (i.e., the frames that are created by the CIRC block encoding process that is defined in the CD-Audio recording format) are distributed on the disc. The invention redefines which physical marks on the disc will represent each of the data in these logical 33-byte EFM-frames. For convenience, this recording format is referred to as the CD-DASD recording format, or simply the CD-DASD format. The present invention allows reading of a CD containing CD-DASD formatted information via a CD-ROM player that has had only minor modifications made to. The present invention also allows recording of information using the CD-DASD format on conventional writable-CD discs (CD-R or CD-E discs) that are formatted prior to their use. During the formatting operation sector headers are written globally over the entire disc (or over an annular portion that is allocated to CD-DASD use). Formatting a disc is accomplished using a CD-DASD-writer; this writer writes headers in alignment with the "absolute-time-in-pregroove" (ATIP) information channel that is extant on standard CD-R discs. Alternatively, the sector headers could be embossed (or otherwise formed) on the disc during its manufacture. The physical marks on the disc that constitute the sector headers are formed using channel data sequences that maintain the 2,10 run-length constraints that characterize the physical marks of the low level CD recording format. The present invention organizes the data into the CD-DASD format and incluaes remapping of the 33-byte EFM-frames to physical marks on the disc, reorganization of the C1 and C2 subcodes that comprise the CIRC code into a rectangular product code that can be interleaved to depth seven or less, specification of a 4,704-byte CD-DASD sector and the identification of the various data fields contained in the CD-DASD sector.

Figure 1:
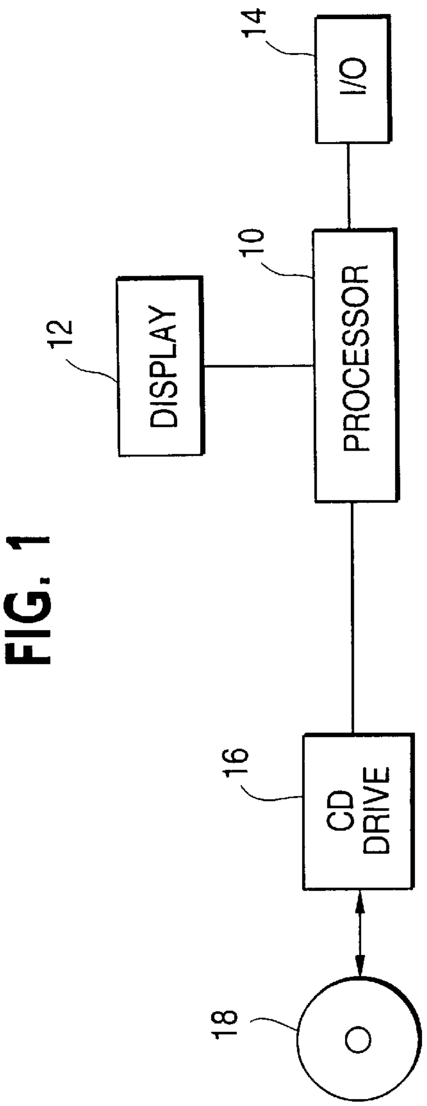
FIG. 1 depicts a typical system in which the present invention is used.

The present invention is applicable to the typical computer system, as illustrated in FIG. 1, that includes a processor 10 having the appropriate disk and RAM storage, a display 12 and an input/output device 14, such as a keyboard, although all of these components may not be necessary in a particular application. In such typical systems one of the important mass storage components is a compact disc (CD) drive 16 that is capable of reading (CD-ROM) and/or writing (CD-E, CD-R) data on an optical or opto-magnetic compact disc 18. The present invention is involved in the operation of the disc drive 16.

Current compact disc systems, such as the conventional CD-Audio or CD-ROM systems, use a Cross Interleaved Reed-Solomon Code (CIRC) to encode the user data bytes. This error-correcting code employs two distance 5, Reed-Solomon codes: C1(n1, k1) and C2(n2, k2) with n1=32, k1=28, n2=28, k2=24 bytes. The encoding process creates 33-byte Eight-to-Fourteen Modulation (EFM) frames which each have the format of:

$F_0,D_1,D_2,D_9,D_{10},D_{17},D_{18},D_3,D_4,D_{11},D_{12},C2_0,C2_1,C2_2,C2_3,D_5,D_6, D_{13},D_{14},D_{21},D_{22},D_7,D_8,D_{15},D_{16},D_{23},D_{24},C1_0,C1_1,C1_2,C1$ (where F is a Control and Display byte, D are user data bytes, C2 are C2 code parity bytes and C1 are C1 code parity bytes. The conventional encoding and recording process performs the following steps (cf., FIG. 2):

step 1: User information (i.e., input data to be recorded) is first parsed into 24-byte blocks or user-data frames.

step 2: The 24-byte user data frames are scrambled and then 24 bytes (comprised of a first group of twelve contiguous bytes and a second group of twelve additional contiguous bytes that occur 48 bytes later in the sequential stream of scrambled data) are C2-encoded, that is, 4 parity bytes are calculated and provided to each block of 24 scrambled and delayed bytes to form a 28-byte C2 codeword 30.

step 3: The individual bytes of every C2 codeword are delayed for a variable number of words. These variable length delay lines provide the "cross-interleave" feature of the encoding.

step 4: Next, 28-byte groups (one byte from each of 28 different C2 words) are sent to a C1 encoder which generates 4 additional parity bytes and appends them to the 28-byte groups. The result is 32-byte C1 codewords 32 at the output of the C1 encoder.

step 5: The odd bytes of every C1 codeword are delayed for one C1 codeword to produce an additional interleave of depth 2. Next, one byte 34 of Control and Display (C&D) information is added to every 32-byte group appearing at the output of the depth-two interleaver to form the 33-byte EFM (Eight-to-Fourteen modulation) frames.

step 6: Channel data of the Compact Disc must obey the (2,10) Run-Length constraints, that is, there must be at least 2 and at most 10 zeroes between two consecutive 1's in the stream of channel data bits. EFM modulation coding accomplishes this by converting each of the EFM frame bytes into 14 channel bits that conform to the (2,10) RLL constraints. In addition, 3 link bits are added between pairs of such 14-bit words before they are merged. These link bits are necessary to ensure that the run-length conditions continue to be satisfied and to keep the DC content of the NRZ pulse read/write waveform, formed from the channel data stream, as low as possible.

step 7: Finally, 27 synchronization bits are added to the beginning of each EFM-encoded EFM-frame before the channel bit stream is recorded on the disc sequentially, frame by frame, as shown in the dataflow 36. This modulation scheme converts every 33-byte EFM-frame into 588 channel bits: [(33 bytes/EFM frame×17 channel bits/byte)+27 Sync. bits]=588 channel bits/EFM frame step 8: The 588 channel bit representations of the EFM-frames are sequentially recorded on the disc. This is accomplished by using the nonreturn to zero (NRZ) pulse waveform that corresponds to the channel data stream to turn the writing laser on/off, thereby causing the sequence of marks/spaces. (or pits/lands) which comprise the disc data track to be formed.

Figure 2:
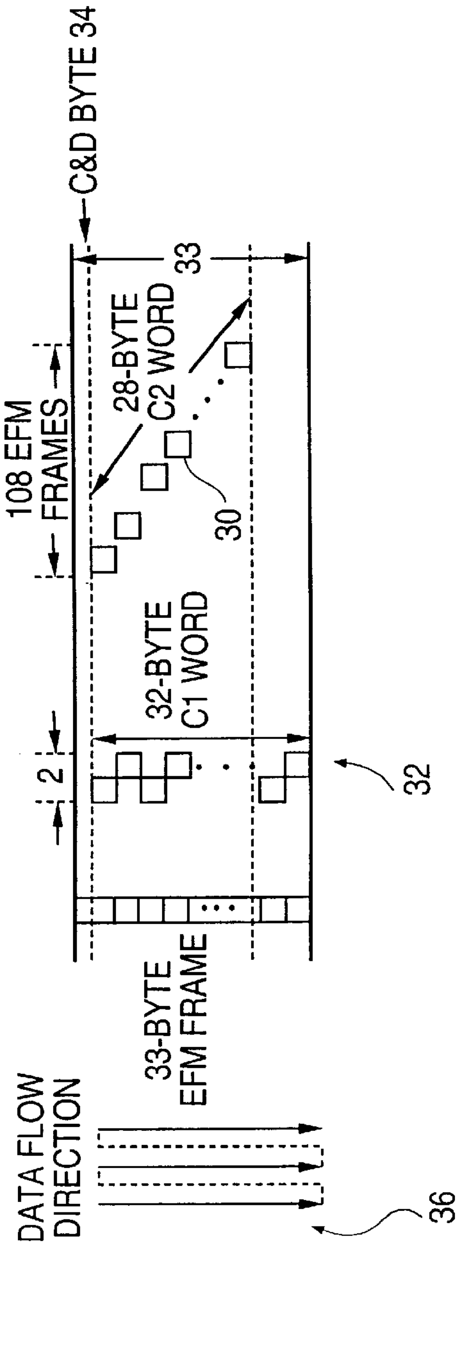
FIG. 2 illustrate conventional CIRC coding and interleaving.

The CIRC encoding process is shown in FIG. 2. In this encoding scheme, contiguous user data frames are not organized into groups of bytes that are stored together on the disc. In fact, the 24 bytes of a specific single user data frame are distributed over 106 sequential EFM-frames. Moreover, the CD-ROM uses 2352 byte sectors that consist of 98 contiguous 24-byte user data frames; CIRC encoding of 98 contiguous 24-byte user data frames causes these to be dispersed over 208 consecutive EFM-frames. In addition, individual C1 and C2 codewords can be comprised of data that belong to different CD-ROM sectors.

To recover a single 24-byte user data frame from the data stored on a conventional CD in the format shown in FIG. 2, a) 111 contiguous EFM frames must be read from the disc, b) the C1 words contained in the EFM frames must be decoded to obtain three consecutive C2 codewords, and c) two of these C2 codewords must be decoded to recover the 24-byte user data frame of interest. Once the first user data frame has been recovered, subsequent user frames may be obtained by reading additional EFM-frames one at a time; the recovery of every additional EFM-frame enables the recovery of one more C1 word, one more C2 word and one more user data frame. Thus, at least 111×33=3663 bytes of data, mostly unrelated to the user data frame of interest, must be read from the disc before the first 24-byte user data frame can be recovered. It should also be noted that if the user frame contains the initial 24 bytes of the recorded information, an additional 100–200 EFM frames of pad data (usually all zeroes) must be recorded immediately prior to the first EFM frame to "prime" the C1 and C2 decoders. This pad data is necessary to produce complete codewords at the input of the decoders when the disc is being read.

Figure 3:
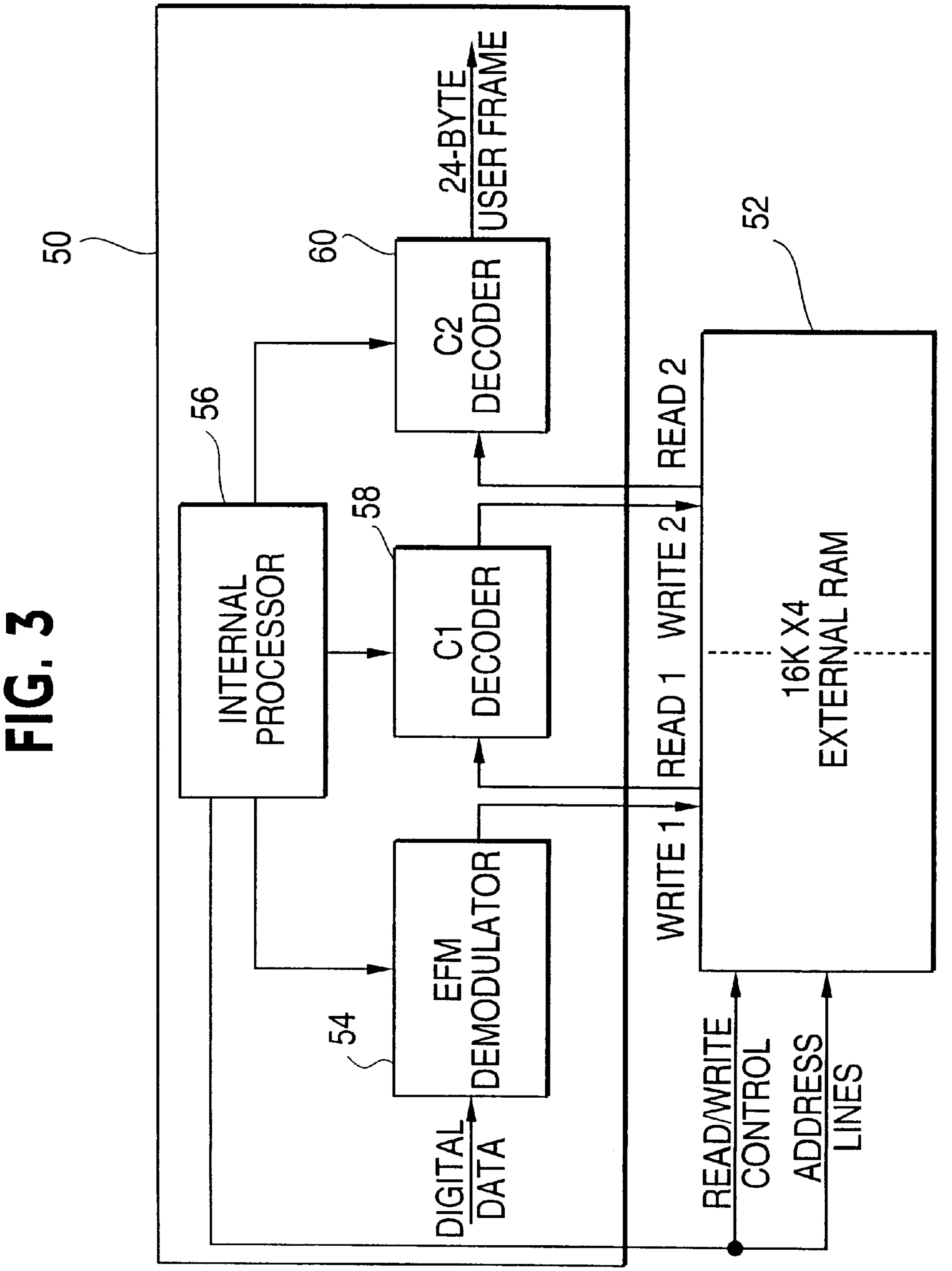
FIG. 3 illustrates a conventional CIRC decoder.

A conventional decoder 50, such as the Signetics SAA7310 Decoder, along with a conventional RAM 52, as illustrated in FIG. 3, is used to perform the CIRC (CD-Audio) decoding (i.e., invert the encoding process described above). The input to the EFM demodulator 54 consists of (2,10)-constrained RLL digital data in the form of 14-bit symbols grouped together as 33-symbol frames as previously described. (The 27 channel synchronization bits and thirty-three groups of 3 link bits contained in each 588-channel bit representation of an EFM-frame have been removed by an earlier processing step). These frames contain 32 information (user data) and parity symbols plus one Control and Display (C&D) symbol. After eight-to-fourteen (EFM) demodulation is performed, the subcode processors (not shown) strip off the C&D byte 34 to extract the C&D section timing/address information. The remaining 32 bytes of the frame plus erasure flag information are written to the RAM 52 during the "Write 1" cycle. The EFM-demodulator flags each output byte that occurs in correspondence with a 14-channel bit word that contains a (2,10) RLL-constraint violation; such flagged bytes are treated as being erroneous (i.e., they are erased) by the C1 decoder. The internal processor 56 of the decoder 50 provides the address locations as well as Read/Write timing control for the data written to the RAM 52. The C1 codewords are formed and fed into the C1 decoder 58 during the "Read 1" cycle. The internal processor 56 provides the address values for individual bytes that are retrieved from the RAM 52 during the "Read 1" process. These addresses are different from those that were accessed during the "Write 1" cycle and effectively, by writing the EFM frame bytes into one set of RAM locations and reading the C1 frame bytes in a different order, i.e.; from different locations, the required depth of 2 C1-word de-interleaving is accomplished. The C1 decoder 58 performs error correction/detection on the incoming 32-byte frames (C1 codewords) and discards 4 parity bytes before writing the remaining 28 bytes and new flag information to the external RAM during the "Write 2" cycle. The "new" flags are assigned by the C1-decoder to each byte at its output; the flags indicate the reliability of the decoding operation that the C1-decoder performed when the specific bytes were processed by it. This new flag information is subsequently utilized by the C2 decoder. The C2 codewords are then input to the C2 decoder 60 by reading 28 bytes from the external RAM during the "Read 2" cycle. The address values generated during the "Write 2" and "Read 2" cycles provide the cross de-interleaving that is necessary for extracting the C2 codewords.

There are two features of interest associated with the above decoding/de-interleaving architecture which are relevant to the present invention:

a) C1 and C2 codeword bytes are written into an external RAM and the data values as well as locations (addresses) of the read/written bytes within the RAM can be monitored. Thus, it is possible to intercept and modify the address values as they appear across the RAM bus.

b) The external RAM is logically divided into two parts. One half of the RAM is exclusively used for C1 de-interleaving and the other half is dedicated to C2 de-interleaving. This makes it possible to modify the addressing scheme in one half of the RAM without affecting the performance of the other half.

One aim of the present invention is to adapt the above de-interleaving architecture to provide the proper block retrieval of the data recorded in the CD-DASD format described below.

The present invention, as previously mentioned, provides a CD recording format that organizes related user data frames into groups (sectors) and stores them sequentially and contiguously on the disc 18, exactly as in a DASD recording format. This format is realized by restructuring the CIRC coding scheme (i.e., by changing its interleaving and scrambling scheme) such that the C1 and C2 codewords form a distance 25, rectangular product code. One such product codeword 68 is shown schematically in FIG. 4. In this figure, C1 codewords 70 are shown in columns and C2 words 72 occupy the rows. The product codeword shown in FIG. 4 belongs to a 28×28 product code type such that the twenty-eight columns are comprised of twenty-eight individual 32-byte C1 codewords while the upper twenty-eight rows are comprised of twenty-eight 28-byte C2 codewords. We note that the bottom four rows, which contain only the parity check bytes of the twenty-eight C1 codewords are not encoded as C2-words in FIG. 4. Thus, only the upper 28 rows of FIG. 4 contain actual C2-parity bytes.

The CD-DASD format of the present invention enables data to be written/read in blocks of fixed size and encoded/decoded accordingly. Much like the current magnetic disk recording formats, each block (sector) can have a prerecorded sector header and defect management techniques such as, sector retirement/relocation, can be used to enhance the reliability and prolong the life of the storage media. The present invention essentially uses the same circuitry to write/read either the CD-DASD or conventional CIRC-CD recording formats on a given disc 18. It is also possible to make the format session-specific when a multi-session disc is being used. That is, part of the disc 18 can be written in one format and a different part in a different format. Since the same C1 and C2 distance 5, Reed-Solomon codes are used in both the CD-Audio/ROM and the CD-DASD recording formats, at least some decoders (chipsets) that exist in current CD drives, (cf., the previous discussion), can be modified via external logic to accomplish the decoding of data recorded in the CD-DASD format.

It is the intention of the present invention to take advantage of the standard read/write equipment that is implemented in the current CD drive systems. This means the format of the physical information written on the disc 18 will remain the same. More specifically, the same 33-byte structure of the EFM frames is implemented in the new block encoding format and each EFM frame is represented by 588 channel bits. The present invention does all that is necessary to realize a product error correction code (ECC) based, DASD recording format via logical remapping of (repositioning) the 33-bytes that comprise each of the EFM frames during writing and reading of the disc. At a higher logical level, the content of some of the user data which occur in one or more of the 24-byte input data frames will also be defined. For example, some of these data bytes may carry synchronization or sector address information.

Figure 4:
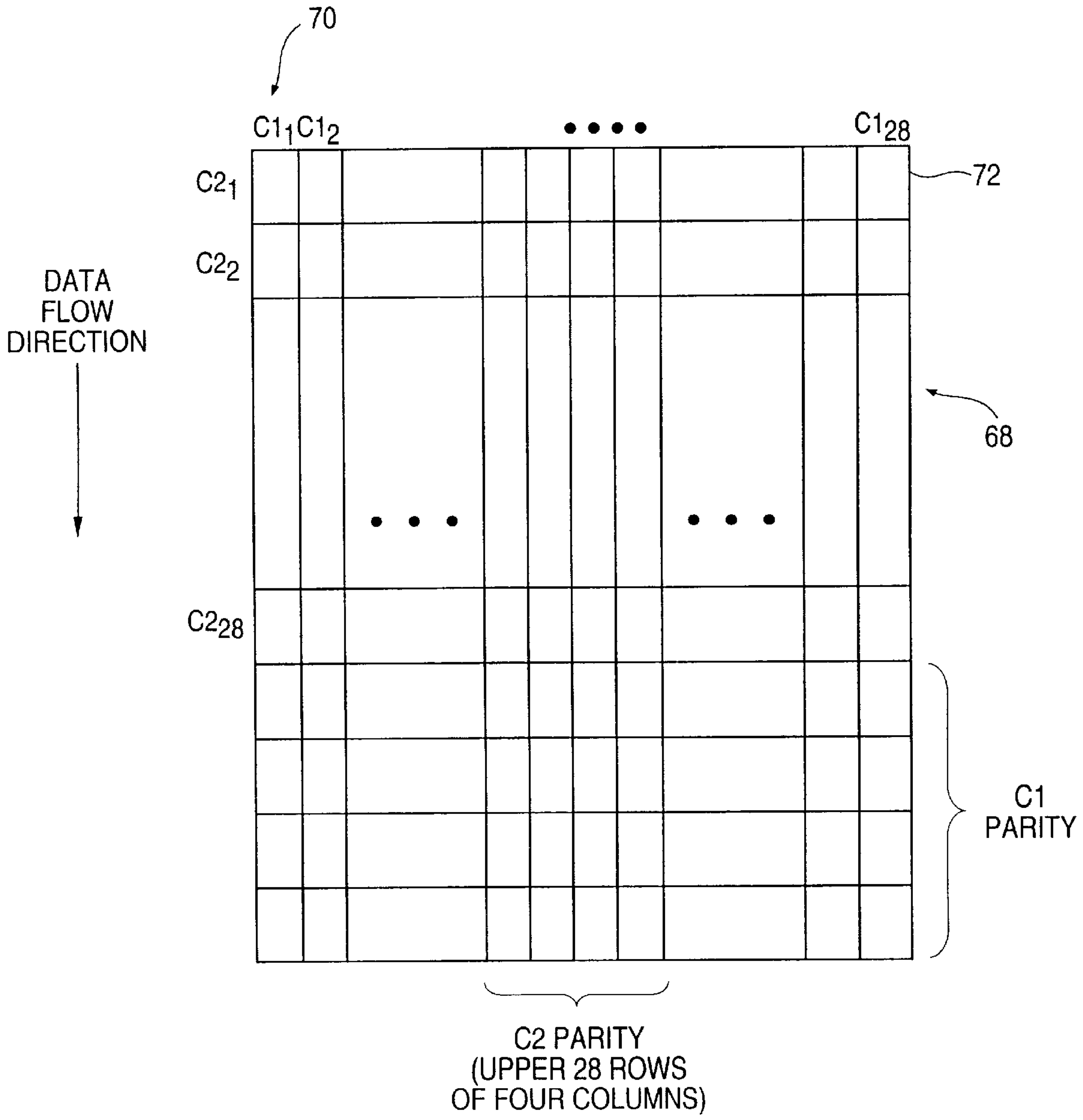
FIG. 4 illustrates a product code according to the present invention.

The implementation of the DASD recording format at the logical level(s) makes it possible to use the current writable CDs for DASD recording. In a conventional disc (which uses the ATIP time code for addressing), the minimum addressable length along a data track is 98 EFM frames (or, 98×588=57,624 channel bits). Each C1/C2 product codeword, as depicted in FIG. 4, occupies an equivalent of 28 EFM frames. Thus, 98/28=3.5 product codewords can be placed in a 98-EFM frame track segment of the disc 18 track and 7 product codewords can occupy exactly two contiguous 98-EFM frame track segments. It is, therefore, possible to use 7 C1/C2 product codewords to define the preferred read/write sector size. Such a sector contains 2×98=196 EFM frames that carry all sector synch, address, CRC, etc., fields, as well as user data. This information is logically mapped into 24×196=4,704 data bytes. If, in compliance with the logical sector layout of the CD-ROM Mode 01 recording format, 2×2048=4096 user data bytes are placed in such a sector (equivalent user data content of two logical Mode 01 CD sectors), 608 "extra" bytes will be available to carry the synch, address, etc., fields. In addition, a third level of ECC can be implemented and the parity bytes for such a code can also be incorporated in the remaining "extra" bytes. As an example, if the 4096 user data bytes are encoded as 32 interleaves of a (144,128) distance 17 Reed-Solomon code on GF(256), there will be [(144−128)×32]=512 parity bytes generated for the resulting 32 codewords. This leaves 608−512=96 of the "extra" bytes for sector synch, address, etc. The implementation of such a third level ECC could provide the ultimate reliability for the data retrieved from the disc 18. Note: Only a few, if any, of the 608 "extra" bytes will be needed to implement sector resynch fields since resynch is already provided by the 27-channel bit synchronization fields that start each 588-channel bit EFM frame written on the disc.

Overhead is not increased by switching from the conventional CIRC recording format to the CD-DASD format. This can be shown by calculating the user-to-gross total byte utilization ratio's for the two formats:

$$\frac{2048 \text{ user bytes per sector}}{98 \times 33 \text{ total bytes per sector}} = 0.6333 \quad \begin{matrix}\text{CD-ROM, mode 01}\\ \text{recording format}\\ \text{(conventional } CIRC\text{),}\end{matrix}$$

$$\frac{2 \times 2048 \text{ user bytes per sector}}{2 \times 98 \times 33 \text{ total bytes per sector}} = 0.6333 \quad \begin{matrix}DASD\text{-like Block}\\ \text{format}\end{matrix}$$

Selection of the Block format sector layout in the above manner, dictates the above utilization ratio's to be always equal. The fact that the invention places 7 C1/C2 product codewords in one such sector, makes it possible to implement product code interleave depths of up to 7 product codewords.

The features of the CD-DASD recording format of the present invention are summarized below:

Physical recording format (marks written to the disc 18) is unchanged—588 channel bit structure used to represent each EFM frame.

Disc addressing structure (C&D channel and 98-frame C&D Blocks) is preserved—conventional means such as the “absolute time on disc” information contained in the control and display subcode q-channel may be used to physically locate sectors.

The entire contents of a sector are contiguously recorded on the disc track—DASD-like read/write, etc., operations are enabled.

Overhead is identical to that of CD-ROM.

Use of multiple decoding of C1/C2 subcodes and powerful third level RS ECC may provide increased data reliability compared to CD-ROM.

Conventional CD-R discs and write/read electronics (and perhaps unmodified CIRC decoding chips) can be used—modified CIRC decoders are necessary if multiple pass decoding is required.

The ATIP signals located on conventional writable CDs may be used to “format” (i.e., write sector headers onto) CD-DASD discs. Random writing of sectors is enabled if “formatted” CD-DASD discs are used.

Figure 5:
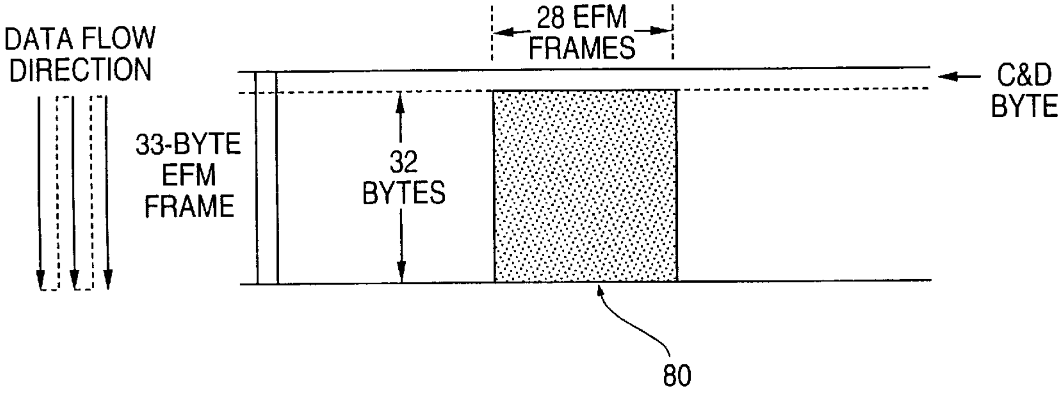
FIG. 5 illustrates the format of the present invention without interleaving.
Figure 6:
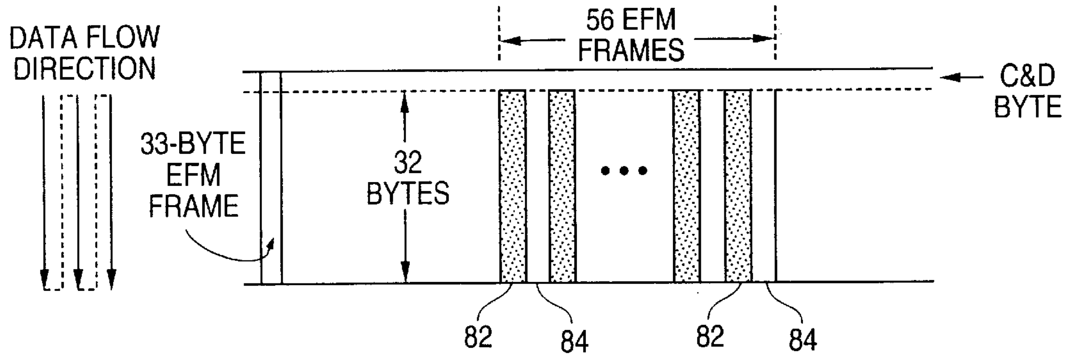
FIG. 6 illustrates one form of interleaving according to the present invention.

FIG. 4, previously discussed, shows a product code 68 with distance 5×5=25 which contains 32×28=896 bytes (24×28=672 user bytes). In this figure, no interleaving has been indicated for the C1 words. In the case where various depths of interleave are utilized, the data block of interest would contain n×896 bytes where n=2, 3, 4, . . . is the possible depths of interleave for the C1 words. The depth of interleave is 32 bytes for the C2 words in the product code illustrated in FIG. 4 (33 bytes if the C&D byte is taken into consideration) when the 896 bytes that comprise a code word are written to the disc in a column by column fashion. The recording format which employs the FIG. 4 product code 68 is illustrated in FIGS. 5 and 6. In FIG. 5 the product code 80 is implemented without interleaving, or equivalently, with depth 1 interleaving. FIG. 6 shows interleaving of two product ECC codewords by alternating the recording of their columns, or equivalently, depth 2 interleaving. The result is a block of 56 EFM frames that contain the data from two product codewords. Adjacent EFM frames of this block contain the data from one complete column of each product codeword. Other schemes for interleaving the product codewords are possible.

The CIRC deinterleaving required by the present invention, as will be discussed in more detail later, is accomplished by writing the data bytes to an external RAM and reading them from RAM locations in a different sequential order than that used by the conventional decoding process previously discussed with respect to FIG. 3. It is also possible to bypass the RAM deinterleaving cycle and use a secondary RAM chip to read/write the bytes in the specific sequential order that is required for the block decoding (i.e., to construct product codewords) of the present invention.

The present invention is also suitable for multiple-pass decoding. Recall that one user data frame, in CIRC format, is spread over 106 EFM frames. This long depth of interleave reduces C2 decoding failures that are due to relatively long bursts of error. This protection against error bursts can be accomplished in the CD-DASD format by using product codeword interleaving and the ability to handle long error bursts can be further improved via multiple-pass decoding. In the multiple-pass decoding which is performed in the present invention, after the initial C1 and C2 decoding stages, C1 decoding is repeated. This may be followed by another C2 decoding and the cycle may continue until the decoding performance consistent with a distance 25, 32×28 product code is achieved. The data reliability achievable from such a code may be equivalent to, or greater than, that achievable via the conventional CIRC depending on the nature of the errors which contaminate the data. The cooperation between the C1 and C2 decoders is conventionally accomplished by passing information flags which are generated after each level of decoding. The multiple C1 and C2 decoding requires the implementation of decoding strategies which dictate the number of errors and erasure corrections in each decoding pass. Various conventional decoding/flagging strategies and product codeword interleave combinations can be used to optimize the decoding performance.

The error handling capability of conventional CIRC decoders is also enhanced by supplying erasure information from an outside source. Specifically, in many current compact disc read channel implementations, the EFM demodulator flags (i.e., erases) all output data bytes that are derived from channel data that violates the 2,10 run-length constraints that are inherent in the EFM modulation code. (The C1 decoder can correct 2× the number of erased erroneous bytes as non-erased errors, so long as the erasures are determined by a source external to the decoder.) This feature is fully retained by the decoder of the CD-DASD product code. However, due to the different interleaving structure of the product code that is defined herein for the CD-DASD recording format, and because decoding strategies different from those employed by the C1 and C2 decoders of conventional CIRC decoders may be used in the implementation of CD-DASD product code decoders (especially if multiple-pass decoding is used), the CD-DASD format may take advantage of other external (to the decoder) erasure-flagging mechanisms. As an example, if the 27-channel bit synchronization field of an EFM frame is detected to be skewed, or decentered relative to the channel synchronization field detection window, the 32 bytes corresponding to that EFM frame might be flagged as of low quality (and such flags may be different from those set by the EFM demodulator if “new” decoder circuits that recognize such differences are provided).

Another feature of the CD-DASD recording format is its enablement of a “fast read” access to data. This feature is implemented by allowing the controller to access data bytes that appear at the output of the C1 decoder before any C2 decoding takes place. Referring to FIG. 4, fast read would allow access to the 24 data bytes in each column of the product codeword immediately after C1 decoding of the column. This feature would allow the CD-DASD drive controller to access information recorded in the sector header prior to reading or writing the remainder of the sector (this feature would allow determination/verification the sector ID, for example). The information contained in the non-header portion of the sector would pass through both C1 and C2 decoding (or through multiple C1/C2 decoding when implemented) before being passed to the controller.

Before describing the steps required record to information on a standard CD using the CD-DASD recording format, we must describe the structure of the CD-DASD data sector 88. This is necessary because the details of the encoding process that is used to write information to a CD-DASD disc will depend on this structure. It must be appreciated that the sector described below is a representative CD-DASD sector in the sense that it contains the various data fields needed to insure reliable data recovery under the constraint of maintaining the a high degree of compatibility with the logical and physical CD-Audio/ROM recording formats; the actual content of the some of the data fields within this sector may be somewhat changed in order expand functionality, or increase the appeal of the CD-DASD recording format as a standard for future CD systems.

Figure 7:
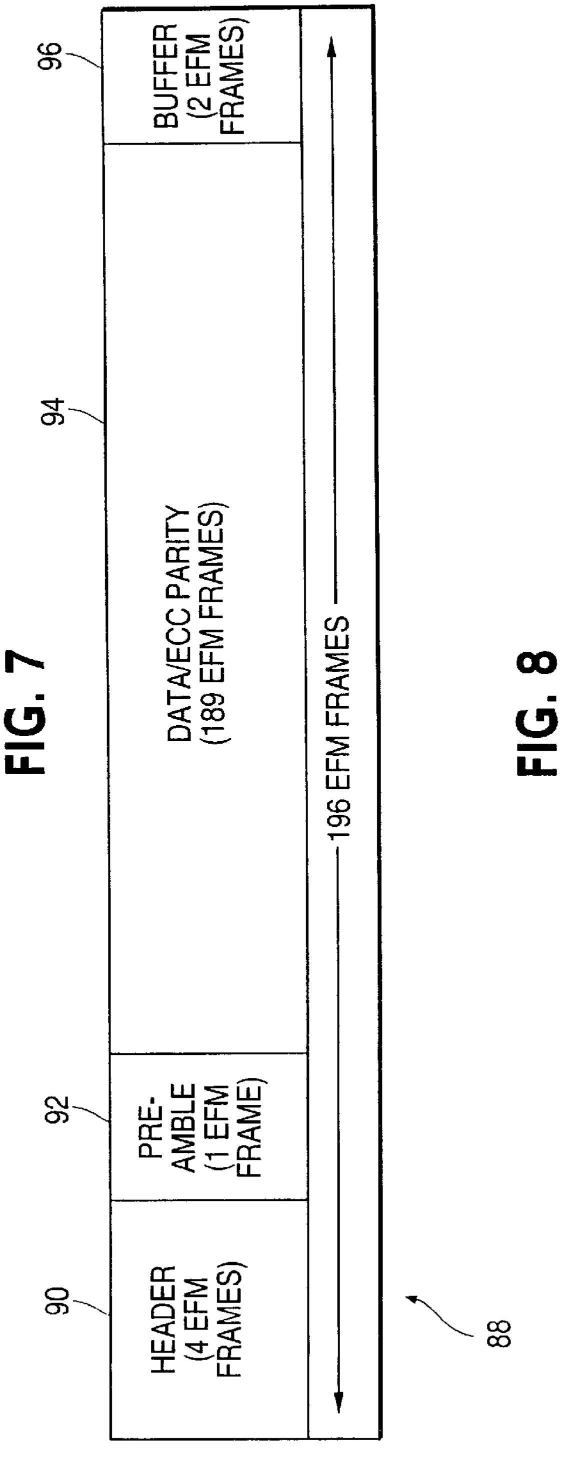
FIG. 7 depicts a structure of a CD-DASD sector.

We will first describe the physical channel structure. A typical example CD-DASD sector 88 is preferably comprised of four major sections or areas, namely a header 90, a preamble 92, data/ECC parity 94 and a buffer 96 areas as shown in FIG. 7. The total sector is physically recorded in a segment of disc track that holds 196 contiguous EFM frames. The number of EFM frames allocated to each sector area is also indicated in FIG. 7. The actual contents of each of the 196 EFM frames which physically represent (constitute) the recorded sector on the disc track are described below.

The four EFM frames which comprise the header 90 are written when the disc is formatted. Formatting is a separate process which prepares the disc for use in the CD-DASD storage system (in effect, the formatting process converts a standard CD-R/E disc into a CD-DASD disc). The header areas 90 of all sectors 88 of the disc (or in the annular region of the disc that is to be used for CD-DASD recording) are written and optionally verified during the formatting process. Some specific disc directory and file management information (e.g., the disc's Volume Descriptor field and Boot Record) is also written into the data/ECC parity areas 94 of appropriate disc sectors when the disc is formatted. The header portion of sectors 88 are never partially written; those sectors which have any information written into their data/ECC parity areas during the formatting operation are completely written when the disc is formatted, i.e., the entire header 90, preamble 92, data/ECC parity 94 and buffer 96 areas are written, according to the rules described in the sequel, when the disc is formatted. Note also that CD-DASD formatting could occur as a two stage process. Low level formatting would cause only sector headers and perhaps physical disc information such as a bad sector map and manufactures identification to be written. Subsequent high level formatting would cause information to be written into particular sectors that specializes the disc for use via a particular operating system.

When writing a header area 90 during the disc formatting process, the actual physical marking of the disc occurs in synchronism with the absolute-time-in-pregroove (ATIP) information that is carried in the spiral groove of a conventional writable-CD disc. That is, the location on the disc of the start of the 27-channel bit EFM frame sync pattern that begins the first EFM frame of every header will have a constant offset from the start of the sync pattern of the nearest ATIP word contained in the disc groove. The recording of the header 90 shall start by writing the second of the two EFM frames that comprise the buffer area 96 of the previous sector, that is, the sectors are spliced together.

We have defined that the splice between sectors occurs in the middle of the buffer area, i.e., at the point where the first EFM frame of the buffer 96 ends and the second frame of the buffer 96 begins. The splice at this point maximizes the tolerance that specifies where the splice must occur. For example, having the splice occur in the middle of the buffer area 96 means that the exact location of the splice can be in error by +/−0.95 EFM frames and the splice will still occur within the buffer (and thus will not contaminate the data/ECC parity area 90 of the sector 88 or the header area 90 of the next sector). With the location of the splice held to <+/−0.45 EFM frames, then we can define the position of the splice to be in the center of the first EFM frame of the buffer (without the danger of contaminating the data/ECC parity or header areas' data). Locating the splice in the center of the first EFM frames of the buffer 96 would prevent the splice from contaminating the EFM sync field of the second EFM frame of the buffer 96 (and thus will insure that all 196 EFM sync fields (one for each EFM frame) of the sector 88 will be found. That increases the robustness of the channel sync maintenance. In addition, by placing the splice in the center of the first EFM frames of the buffer, the CD-DASD drive will have 1.5 EFM frames (instead of 1.0) of sync field that is phased with the header to read prior to encountering the header. With the splice defined to occur in the center of the first buffer EFM frame, then the formatter writes 1.5 frames of the buffer 96 together with the header 90 of the next sector when the disc is formatted.

To maintain compatibility with the "incremental recording" linking rules described in the CD-Write-Once specifications (i.e. in the publicly available Sony/Phillips "Orange Book"), which state that the initial EFM frame that is written in any new instance of disc recording shall be the 26th EFM frame of a 98 frame C&D block, the specific C&D byte value to be recorded in the second buffer EFM frame shall be that of the 26th byte of the "current" 98-byte C&D channel word. The current C&D word is the one that contains the absolute-disc-time (ADT) value which is the same as the ADT value of the most recently read ATIP word (this will usually be the ADT of the previous ATIP word on the disc groove since the entire disc will generally be formatted in one sequential operation). The start locations of the second EFM frames of all buffer areas (i.e., the start of the 27-channel bit EFM frame sync patterns of these frames) on a CD-DASD disc shall be (TBD) EFM frames ±0.5 EFM frame from the end of the sync field of the nearest previous ATIP word (this normally is the ATIP word that has an ADT value that is 1/75th second higher than the ADT of the current C&D word). A description of the actual content of the second buffer EFM frame is given below.

The four EFM frames that constitute the header 90 shall begin with a 27-channel bit EFM sync pattern that is directly followed by the 17-channel bit sequences (including the 3 merging channel bits) that correspond respectively to the 27th, 28th, 29th and 30th Control & Display (C&D) bytes of the current C&D word. The contents of the remainder of each of the four header EFM frames shall be as follows:

```
HEADER FRAME 0 (last 32 bytes/544 channel bits):
    14 replications of the 17-channel bit
pattern...00100000000001001...;
    6 replications of the 3-byte pattern..47h; F2h; A8h.
```

We note that the channel data sequence obtained by EFM modulation of the repetitive 3-byte pattern 47h; F2h; A8h is:

```
....0010010010010010010010010010010010010010010010010010...
    |  ← 47H →  |   |  ← F2h →  |   |  ← A8 →  |
```

That is, this 3-byte pattern, or any cyclic permutation of it, represents a data pattern that is most useful for establishing the frequency and phase of the write/read channel clock. That is, the pattern is a voltage frequency oscillator (VFO) field. The initial 14 bits of the first pattern recorded in the header EFM frame #0 (i.e., 00100000000001001) is not in the 8-bit byte ↔ 14-bit EFM sequence coding table, i.e., it is not one of the 2,10 constrained, 14-channel bit sequences assigned to any of the 256 possible byte values. This sequence is, however, the sequence that is used to represent the first of the two sync characters that define the start of a C&D channel word. Thus, the sequence is undefined as far as the main data channel is concerned, but it is recognized by standard EFM demodulators. We use the fourteen replications of this sequence as defined above to construct a unique Sector Mark, or flag, that unambiguously defines the start of a sector 88.

HEADER FRAME 1 (last 32 bytes/544 channel bits):

4 replications of the 3-byte pattern . . . 47h; F2h; A8h;
1 zero value byte; 1st byte of 3-byte sector ID field;
1 zero value byte; 2nd byte of 3-byte sector ID field;
1 zero value byte; 3rd byte of 3-byte sector ID field;
1 zero value byte; 1st byte of 3-byte ADT field;
1 zero value byte; 2nd byte of 3-byte ADT field;
1 zero value byte; 3rd byte of 3-byte ADT field;
1 zero value byte; 1 sector mode byte;
1 zero value byte; 1 reserved byte;
4 bytes of C1 ECC parity.

HEADER FRAME 2 (last 32 bytes/544 channel bits):

4 replications of the 3-byte pattern . . . 47h; F2h; A8h;
1st byte of 3-byte sector ID field; 1 zero value byte;
2nd byte of 3-byte sector ID field; 1 zero value byte;
3rd byte of 3-byte sector ID field; 1 zero value byte;
1st byte of 3-byte ADT field; 1 zero value byte;
2nd byte of 3-byte ADT field; 1 zero value byte;
3rd byte of 3-byte ADT field; 1 zero value byte;
1 sector mode byte; 1 zero value byte;
1 reserved byte; 1 zero value byte;
4 bytes of C1 ECC parity.

HEADER FRAME 3 (last 32 bytes/544 channel bits): This frame is identical to header Frame 1.

The 3-byte sector ID fields in header frames 1 through 3 carry numerical values which identify the position of the sector 88 on the disc, i.e., along the disc's spiral groove. The 3-byte ADT fields carry the ADT value of the current C&D word (using the minutes; seconds; 1/75th second format). The Mode byte is set to a value which indicates a CD-DASD disc. The recorded C1 parity byte values in header EFM frames 1 through 3 are calculated by C1 encoding (in the normal or conventional way) the 28-byte block comprised of 12 zero value bytes followed by the 16 byte values that occur immediately after the 12-byte VFO sequence in each of the header EFM frames 1 through 3. When the sector header 90 is read, received C1 codewords are formed for each of header EFM frames 1, 2 and 3 by inserting the corresponding three sector ID byte values, the corresponding three ADT byte values, the corresponding sector mode byte values, the corresponding reserved byte values and the corresponding parity byte values that are read from the disc into their respective codeword locations while zero value bytes are placed in all remaining codeword locations (i.e., 20 zero value bytes are placed in each of these C1 codewords). The correctness of the recovered sector ID, ADT, mode and reserved byte fields can thus be checked simply by inspecting the syndrome of the corresponding received C1 codewords. Alternatively, at the drive manufacturer's option, these received codewords can be subjected to C1 error correction (or erasure correction in the event flagged bytes are found in the codeword). Note that, due to the interleaving of data and zero value bytes in header EFM frames 1 through 3, double-byte error bursts cannot contaminate the received C1 codewords formed from the data stored in the header EFM frames. Finally, we note that the cyclic permutation of the 3-byte VFO sequence (47h; F2h; A8h) which yields the minimum digital sum variation channel data stream should be used in header frames 1 through 3.

The buffer 96 includes two 588-channel bit EFM frames. The actual writing of each sector 88 begins and ends in the buffer area 96. Specifically, sector recording begins by writing the second of the two buffer frames (during the disc formatting process) and ends with the complete writing of the first of the two buffer frames (when the sector is entirely written by a CD-DASD drive). Both of the buffer area EFM frames begin with the standard 27-channel bit EFM sync pattern. As mentioned previously, in the second of the two buffer EFM frames, the EFM frame sync pattern is directly followed the 26th byte of the current C&D s word, i.e., the C&D word that has the same ADT values as the ATIP word that was most recently acquired by the disc formatter. The byte directly following the EFM sync pattern in the first buffer EFM frame, which is the last written EFM frame of a sector, will be the 25th byte of the C&D word that is current when the remainder of the entire sector (i.e., the sector areas other than the header 90) is written by the CD-DASD drive. Because the value of this byte will be computed from the absolute-disc-time (ADT) information contained in the header 90 of each sector, which in turn corresponds to the ADT value found in the ATIP channel of the disc, the C&D bytes of the two EFM frames that comprise the buffer 96 should be the 25th and 26th Bytes of the same C&D word.

The last 32 bytes/544 channel bits of the two buffer EFM frames are identical; they consist of the long VFO sequence obtained by EFM modulation of the 32-byte sequence: F2h;A8h;47h;F2h;A8h;47h;F2h; . . . ;A8h;47h;F2h;A8h.

We note that the buffer area 96 represents a 2-EFM frame segment of the disc where the written disc track (groove) can overlap, or where a gap in the written track may exist. The maximum length of a recording overlap or gap should be about ±0.5 of an EFM frame although different gaps can be provided. This overlap, or gap, of the written track in the buffer area 96 may be caused by fluctuations in the rotational velocity of the disc, or by fluctuations in the time taken by individual CD-DASD drives to terminate a sector header 90 read operation and commence the sector write process.

The last EFM frame of the header 90 written on the disc shall end with a recorded mark (or pit). This can be realized by determining the total number of "ones" contained in the stream of channel data that corresponds to the last EFM frame in the buffer 96 and all of the EFM frames of the header 90 (recall that the first channel bit of every EFM frame, i.e., the first bit of the 27 channel bit EFM frame sync pattern is a "one"); if the number of "ones" is odd then the header 90 can be made to terminate with a mark by starting the last EFM frame of the buffer 96 with a (eleven channel bit long) space—if the number of "ones" is even then the header 90 can be made to terminate with a mark by starting the last EFM frame of the buffer 96 with a (eleven channel bit long) mark. Causing the header 90 to end with a mark will allow the preamble 92 to start with an eleven channel bit long space, which will minimize the possibility of overwriting the end of the header when the CD-DASD drive writes the preamble portion of a sector.

A CD-DASD drive writes information to a CD-DASD disc in units of complete sectors 88. That is, when the drive writes any sector 88 of the disc, it records the single-EFM frame preamble 92, the 189-EFM frame data/parity area and first of the two buffer area EFM frames in their entirety. After reading the preformatted header 90 (and establishing bit clock synchronization via the VFO and EFM frame synch fields contained therein, as well as determining the sector ID and ADT values from the appropriate header fields), the CD-DASD drive is switched to write mode and begins recording the single-EFM frame preamble 92. Thus, the single EFM frame that comprises the preamble 92 is the first frame of the sector 88 that is written by the CD-DASD drive. This EFM frame begins with the standard 27-channel bit EFM frame sync field followed immediately by the appropriate C&D byte value (namely, the value corresponding to the 31st byte of the current C&D word). Thereafter, the frame is a 16-byte VFO pattern, a 12-byte sector sync field and four C1 parity bytes as follows:

PREAMBLE EFM FRAME (last 32 bytes/544 channel bits):

16 bytes of VFO (F2h; A8h; 47h; F2h; . . . , A8h; 47h; F2h);

4 repetitions of the 3-byte sequence 9Ch; 64h; 79h;

4 C1 parity bytes.

When the preamble 92 is written the drive's write clock will be have the frequency and phase that was established by reading the header area's VFO and EFM frame sync fields. However, due to variations in the time taken by different drives to switch from header reading to preamble writing and/or slight differences in the spindle RPMs of the drives that write and read the sector, a data clock discontinuity may occur when a given CD-DASD drive reads across the boundary between the header and preamble areas of a fully written sector. The long (16-byte/272-channel bit) VFO field in the preamble 92 can enable a CD-DASD drive's read channel clock to adjust to any phase slippage between data clocks that were used to write the VFO fields in the header and the reminder of the sector. However, it is still possible that the tolerance to the variation in read/write mode switching times that would be exhibited by different CD-DASD drives would be exceeded. A solution to this problem is to provide a "gap" between the header 90 and the preamble 92 with a size equivalent to 0.5 to 1.5 user bytes (8 to 25 channel bits) that could be a field of the sector preamble 92 in which no information is written. When a CD-DASD sector 88 is recorded, the CD-DASD drive would switch from reading (its mode of operation while the header area 90 of the sector 88 is traversed) to writing (its mode of operation during traversal of the preamble, Data/ECC Parity and first part of the buffer area 96 of the sector) during traversal of the gap. If a gap field having a particular length is specified, a CD-DASD drive that reads a sector (that may have been written by some other CD-DASD drive) will know when to expect the preamble 92 to start (within some tolerance, e.g. ±0.5 channel bit).

One approach to providing a gap would be to define a gap field of length, say G±Δ channel bits, at the start of the preamble area 92 of the sector 88. However, this would cause the length of a CD-DASD sector to be increased, on average, to 196 EFM frames+G channel bits. Thus, if the sector headers 90 are written synchronously with the ATIP channel words during the CD-DASD disc formatting operation (a very desirable feature of the CD-DASD recording format that should not be compromised), then there would be an overlap of written information in the Buffer area 66 of the sector, i.e., the end portion of the first EFM frame of the buffer 96 would overlap the first G channel bits of the second EFM frame of the buffer 96. This overlap could be avoided by specifying that the first EFM frame of the buffer be shortened by G channel bits.

Although the above described obvious solution to the problem is viable, it has the disadvantage of causing the recorded CD-DASD disc to exhibit reduced compatibility with the established Compact Disc recording format. This goes against the goal of causing recorded CD-DASD discs to exhibit a very high level of compatibility with CD-Audio/ROM discs at the physical level (i.e., a recorded disc that is comprised of continuous 588-channel bit EFM channel frames). This goal should be maintained in order to minimize the alterations required to modify a standard CD playback channel such that it could read a recorded CD-DASD disc. A CD-DASD disc recorded using the obvious solution just described would have a discontinuity of G channel bits in the synchronous sequence of 588-bit EFM channel frames; unless a read channel that is designed to handle such discontinuities is used, such a discontinuity may present data recovery (channel bit synch) problems during playback of the CD-DASD disc.

A preferred solution to the problem is to provide a gap field at the start of the preamble area 92 of the CD-DASD recording format and cause sectors of length exactly 196 EFM frames to be recorded. This preferred solution can be realized by making use of the fact that the CD-DASD recording format, as described herein, provides that the preamble 92 (written on the disc) start with an eleven-channel bit long space (i.e., it cannot begin with a written mark, or pit). We shall consider this 11-channel bit long space to be a virtual gap (or field). When writing a sector, a CD-DASD drive will begin writing the preamble 90 exactly 11±Δ (e.g., Δ=0.5) channel bits after it has finished reading the header 90 and the length of the first EFM frame of the preamble 92 that is written is reduced by 11 channel bits (to 577 channel bits). Note that we allow for the possibility that the preamble 92 will have length of one or more frames here. In effect, the CD-DASD drive assumes that the first 11-channel bit space of the first EFM frame of the preamble 92 has already been written to the disc. This solution to the problem (i) implements an 11±Δ channel bit gap at the start of the preamble 92 during a CD-DASD write operation and (ii) causes sectors of exactly 196 EFM frames, on average, duration to be written. The preferred solution to the problem thus causes a recorded CD-DASD disc to consist of a continuous sequence of synchronous 588-channel bit EFM frames, i.e., compatibility with the physical marking/timing of the recorded CD-Audio/ROM disc is maintained.

EFM modulation of the 3-byte sequence 9Ch; 64h; 79h yields the channel data sequence:

0100 0010 0100 0010 0010 0010 0100 0100 1000 0010 0100 1000 xxx, where the three trailing x's indicate the terminating merging bits. This 48-channel bit pattern is the same pattern that is specified in the magneto optical (MO) disk drive standards as a sector sync field. This pattern is error tolerant, i.e., when parsed into twelve 4-bit nibbles as shown above, the auto correlation pattern of the twelve nibble pattern exhibits a high, narrow central peak. Thus, as the 48-bit pattern is fed, bit-by-bit, through a 12-stage autocorrellator the probability of determining its correct boundaries is high, even if the pattern contains a few erroneous channel bits. The EFM frames that comprises the preamble 92 of the sector preferably contain 4 repetitions of this 48-channel bit sector sync pattern in order to provide for extremely robust CD-DASD sector boundary detection as well as channel data (EFM) demodulator word synchronization.

The four C1 parity bytes that are recorded in the preamble EFM frame 92 are calculated in the normal or conventional way from the 28-byte data block that consists of sixteen zero value bytes followed by four repetitions of the 3-byte sequence 9Ch; 64h; 79h. When the disc is read, the corresponding received C1 codewords are constructed by placing the last sixteen bytes recovered from the corresponding preamble frames 92 recorded on the disc into their respective codeword locations and placing zero value bytes in the first sixteen locations of each codeword. This enables one to determine (via the computed syndrome of the received C1 codeword) whether any of the four recovered copies of the sector sync field were contaminated by errors.

Since the C&D byte of the first EFM frame of the sector (i.e., header EFM frame #0) is the 27th byte of a C&D word, C&D words will begin in (i.e., the first sync characters of C&D words will appear in) the 73rd and 171st EFM frames of each sector 88. (This follows because the data that comprises a single C&D word, which is multiplexed with the main data, spans 98 contiguous EFM frames.) The single-EFM frame preamble 92, which is the 5th frame of the sector 88, contains the 31st byte of the current C&D word as well as a 12-byte CD-DASD sector sync field. This CD-DASD sector sync field is therefore located at +31 frames from the start of a C&D block; this is within the −10/+36 EFM frame specification for C&D block/CD-ROM sector offset stated in the CD-ROM and CD-Write-Once standards (i.e., in the "Yellow Book" and "Orange Book").

Each of the 189 EFM frames that comprise the data/ECC parity area 94 of a CD-DASD sector 88 begin with the standard EFM frame sync pattern. The EFM sync pattern of each frame is followed immediately by a 17-channel bit, EFM encoded C&D byte. These C&D bytes preferably have sequential values, i.e., the first EFM frame of a given sector's data/ECC parity area 94 contains the 32nd byte of the current C&D word, the next EFM frame holds the 33rd byte of that C&D word, etc. Note that, since a complete C&D word is carried in 98 contiguous EFM frames, a new C&D word will start with the C&D byte that is contained in the 68th EFM frame of each data/ECC parity area 94 (which is the 73rd frame of the CD-DASD sector). The absolute-disc-time (ADT) values of these new C&D words will be 1/75th second higher than the ADT values of the C&D words that are current when the first frame of each data/ECC parity area 94 is written.

The last 32 bytes/544 channel bits of each of the 189 EFM frames that comprise the data/ECC parity area 94 of a given CD-DASD sector 88 are drawn from a pool of 189×32=6048 bytes that is comprised of 4508 bytes that constitute the "logical CD-DASD sector" and 1540 bytes of parity information for the seven C1/C2 product codewords that constitute the "disc level ECC" which is analogous to the cross-interleaved Reed Solomon (CIRC) error correction code (ECC) that is used in conventional CD-Audio/ROM/Writable systems. Which 32 of the total pool of 6048 available bytes is contained in a given EFM frame of the data/ECC parity area 94 depends on the schemes used to form the disc level C1/C2 product codewords and interleave them (disc level encoding of the logical sector data and interleaving of the disc level product codeword is done prior to writing the 189 EFM frames that comprise the data/ECC parity area 94 of the sector 88). The preferred construction of the CD-DASD logical sector is described later herein and disc level encoding/interleaving is also described later in this discussion. The 32-byte data sequences which are written as the last 32 bytes of the 189 EFM frames that comprise the data/ECC parity area 94 of a representative CD-DASD sector 88 also are described later herein.

It is to be recognized that the physical (EFM-frame contents specific) CD-DASD sector structure described above is an example (although preferred) structure and that substantial changes can be made within the spirit of the invention. For example, the number of bytes of VFO field information in any, or all of, the header, buffer and preamble areas can be altered. Even the channel data sequences that constitutes the VFO or sector sync patterns can be altered. Moreover, the number of EFM-frames that comprise the various sector areas could be changed, e.g., the header could be comprised of only 3 EFM frames if the preamble is expanded to 2 EFM frames in length (the simplest way to do this would be two let the last EFM frame of the header as described above become the first EFM frame of the two-frame preamble). Finally, if one is willing to eliminate the resemblance of the CD-DASD format to the current CD-audio/ROM format, the information content of the C&D bytes of each frame could be redefined or the nature of these bytes could be altered (e.g., the 17 channel bits used to represent the C&D byte of each EFM frame could be used as additional resynch field data which is added to the 27 channel bit EFM frame synch field that starts each EFM frame.

The preferred structure of the logical sector will now be described. The information written in the header 90, preamble 92 and buffer area 96 of the CD-DASD sector 88 is predetermined, i.e., the exact values of all data in these areas needs to be consistent with a predefined format such as previously described. The user has no control over what is recorded in these areas of the sector 88. The data/ECC parity sector area 94 holds a total of 189×32=6048 bytes, but 1540 of them are earmarked to carry the parity information of the disc level C1/C2 product ECC. Thus, the values of a total of 4508 bytes are not specified by the preferred CD-DASD recording format, i.e., the format provides that the user may or allows the user to specify these byte values. This block of 4508 bytes, which have values that are not specifically determined by the CD-DASD format constitute the CD-DASD "logical sector." We shall refer to a CD-DASD logical sector which allows the user to freely define (i.e., assign arbitrary values to) all 4508 logical sector bytes as a CD-DASD Mode 02 logical sector.

A second CD-DASD logical sector, the CD-DASD Mode 01 logical sector will also be defined.

An additional level of ECC and error detection coding is implemented in the Mode 01 logical sector. Thus, Mode 01 sectors provide a standardized means to insure the (high) reliability of data recovered from a CD-DASD disc. When Mode 01 CD-DASD sectors are used; the user can arbitrarily specify the values of 4096 (user data) bytes. Thus, 4508−4096=412 "extra" bytes are available in each CD-DASD Mode 01 sector to carry system information and "sector level ECC" parity data.

Figure 8:
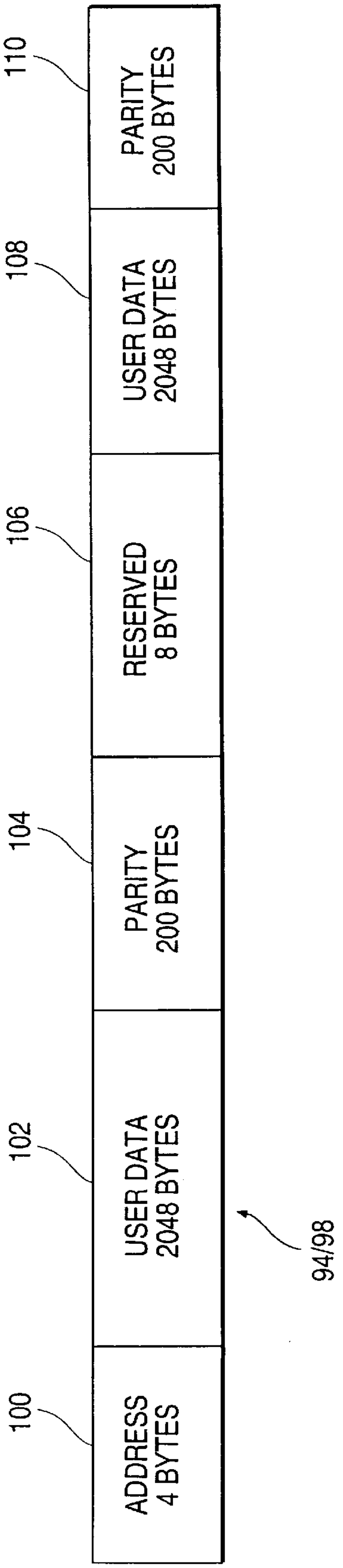
FIG. 8 depicts user definable data and parity in a sector.

In order to emulate, to the maximum possible extent, the Mode 01 sector defined in the conventional CD-ROM specification, the 4508-byte CD-DASD Mode 01 logical sector 98 is preferably comprised of, in sequence, as illustrated in FIG. 8, a 4-byte address field 100 (which consists of three sector ID bytes and one reserved byte), a first 2048-byte user data field 102, a first 200-byte error detection/correction parity field 104, 8 bytes of reserved data 106, a second 2048-byte user data field 108 and a final 200-byte error detection/correction parity field 110. The 400 bytes of parity data comprise 8 parity bytes of a sector level cyclic redundancy check (CRC) code and 392 bytes of parity for a sector level Reed Solomon ECC. The sector level CRC code is meant to provide a final check of the reliability of the data recovered from a CD-DASD sector; its parity information must therefore be protected by the sector level Reed Solomon ECC.

Two sector CRC codewords, each having four parity bytes are formed from the user data 102, 108 and system data 106 that is contained in each Mode 01 CD-DASD sector. The four parity bytes of the first of these CRC words are computed by (i) organizing three bytes that constitute the sector ID, one reserved byte (the value of which can be determined during implementation and could specify the CD-DASD logical sector mode), 2048 user bytes (half of the 4096 user bytes to be written to the sector) and twenty "zero" bytes into the 28 columns shown in Table Ia of Table Appendix; (ii) adding (byte-by-byte XOR) the seventy-four byte values in each of these columns to obtain twenty-eight new byte values; (iii) C1 encoding these twenty-eight new byte values to obtain four CRC parity bytes. (We note that user data byte number nnn is denoted as Dnnn in Table Ia.) The four CRC parity bytes obtained via this process are denoted in the sequel as CRC1, CRC2, CRC3 and CRC4. Four additional CRC parity bytes are computed in the same way from 8 reserved byte values, the remaining 2048 user data bytes of the sector and 16 "zero" value bytes which are organized as shown in Table Ib of the Table Appendix for this purpose. These latter CRC bytes are denoted in the sequel as CRC5, CRC6, CRC7 and CRC8.

In our exemplary CD-DASD Mode 01 logical sector, we allocate 392 total bytes to carry the sector ECC parity information. At this time we shall only possibly specify a preferred sector ECC code. The rational for this is that a particular future implementation should specify a code that is compatible with decoders that will be widely available (and therefore inexpensive) in the near future. An example of such a target decoder is the one that will be employed in the second generation "high density" CD systems that will be commercially introduced in 1996, or soon thereafter. Since the specifications of the ECC that will be used in this high density CD system are not in the public domain at the present time, providing a "hard" specification the CD-DASD sector ECC in this document that will be compatible with such a future system is not possible. we will, however, describe two possible ECCs that could be used as the CD-DASD Mode 01 logical sector ECC in such future systems. Both of these codes should provide adequate reliability to data recovered from CD-DASD discs, and one of them is likely to be compatible with the decoders that will be employed in the next generation of CD systems, or with a slightly modified version of that decoder.

One potentially useful CD-DASD Mode 01 sector ECC can be defined by first organizing the information to be protected, namely the user data bytes, the sector ID bytes, the reserved bytes and CRC bytes, as the 147-row×28-column array shown in Table IIa of the Table Appendix. This information can be encoded as 28 words of a length 161-byte, distance 15 Reed Solomon code that uses the individual byte values as its basic code symbols, i.e., a [161, 147; 15] RS code on GF(256). Each of these 28 codewords have exactly 14 bytes of parity information. Thus, a total of 14×28=392 bytes of sector ECC parity data would be recorded in each sector 88. Alternatively, the 4116 bytes in Table IIa, together with 12 additional "zero" value bytes could be organized as a 172-row, 24-column array (with the 12 added "zero" value bytes placed as the leading twelve byte of the first row). This data could then be encoded as 24 codewords of a [188, 172; 17] RS code on GF(256), which would require a total of 24×16=384 bytes of parity information.

Eight additional bytes of reserved information could be added to the CD-DASD sector 88 if this latter sector ECC is used (these eight additional bytes would replace eight of the twelve "zero" value bytes that were placed in the first row of the 172-row×24-column array mentioned above).

Regardless of the sector ECC that is specified for use in the CD-DASD recording format, the individual codewords will be suitably interleaved to insure that no two bytes that belong to a given codeword are written to adjacent locations along the disc data track. For example, the [161, 147; 15] RS code would be interleaved to depth 28; individual bytes of any codeword would be separated by at least 27 bytes (one byte from each of the other 27 codewords) when they are recorded on the disc track. The method of assigning the bytes in the array shown in Table IIa to specific words of an interleaved code can be defined when the final sector ECC is selected.

As a precursor to disc level C1/C2 product coding, the 4508 bytes that comprise the CD-DASD logical sector can be organized into seven sub-blocks. Each sub-block is comprised of 644 bytes that are arranged into a 28-row×23-column array. The seven logical sector sub-blocks that correspond to a Mode 01 CD-DASD logical sector that employs a sector ECC that produces 392 bytes of parity information are shown in Tables IIIa through IIIg of the Table Appendix. Sector ECC parity byte number mmm is denoted as 3Pmmm in these tables. Note that the columns of the seven sub-blocks shown in these tables are numbered from 1 through 161.

The disc level error correction code (ECC) utilized in the CD-DASD recording format is implemented by (i) encoding the seven CD-DASD logical sector sub-blocks to form seven complete C1/C2 product ECC codewords, and (ii) interleaving these seven product codewords. The C1/C2 product ECC encoding and interleaving methods are defined hereinafter.

The C1 and C2 ECC codes referred to herein are preferably the same codes that together constitute the cross interleaved Reed Solomon (CIRC) ECC employed in all Compact Disc systems. C1 and C2 are (32, 28; 53 and [28, 24; 5] RS codes on GF($2^8$) respectively. C1/C2 product encoding is performed by (i) scrambling the contents of the seven CD-DASD logical sector sub-blocks to form seven new 28-row×23-column arrays; (ii) adding a single column that consists of 28 "zero" elements to the left of each of these new arrays to produce seven 28-row×24-column arrays which each have a column containing 28 "zero" elements as their first columns; (iii) C2 encoding the twenty-eight 24-element rows of each of these seven new arrays to obtain 28 four-tuples of C2 parity bytes for each array, one four-tuple corresponding to each row in each of the arrays; (iv) expanding each of the aforementioned 28-row×24-column arrays into a 28-row×28-column array by inserting the four parity bytes that correspond to each row at the center of the respective row, such that the center four columns (i.e., columns 13, 14, 15 and 16) of each of the seven 28-row×28-column arrays will contain only C2 parity bytes; (v) C1 encoding the twenty-eight 28-element columns in each of the seven 28-row×28-column arrays to obtain 28 four-tuples of C1 parity bytes for each array, one four-tuple corresponding to each column in each of the arrays; (vi) expanding each of the seven 28-row×28-column arrays into 32-row×28-column arrays by adding the four-tuples of C1 parity bytes that correspond to each column at the end of the respective column, such that the last four rows (i.e., rows 29, 30, 31 and 32) of each of the seven 32-row×28-column arrays contain only C1 parity bytes. The seven C1/C2 product codewords that result from C1/C2 product encoding (via the above prescription) each of the seven logical sector sub-blocks that appear in Tables IIIa through IIIg are given as Tables IVa through IVg in the Table Appendix. The ith parity byte of C1 codeword number jj and the ith parity byte of C2 codeword number kk are denoted respectively as 1Pjj-i and 2Pkk-i in these latter tables.

The scrambling that is referred to in item (i) of the C1/C2 product encoding prescription given directly above is done only to cause the C2 encoded rows of the C1/C2 product codeword to be such that they can be C2 decoded by existing conventional CIRC decoders that operate in CD-Audio mode. (It is desirable to design the C1/C2 product code in such a way that existing, low cost CIRC block decoder chips can be used to realize CD-DASD read channels. The architecture of these extant CIRC decoders is such that the data that is input to their incorporated C1 and C2 decoders can be manipulated via external circuitry, but the data output by the incorporated C2 decoder cannot be accessed until it appears at the output of the CIRC decoder chip. Since existing CIRC decoder chips perform a descrambling operation that is the inverse of the C2 codeword scrambling specified in the CD-Audio standards, i.e., in the "Red Book", after C2 decoding is performed—but before it is output, data that is processed by such CIRC decoders must be appropriately scrambled at the C2 codeword level. In other words, existing C1/C2 CIRC block decoder chips can be used to decode the C1/C2 product codewords given as Tables IVa through IVg such that the logical sector sub-blocks given as Tables IIIa through IIIg will essentially appear at the CIRC decoder chip output. We note that an alternative to implementing the CD-Audio C2 scrambling in the C1/C2 product definition is to (i) not include this scrambling when forming the C1/C2 product codeword, (ii) collect the data output by an existing CIRC decoder chip that decodes such a C1/C2 product codeword in a buffer and (iii) descramble this data by reading the buffer in an appropriate way.) The result of the scrambling referred to in item (i) of the C1/C2 product coding prescription can be seen by comparing the first 28 rows of the 2nd through 12th and 17th through 28th columns the arrays in Tables IVa through IVg with the arrays in Tables IIIa through IIIg of the Table Appendix.

Note that there are exactly 196 total columns and 196 total rows (ignoring the rows that contain only C1 parity data) in the seven C1/C2 product codewords. The numbers at the top of each array, and to the left of each array, in Tables IVa through IVg respectively indicate the relative order of each these columns and rows across all seven C1/C2 product codewords. The small numbers just below the column numbers in Tables IVa through IVg indicate the logical sector sub-block column(s) (cf., Tables IIIa through IIIg) that contain any data which appears in the respective C1/C2 product codeword column. Similarly, the small numbers immediately to the right of the row numbers in Tables IVa through IVg indicate the logical sector sub-block row(s) that contain any data which appears in the respective C1/C2 product codeword row. For example, the byte labeled D24 that appears at the 2nd row/17th column of the array in Table IVa is the byte that appears at the 3rd row/5th column of the logical sector sub-block shown in Table IIIa.

In order to provide robustness against long burst error events, the data contained in the seven C1/C2 product codewords is preferably interleaved prior writing the data onto the disc track. This interleaving is designed to insure that bytes that belong not only to a given product codeword, but also to a given C1 or C2 word, are well-separated when they are written onto the disc data track. Two separate and independent interleaving operations are performed.

First, the 196 columns that comprise the seven C1/C2 product codewords are interleaved to depth seven. This is illustrated in Table V of the Table Appendix, which shows the first 29 columns of the depth 7 column-interleaved C1/C2 product codeword that results when the seven product codewords shown in Tables IVa through IVg are column-interleaved to depth seven. We see that the first seven columns of Table V are precisely the first columns of each of the seven individual C1/C2 product codewords, arranged sequentially.

Similarly, the next seven columns of Table V are the sequential arrangement of the second columns of each of the seven individual C1/C2 product codewords, etc. We note that, if the data in Table V is written to the disc track column-by-column, i.e., the first byte of column 1 is written first, followed by the second byte of that column, etc., then individual bytes of any C2 codeword will be separated by at least seven columns of data (7×32=224 bytes) along the disc track; this is a depth 224 interleaving of the C2 code.

Next, the columns of the depth 7 column-interleaved C1/C2 product code are organized into 28 groups that each contain seven columns of data. This is done in an ordered way, such that the first group comprises the first seven columns of the depth 7 column-interleaved C1/C2 product codeword, the second group comprises its next seven columns, etc. The data in the seven columns that comprise each 7-column groups is then interleaved. One method of doing this is illustrated in Table VIa of the Table Appendix, which shows a cross-interleaving of the data contained in seven 32-element columns (all the "1s" in Table VIa were originally in column 1; all the "2s" were originally in column 2, etc.). Table VIb illustrates this seven column cross-interleaving scheme applied to the 7-column group which is the second group of seven columns that appears in the array depicted in Table V, i.e., the group comprised of columns 8 through 14 of the array in Table V. Here, the shaded elements in the array of Table VIb indicate the 32 data bytes that originally resided in column 11. We note that if each column in Table VIb were written to the disc data track as the last 32 bytes of an individual EFM frame, then (since each column of the array in Table V is a C1 codeword) the columnar cross interleaving under discussion would cause a depth 7 interleaving of the seven C1 codewords that encode the data bytes of Table VIb (we note that the depth 7 C1 interleave is maintained across the columns of Table VIb because a 27-channel bit EFM frame sync pattern and a C&D byte are recorded between the last C1 codeword byte of one of the columns and the first C1 codeword byte of the next column).

The C1/C2 product code interleaving just discussed provides a depth 7 interleave of the C1 code and a depth 238 interleave of the C2 code.

Regardless of whether we are dealing with Mode 01 or Mode 02 CD-DASD logical sectors, the first seven columns of the 32-row×196-column array that results from the encoding and interleaving processes just described will be all "zero" bytes (this is because the four parity bytes obtained by C1 encoding twenty-eight "zero" value bytes are all "zero" value bytes as well). Thus, we do not have to record these first seven columns. By discarding these columns we are left with a 32-row×189-column array; the 189 columns of this array are exactly the 32-byte data sequences which are sequentially written as the last 32 bytes of the 189 EFM frames that comprise the data/ECC parity area 94 of the CD-DASD physical (channel) sector 88.

Figure 9:
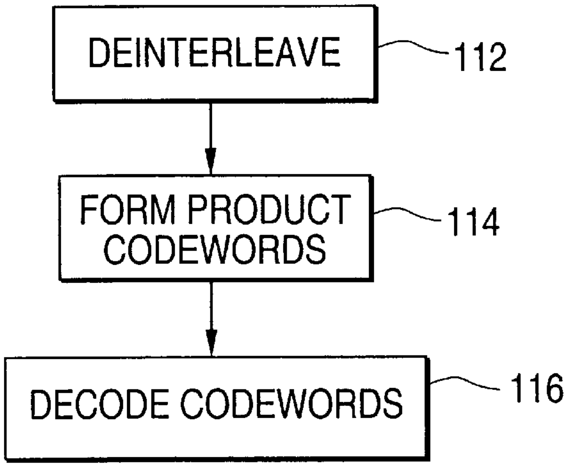
FIG. 9 depicts the steps of a read process according to the present invention.

When this data is recovered from a recorded sector on the disc (after EFM demodulation) it is first de-interleaved 112 and then formed 114 into the appropriate seven C1/C2 product codewords as illustrated in FIG. 9. The seven all "zero" value byte columns that were discarded prior to writing the data to disc are inserted as the first column of these seven product codewords when they are formed. These seven C1/C2 product codewords are then decoded 116 to obtain the CD-DASD logical sector data. If CD-DASD Mode 01 logical sectors are used, this logical sector data may be processed by the sector ECC and CRC decoders to correct errors before it is sent to the CD-DASD controller's output buffer.

Figure 10:
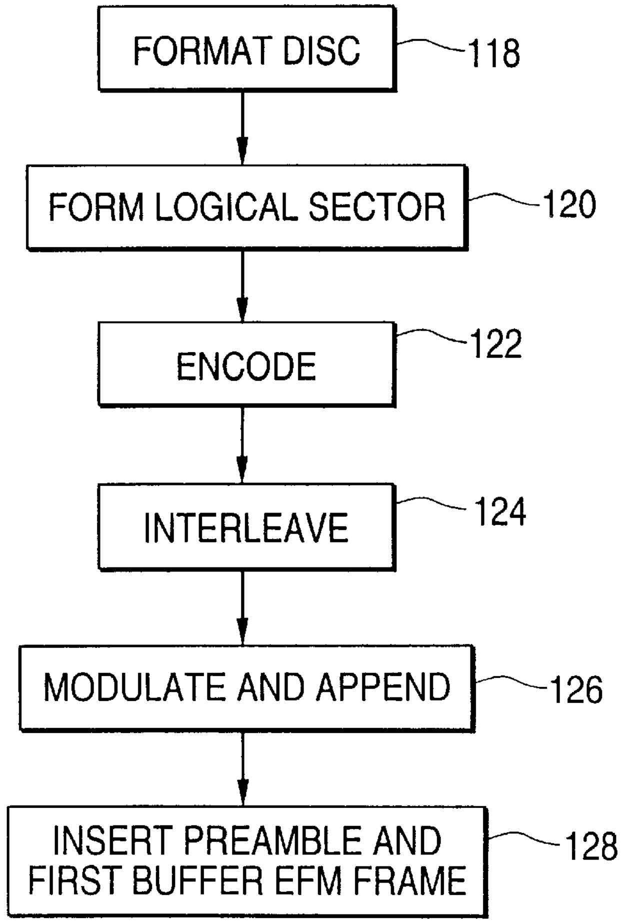
FIG. 10 illustrates a write process.

The operation of encoding or writing a CD-DASD disc first involves formatting 118 the disc, as illustrated in FIG. 10. This process consists of converting a conventional CD-R/E disc to a CD-DASD disc by recording the 4-EFM frame headers for every CD-DASD sector (as well as the last EFM frame of the previous sectors' buffers) that will be located along the spiral disc groove in the annular area of the disc that will be dedicated to CD-DASD use. The headers are recorded at 196-EFM frame intervals and are synchronized with the disc's ATIP data channel. A low level formatting operation consists of only writing the sector headers (this may be done by the disc manufacturer). A high level formatting operation consists of writing operating system/file system information (e.g., volume descriptor, boot record, etc.,) into the data areas of specific CD-DASD sectors. High level formatting will be done by a CD-DASD drive when the disc is prepared for use (low level formatting by a CD-DASD drive may also be possible).

The next step is to form 120 the logical CD-DASD sector. The logical CD-DASD sector is a block of 4508 bytes of data which is written by a CD-DASD drive in the data/ECC parity area of CD-DASD sector. If Mode 02 CD-DASD sectors are being recorded, all 4508 bytes of the logical sector have user defined values. If Mode 01 sectors are being written, 4096 of the 4508 bytes have values that are defined by the user. The user defined bytes, parsed into the appropriate size blocks, will usually be provided to the CD-DASD drive's encoder by the file subsystem that is being used by the operating system that is controlling the CD-DASD drive. In the case of Mode 01 sectors, the CD-DASD encoder will use the 4096 user bytes, three appropriate sector ID bytes and the required number of reserved bytes to compute the CD-DASD sector level CRC and sector level ECC parity bytes. These parity bytes are subsequently added to the previously mentioned data to form the Mode 01 CD-DASD logical sector.

The next operation is to perform the CD-DASD disc level ECC encoding/interleaving. The CD-DASD "disc level ECC" is analogous to the CIRC code used in conventional CD-Audio/ROM systems. The CD-DASD logical sector is first parsed into 7 logical sub-blocks and then each of these is C1/C2 product code encoded 122. Next, the resulting 7 C1/C2 product codewords are depth 7 column-interleaved 124 to form 28 groups, each containing 7 C1 codewords (each C1 codeword in a given group belongs to a different C1/C2 product codeword). The seven C1 codewords in each of these groups are then interleaved 124, to a depth of 7. After this process is completed, the 4508 bytes that comprise the CD-DASD logical sector, together with 1540 parity bytes that result from C1/C2 product encoding, will be distributed as the last 32 bytes of exactly 189 EFM frames.

Next, each of the 189 32 byte blocks described above are conventionally EFM modulated and appended 126 as the last 544 channel bits of the 189 EFM frames that comprise the data/ECC parity area of the CD-DASD sector recorded on the disc. Prior to writing these 189 EFM frames to the disc, however, a one-EFM frame CD-DASD preamble is inserted 128 before the 189-EFM frame CD-DASD data/ECC parity sequence and a single CD-DASD buffer EFM frame is added after it. This group of 191 EFM frames is then recorded in a single contiguous write operation immediately after the header of the appropriate CD-DASD sector on the disc. This completes the recording of the CD-DASD sector.

Figure 11:
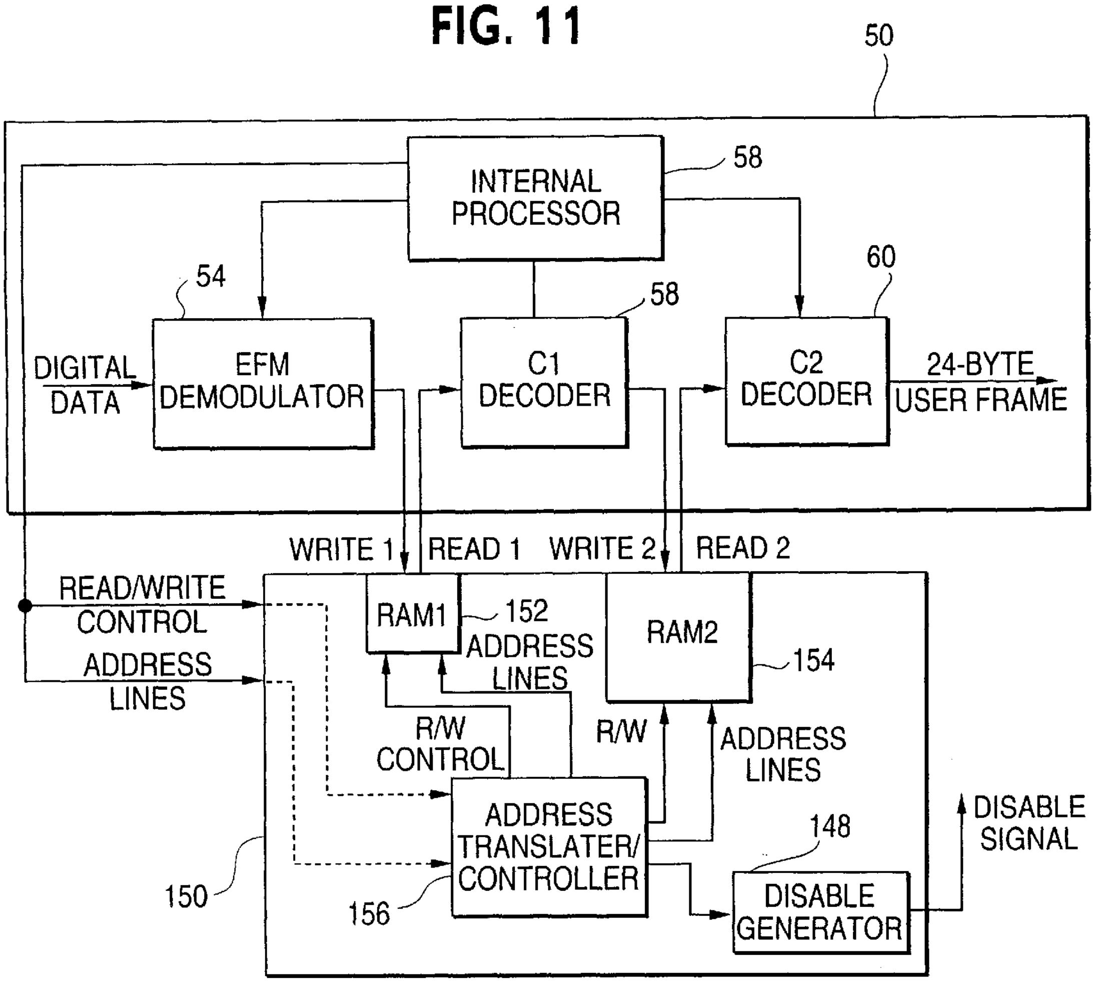
FIG. 11 depicts a circuit for reading the data written by the process of FIG. 10.

To perform the reading of discs written using the above described procedure the circuit of FIG. 3 can be modified. FIG. 11 shows a block diagram of one possible modification which can accomplish the task of reading the data in the new format. First, the external RAM 52, or possibly one half of the external RAM dedicated to C2 de-interleaving, may be disabled by using a variety of techniques such as, physically removing certain pins of the integrated circuit or alternatively, producing a "disable signal" via a disable generator 148. Another approach is to detect the mode bits (i.e., bits which define the type of disc) of the disc and use those to control switching to a completely different set of external circuitry. Upon the disabling or switching, the external circuit 150 is enabled and switched into the bus and control signal paths for the decoder 50. The external CD-DASD decode circuitry 150 may contain two Random Access Memories 152 and 154 indicated as RAM 1 (holding at least 64 frames) and RAM 2 (holding at least 64 frames) or, one single memory module which is logically divided into two sections. An address translator/controller 156 intercepts the read/write control and address signals that are produced by the internal processor 58 of the decoder 50 and generates new address values and read/write enable signals for writing the data into RAM 1 and RAM 2. This address generation will be discussed in more detail later.

In the external circuitry 150, some parts of the C1 de-interleave mechanism, for example, the write-1 addressing scheme, can remain functionally intact even if no C1 codeword interleaving is used in the CD-DASD format. In this case, the address values and read/write control signals, generated by the internal processor 58, can be routed directly to RAM 1 without modification. If C1 codeword interleaving is utilized, the de-interleaving of the C1 words requires remapping of the address values. This is also done by the address translator/controller 156 during the "Read 1" and "Write 1" cycles.

In a similar fashion, the address translator/controller 156 can write the "Write 2" bytes into RAM 2 and retrieve them in a different order during the "Read 2" cycle. The basic idea behind the address translator/controller 156 is to remap the address values generated by the internal processor 58 to provide the proper de-interleaving required for the CD-DASD block retrieval of the information bytes. In summary, the function of the address translator/controller 156 is to: First, intercept the address values that appear on the external RAM bus. Thus, the "location" of the byte with respect to its neighboring bytes is determined. Second, produce a new address value that will write/read the byte to/from a new "location" of RAM 1 or RAM 2. The details of the control operation of the controller 156 are discussed below.

The SAA7310 decoder chip 50 (see FIG. 3) uses a 16K×4 external dynamic RAM 52, such as the NEC PD 41464, to initially store the data bytes that are sequentially retrieved from the disc 18. These data bytes are subsequently read from the RAM 52 in the sequential order that is required to form C1 codewords. Data output from the C1 decoder is also written to and read from this RAM using the two (different) address sequences that are required to form C2 codewords. This RAM is logically divided into two halves; one half is dedicated to C1 codeword storage, de-interleaving and retrieval while the other half performs the same tasks for the C2 codewords. The data bytes that appear on the SAA7310-RAM bus can be divided into four groups: write-1, read-1, write-2, and read-2 data cycles. Write-1 and read-1 operations accomplish the de-interleaving required to form C1 codewords and write-2 and read-2 performs the de-interleaving needed to form C2 codewords.

Figure 12B:
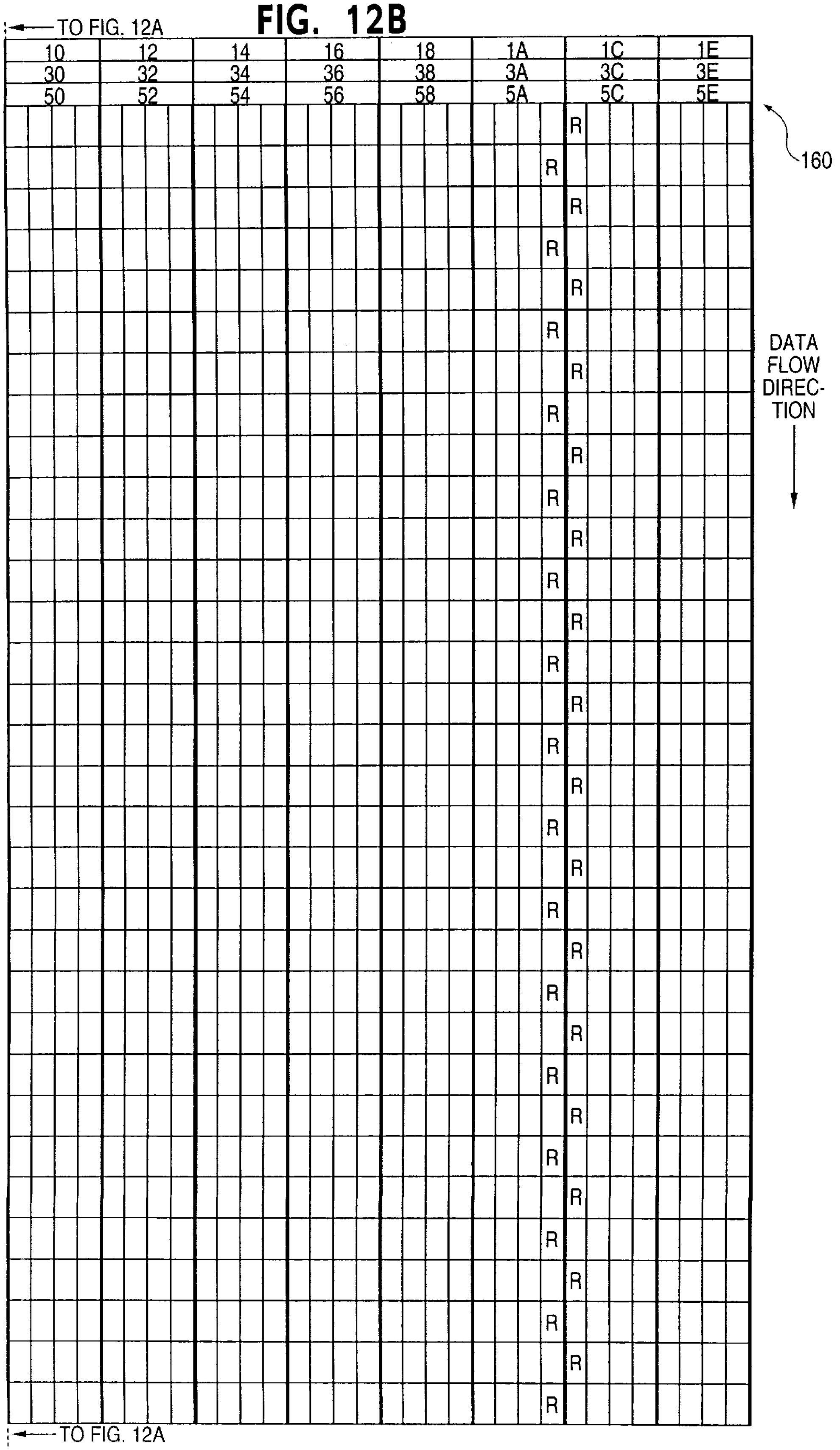
FIGS. 12 and 13 depict the addressing scheme of the circuit of FIG. 3.

FIG. 12 is an interleave diagram array 160 that depicts one half of the dynamic RAM 52 used for performing the C1 de-interleaving (write-1 and read-1 operations) in the Philips CDD 461 CD-ROM drive that uses the SAA7310 decoder chip 50. Dynamic RAM architecture is such that individual memory cells are arranged in a row-column format. To access a memory location, the row address as well as the column address of the desired location must be specified. The 16K×4 RAM 52 external to SAA7310 decoder chip 50 has 54,536 individual 4-bit memory locations that are arranged as a 256 row×256 column grid. C1 and C2 storage and deinterleaving in the Philips CDD 461 player, however, is accomplished by utilizing only a 256 row by 48 column grid of memory locations. Every single read or write operation that is initiated by the decoder chip 50 accesses three nibbles (1 nibble=4 bits) of the external RAM 52; two nibbles contain the data byte value and the third nibble holds the EFM erasure/CIRC decoder flag information. For every write or read, a row address value is first placed on the RAM address lines followed by three column address values. The hex numbers in the first four columns of FIG. 12 represent all 128 possible row addresses that are used in write-1 and read-1 operations. For a given row address, the data and flag nibbles can be written to one of 16 trios of column addresses shown as hex numbers in top three rows of FIG. 12. Thus, every square in FIG. 12 (excluding the row and column address squares) represents a 3-nibble location of the dynamic RAM 52. For example, the three nibbles that are stored in the cross-hatched square near the center of FIG. 12 can be accessed by activating row address 98 (hex) followed by column addresses 0E, 2E, and 4E (hex).

The write-1 data (which is comprised of data bytes that are sequentially output by the EFM demodulator 54) are written into sequential locations of the RAM 52. FIG. 12 shows a typical write-1 cycle; the cells marked with the letter "W" indicate the RAM memory locations that hold the data corresponding to one 32-byte EFM frame and two partial EFM frames. A complete EFM frame is comprised of 33 bytes. The first byte of the recovered EFM frames (also known as the C&D byte), however, is extracted by the P and Q subcode processors and is not written to the external RAM 52. The first trio of bytes of the write-1 cycle is circled for clarity. A read-1 cycle is also indicated in FIG. 12 by the cells marked with the letter "R". The 32 data bytes and associated flag nibbles that are sent to the SAA7310 chip 50 via the read-1 operation constitute one complete C1 word. Note that sequential memory locations are not addressed during a read-1 cycle. The staggered arrangement of cells involved in a single read-1 cycle implements the depth 2 de-interleaving required to form a C1 codeword.

Figure 13A:
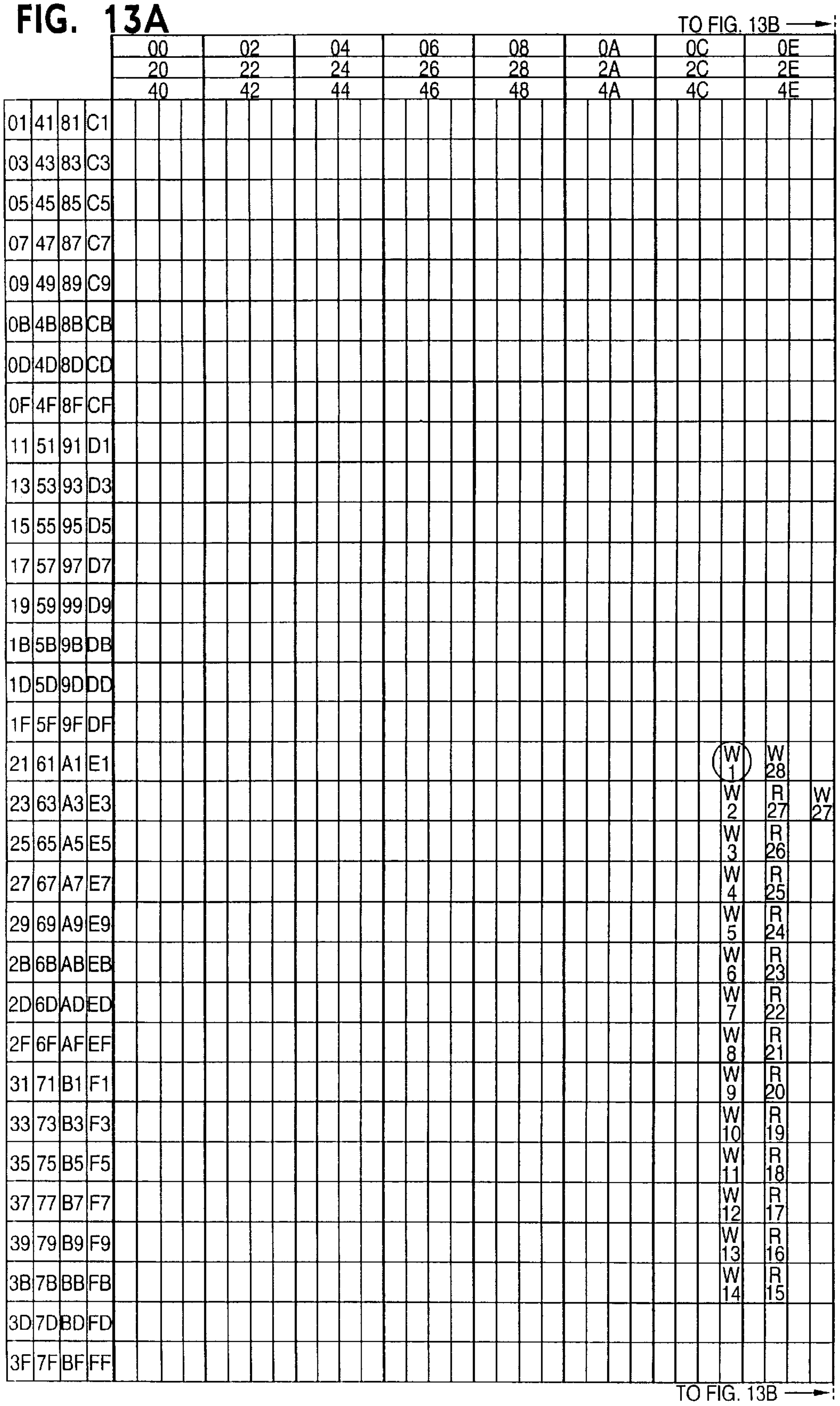
Figure 13B:
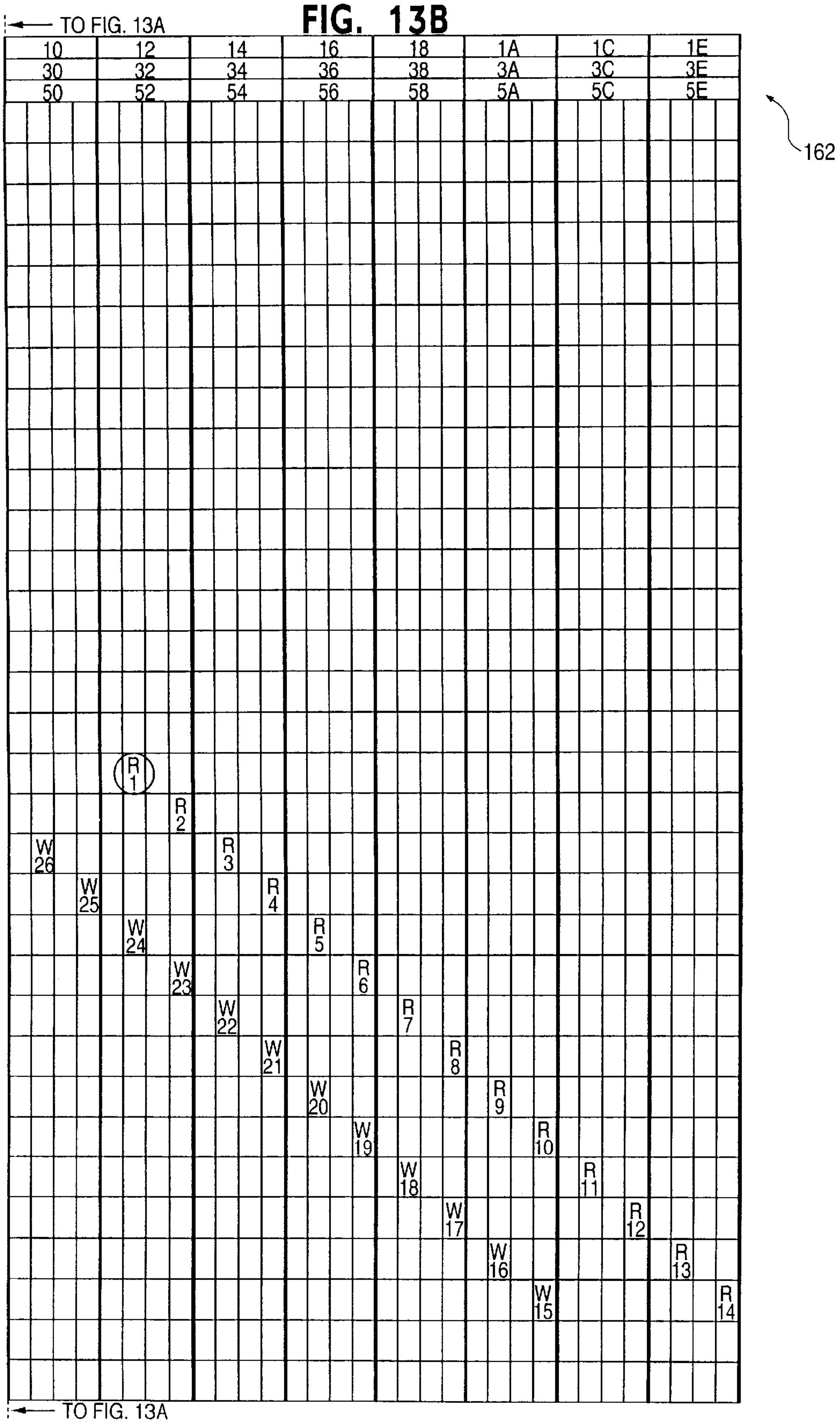

FIG. 13 shows an array diagram 162 similar to the one in FIG. 12 for the write-2 and read-2 operations of the decoder 50. In this figure, the write-2 and read-2 nibble trios are numbered in the sequence that they are written to or read from the RAM (i.e., the memory location identified by W7 is written after memory location identified as W6, etc.). The first bytes of the write-2 and read-2 operations are circled. Note that the row addresses are different from those in FIG. 12 and the write/read address values follow a more complex pattern. In this case, the 28 data bytes and associated flag nibbles that are sent to the SAA7310 chip 50 via the read-2 operation constitute one complete C2 word. Also note that read-2 byte #28 (not shown in the figure to avoid confusion) coincides with the last write-2 byte (w28) that was written during the write-2 cycle.

The address translator controller 156 performs the following tasks:

1) It recognizes (via monitoring the row address values and the read/write enable line of the existing dynamic RAM) the four different read and write operations discussed above.
2) It produces new address values to read/write the data and flag nibbles into new locations of RAM1 and RAM2 of FIG. 11.

Figure 14:
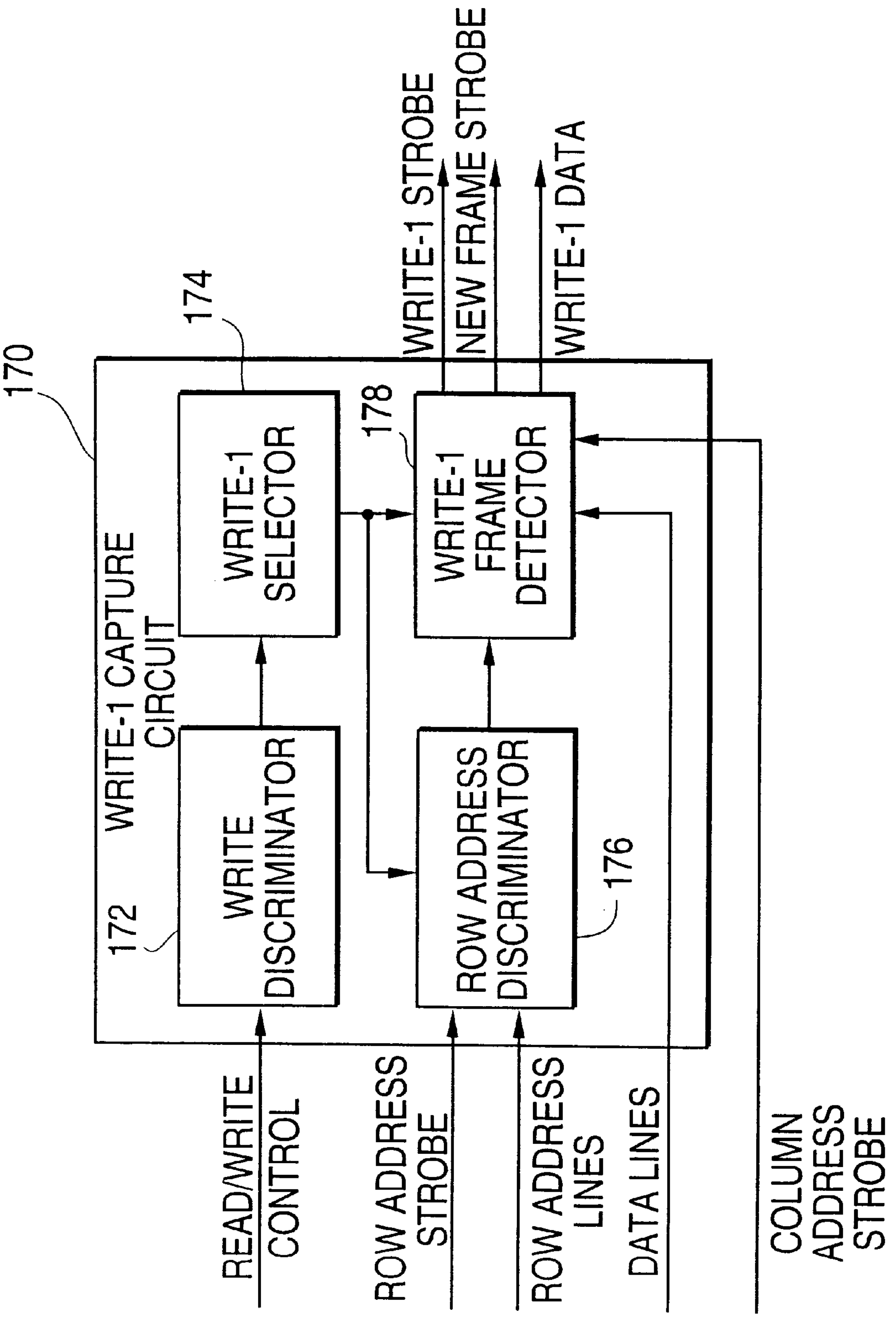
FIG. 14 depicts a circuit that separates write data from other data.

A portion of task 1 can be accomplished by circuit 170 which is used to separ the write-1 data from the remaining data which is illustrated in FIG. 14. A similar circuit can be constructed for the read-1, write-2 and read-2 cycles by a person of skill in the art. The data and flag bytes that correspond to write-1, read-1, write-2 and read-2 operations do not occur sequentially on the bus of external RAM 52. For example, the 32 bytes of an EFM frame are not written in 32 consecutive write-1 operations to the RAM. The above four read and write operations are interleaved in a special format depicted in FIGS. 12 and 13 and circuit 170 is designed to extract the write-1 operation from the available data and address lines. The following is a description of circuit 170 which separates the "write-1" data from the remaining information that appear on the bus of RAM 52.

The signals on the left hand side of the circuit 170 are available on the bus of RAM 52 and are intercepted by the write-1 capture circuit 170. The write discriminator 172 separates the write operations from the read operations by monitoring the Read/Write Control signal and generating a signal to indicate the presence of a write operation. Write-1 selector 174 uses the signals that are generated by the write discriminator 172 to indicate the presence of a write-1 operation. Once the "write" operations are separated from the "read" operations (via the write discriminator 172), the "write-1" operations are further extracted by the write-1 sector 174. The write-1's can be uniquely recognized by the fact that some write-1's are preceded by either a read-1 or read-2 operation. But, a write-2 is never preceded by a "read" operation. The write-1 selector uses this property of the external RAM's Read/Write cycle to extract the write-1 operations. The row address of the first byte of an EFM frame can have one of four hexadecimal values: 00, 40, 80, C0. The row address values and the row address strobe line are used by the row address discriminator 176 to indicate the presence of one of the above four addresses. The write-1 frame detector 178 uses the column address strobe line to generate write-1 bytes ("Write-1 data") and the associated flags by intercepting the data and flag bits that correspond to one of above row addresses (i.e., 00,40,80,CO) followed by the subsequent 31 data bytes and the associated flags that are written to the external RAM 52 during the next 31 write-1 operations. The signal labeled "Write-1 Strobe" is normally low (0 volts) and becomes high only to indicate the presence of a write-1 trio (data byte plus the flag nibble). The signal labeled "New Frame Strobe" is normally low and becomes high to indicate the start of a new EFM frame.

Figure 15B:
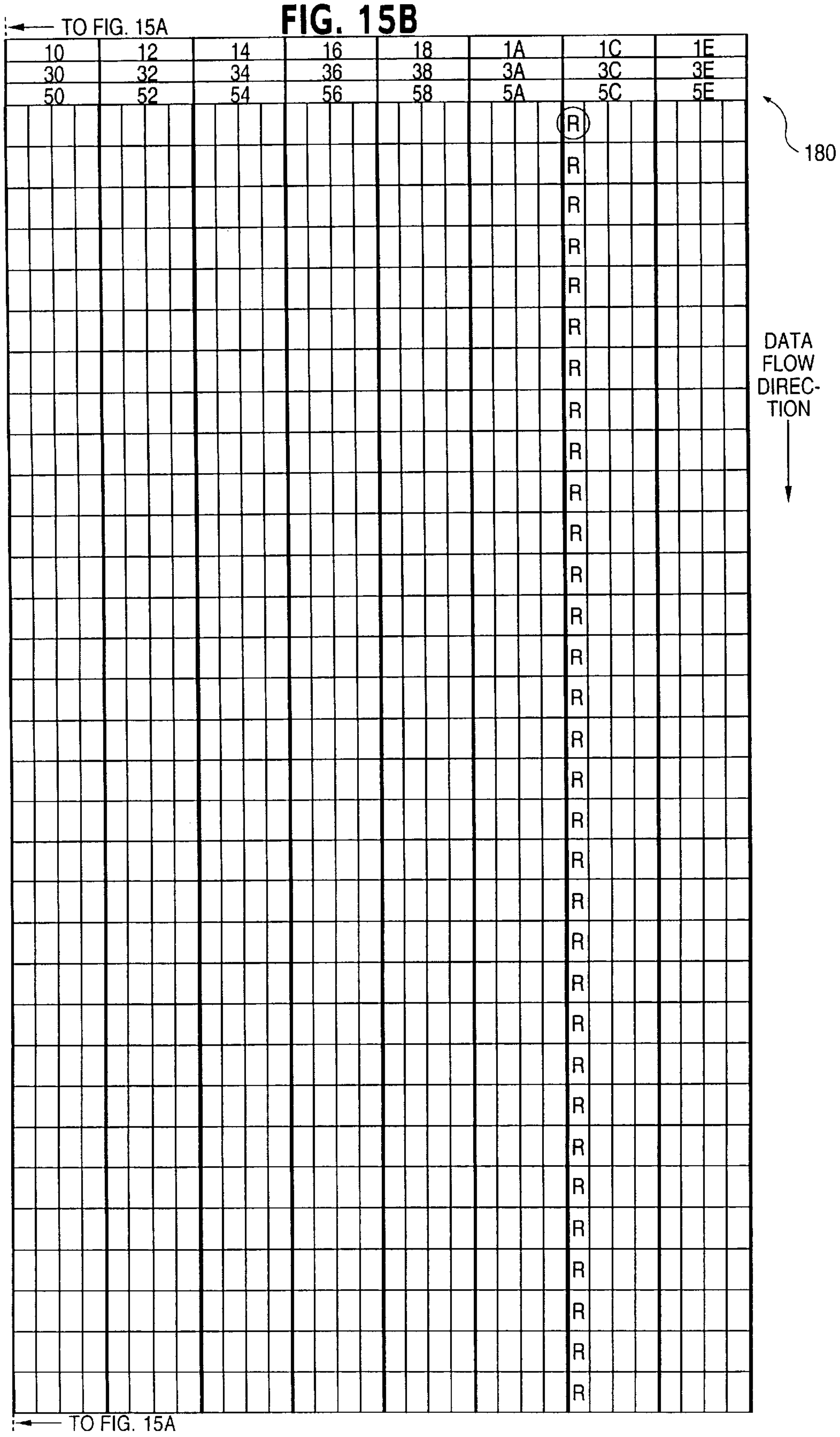
FIG. 15 depicts a C1 write—read scheme according to the present nvention.

Generation of the new address values (task 2 above) can be done with an address translation table using, for example, a ROM look-up table. It is also possible to describe the translation using a translation algorithm. However, because the translation needs to be fast and inexpensive a table look-up operation is preferred. The translation can be best illustrated by a simple example where 7 non-interleaved rectangular codewords (no C1 interleaving internal to a given codeword and depth twenty-eight C2 interleaving) are used to make up one complete sector on the disc 18. One such product codeword is depicted in FIG. 4. In the CD-DASD recording format, the addressing scheme for the recovery of C1 codewords does not require the staggered read-1 addressing arrangement (see FIG. 12). The row and column addresses for the write-1 operation may be routed directly to RAM (152), which itself can be a duplicate of the current 16K×4 RAM 152. The read-1 addresses, however, must be remapped by the address translator/controller 156 so that the read-1 trios are retrieved in the same sequential order that were written by the write-1 operations. The array 180 of FIG. 15 illustrates one complete C1 word retrieval sequence in the CD-DASD format. This figure is identical to FIG. 12 except for the modified read-1 addressing scheme.

Figure 16:
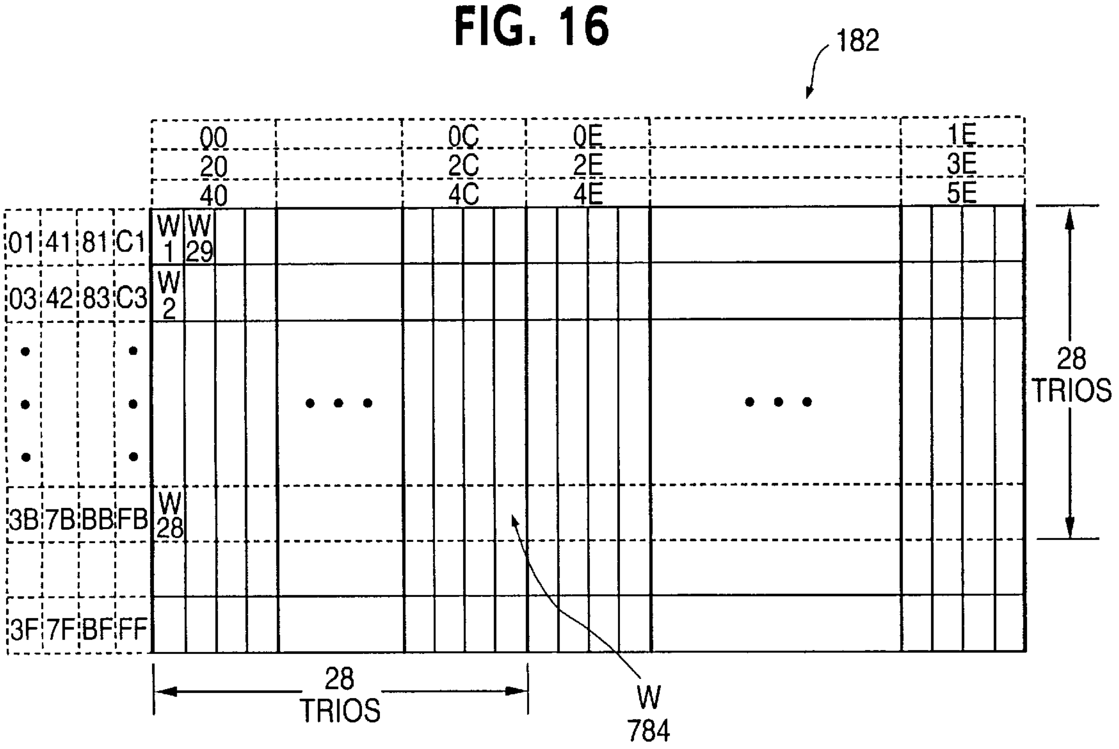
FIGS. 16 and 17 depict a C2 write—read according to the present invention.

The major modification required for the present invention, however, involves the remapping of write-2 and read-2 addresses. The CD-DASD format requires a write-2 addressing scheme which is similar to the write-1 cycle of FIG. 12. During a write-2 cycle the data are written in sequence into columns of 28 (3-nibble) trios of RAM2 (154). After 28 complete write-2 cycles have been completed, 28 C2 words are formed as 28 rows of 28 consecutive columns of RAM2 (154). A partial memory map 182 of RAM2 is shown in FIG. 16. Assume the data byte contained in the first write-2 trio of FIG. 13 (row address: E1; column addresses: 0C, 2C, 4C) is the first byte of a product codeword shown in FIG. 4. This trio may be placed by the address translator/controller 150 into row address: 01; column address: 00, 20, 40 of RAM2. The new address for write-2 trio #2 (row address: E3; column addresses: 0C, 2C, 4C) would then be row address: 03; column address: 00, 20, 40; etc. Write-2 #784 (the 28th trio of write-2 frame #28) is the last trio which needs to be remapped in order to complete the 28-row by 28-column rectangle. The new address for this byte will be row address: FB;

column addresses: 0C, 2C, 4C. The new write-2 frame locations are shown in the left half of FIG. 16. For example, a portion of the translation table would look like

| Write 2 | |
|---|---|
| Input Address | Output Address |
| E1; 0C, 2C, 4C | 01; 00, 20, 40 |
| . | . |
| . | . |
| . | . |
| 01; 1C, 3C, 5C | FB; 0C, 2C, 4C |

Figure 17:
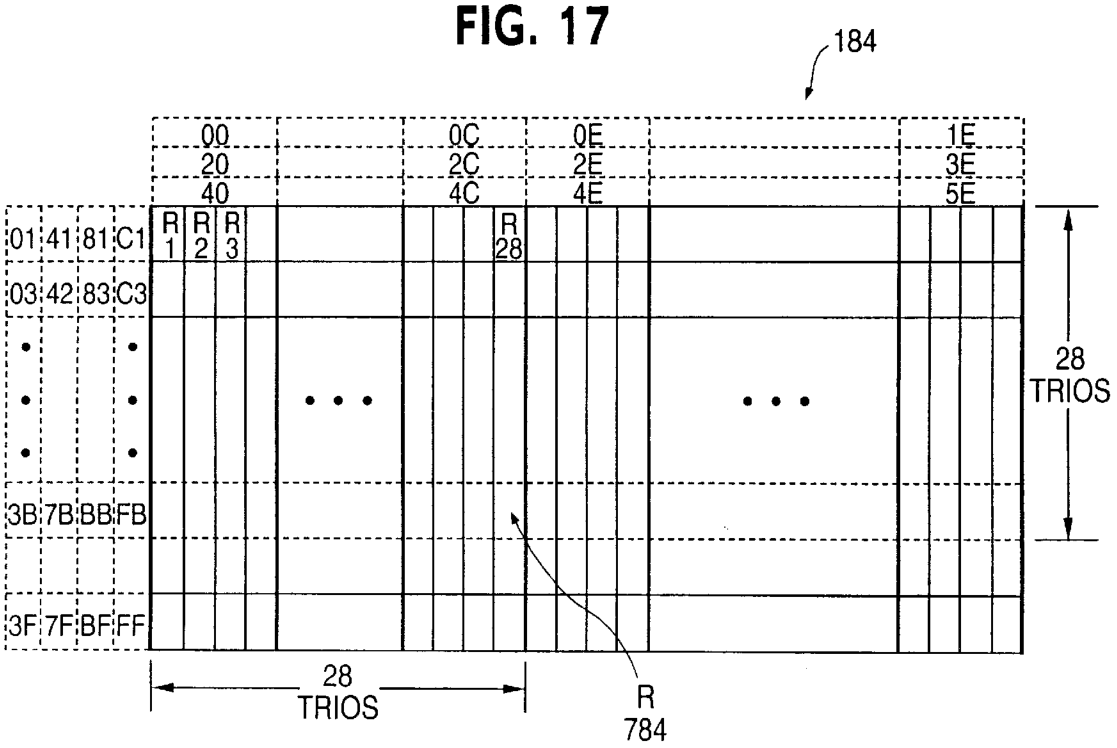

The C2 frames, for this example, are formed as the twenty-eight 28-byte rows depicted in the memory map 184 in FIG. 17. By providing these address translations in a ROM look-up table the controller 156 can perform the mapping needed for the direct access storage device—compact disc (CD-DASD) format.

The present invention, in addition to providing a new CD-DASD, also allows the access speed to the data to be improved, furthering the goal of providing a fast DASD device. The compact disc standards specify that the disc rotation is such that a uniform relative velocity must be maintained between the disk and the pickup. Thus, the angular velocity of the disc decreases as the read/write head moves to larger radii on the disc. This is known as a constant linear velocity disc rotation scheme, or simply as CLV. In the case where data must be retrieved/written in a random access fashion, such as in the CD-DASD format described herein, the optical head must suddenly move to a larger or smaller radius. If the system read channel uses a single (constant) frequency bit clock, the read head must remain idle until the proper linear velocity is achieved. This technique results in relatively long data access times. In the CD-DASD format much faster data access can be achieved by placing one or more variable frequency oscillator (VFO) fields in the pre-recorded sector headers. These fields for example, may consist of a long sequence of identical marks and spaces that each have the shortest length allowable by the 2,10 RLL channel constraints. The VFO fields may be used to establish the proper frequency and phase of the read/write channel clock without requiring the disc 18 to maintain a constant linear velocity. There may be one or more VFO fields in a given sector header and one or more additional VFO fields within the 4704-byte sector itself. VFO fields outside the sector header may be used to check/re-capture the instantaneous clock frequency and phase.

Figure 18:
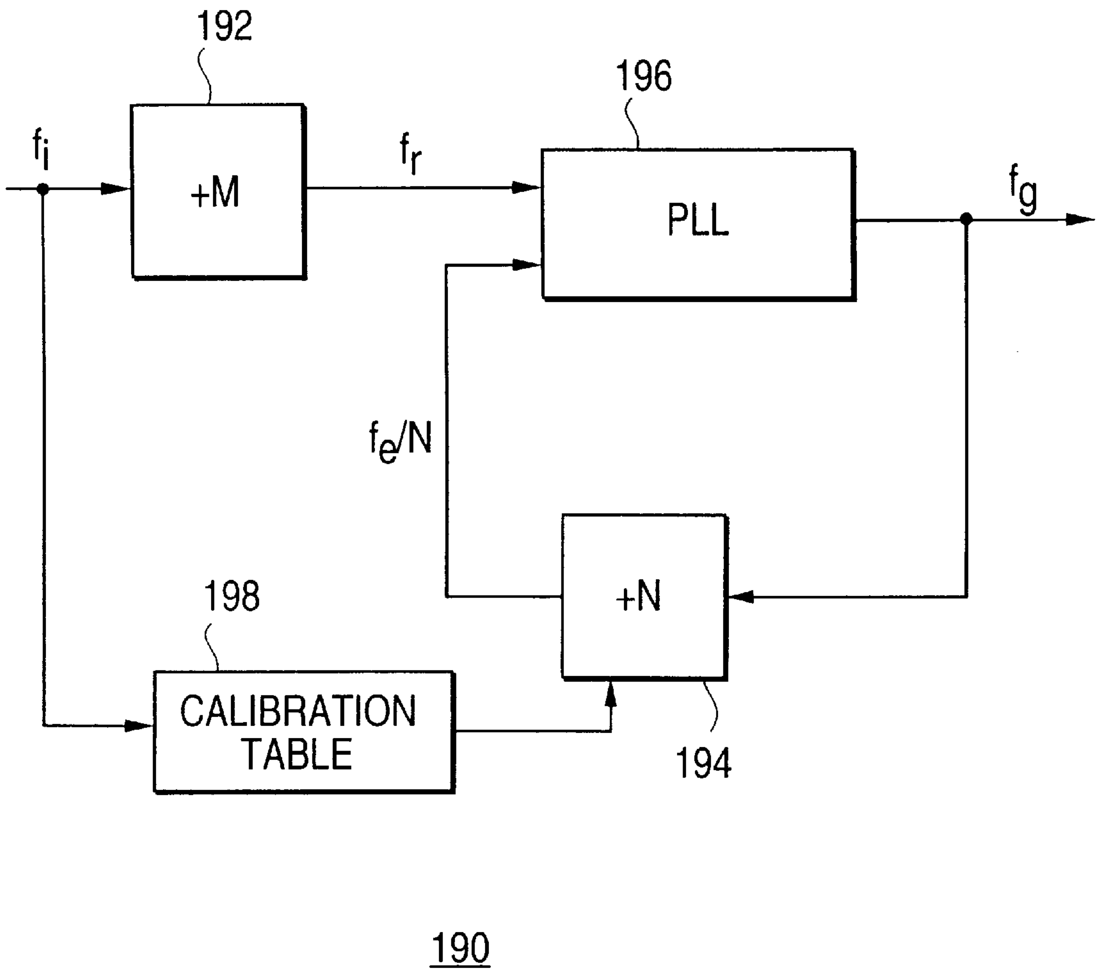
FIG. 18 illustrates a circuit for realizing a bit clock which tracks rotation speed during reading and writing.

Once the optical read/write head has moved across the disc 18 to a new sector, a new channel clock frequency is determined by reading the VFO fields. The angular velocity of the disc 18 will eventually decrease or increase (depending on whether the head is moved to a larger or a smaller radius) to maintain the constant linear velocity. Therefore, the frequency of the channel clock will need to decrease or increase from the time the first byte of the sector is read to the time when the final sector byte (byte #6272) is retrieved. The block diagram of FIG. 18 illustrates a tracking circuit 190 for changing the initially acquired (via the VFO fields) frequency with two programmable divider circuits 192 and 194. This circuit also includes a phase locked loop circuit 196 for tracking the frequency. The output frequency, fo, obeys the following relationship:

$$fo=(N/M)fi$$

where, M determines the smallest incremental change in the output frequency (the output frequency can change in fr=fi/M increments) and N determines the range of output frequencies that can be achieved. For example, if fi=6 MHz and M=50, fo={5.88, 6.00, 6.12} MHz for N={49, 50, 51}. The difference between fi (which is the recovered clock frequency at the beginning of the sector) and the nominal channel frequency (4.3218 MHz) determines whether the angular velocity of the disc 18 will decrease or increase for the remainder of the sector. Accordingly, the value of N in divider 194 can be incremented or decremented in discrete steps to change the clock frequency for the remaining bytes of the sector. The initial bit clock frequency and its rate of change profile would ideally be established for each sector while the drive reads the sector's header. The frequency varying bit clock is then used to both write new information in a sector and to read a previously recorded sector.

Alternatively, constant linear velocity writing and variable clock frequency reading could be used.

Random seek data access times can vary significantly from one CD-ROM drive to another, These data access times are strongly dependent on how quickly the drive spindle servo can change the disc rpm. Thus, the values of N and M and the rate at which N may be incremented or decremented will depend on the particular disc drive. The above parameters may change even if the same disc drive is used over time. To circumvent this limitation, each drive may be calibrated at regular intervals or even dynamically calibrated every time it is turned on. The results of the calibration can be stored in a calibration table 198 (RAM) as shown in FIG. 18. This calibration may consist of measuring some worst-case seek times as well as some intermediate seek times and determining the required rate of change in N as a function of the recovered frequency, fi.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the decoding apparatus of FIG. 11 is shown as separate components and these components can all be incorporated into a single chip that performs the decoding for both the old and the new formats. The apparatus is also shown with two RAMs and it is possible to provide only a single RAM. The interleaving of product codes is shown as column interleaving and it is possible to provide other types of interleaving such as cross column interleaving. Other formats besides the CD format and the format of the present invention can be incorporated into a multipurpose CD reader/writer chip.

TABLE APPENDIX

TABLE Ia

Information block used for calculation of CRC parity bytes Nos. 1, 2, 3 and 4.

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | ID1 | ID22 | ID3 | Res.0 | D1 | D2 | D3 | D4 | D5 | D6 | D7 | D8 | D9 | D10 |
| 2 | D25 | D26 | D21 | D28 | D29 | D30 | D31 | D32 | D33 | D34 | D35 | D36 | D37 | D38 |
| 3 | D53 | D54 | D55 | D56 | D57 | D88 | D59 | D60 | D61 | D62 | D63 | D64 | D65 | D66 |
| 4 | D81 | D82 | D83 | D84 | D85 | D86 | DB7 | D88 | D89 | D90 | D91 | D92 | D93 | D94 |
| 5 | D109 | D110 | D111 | D112 | D113 | D114 | D115 | D116 | D117 | D118 | D119 | D120 | D121 | D122 |
| 6 | D137 | D138 | D139 | D140 | D141 | D142 | D143 | D144 | D145 | D146 | D141 | D148 | D149 | D150 |
| 7 | D165 | D166 | D161 | D168 | D169 | D170 | D171 | D172 | D173 | D174 | D175 | D176 | D177 | D178 |
| 8 | D193 | D194 | D195 | D196 | D197 | D198 | D199 | D200 | D201 | D202 | D203 | D204 | D205 | D208 |
| 9 | D221 | D222 | D223 | D224 | D225 | D226 | D221 | D22B | D229 | D230 | D231 | D232 | D233 | D234 |
| 10 | D249 | D250 | D251 | D252 | D253 | D254 | D255 | D256 | D257 | D258 | D259 | D260 | D261 | D262 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 71 | D1957 | D1956 | D1959 | D1980 | D1961 | D1962 | D1963 | D1964 | D1965 | D1966 | D1967 | D1068 | D1969 | D1970 |
| 72 | D1985 | D1966 | D1987 | D1988 | D1989 | D1990 | D1991 | D1992 | D1993 | D1994 | D1995 | D1996D | 1997 | D1998 |
| 73 | D2013 | D2014 | D2015 | D2016 | D2017 | D2018 | D2019 | D2020 | D2021 | D2022 | D2023 | D2024 | D2025 | D2026 |
| 74 | D2041 | D2042 | D2043 | D2044 | D2045 | D2046 | D2047 | D2048 | 0 | 0 | 0 | 0 | 0 | 0 |

| | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| 1 | D11 | D12 | D13 | D14 | D15 | D16 | D17 | D18 | D19 | D20 | D21 | D22 | D23 | D24 |
| 2 | D39 | D40 | D41 | 042 | 043 | D44 | D45 | D46 | 047 | D48 | D19 | D50 | D51 | D52 |
| 3 | D67 | D68 | D69 | D70 | D71 | D72 | D73 | D74 | D75 | D76 | D77 | D78 | D79 | D80 |
| 4 | D95 | D96 | D97 | D98 | D99 | D100 | D101 | D102 | D103 | D104 | D105 | D106 | D107 | D108 |
| 5 | D123 | D124 | D125 | D126 | D127 | D128 | D129 | D130 | D131 | D132 | D133 | D134 | D135 | D136 |
| 6 | D151 | D152 | D153 | D154 | D155 | D156 | D157 | D158 | D159 | D160 | D161 | D162 | D163 | D164 |
| 7 | D179 | D180 | D161 | D162 | D183 | D184 | D185 | D166 | D187 | D188 | D189 | D190 | D191 | D192 |
| 8 | D201 | D208 | D209 | D210 | D211 | D212 | D213 | D214 | D215 | D216 | 0217 | D218 | D219 | D220 |
| 9 | D235 | D236 | D231 | D238 | D239 | D240 | D241 | D242 | D243 | D244 | D245 | D246 | D247 | D248 |
| 10 | D263 | D264 | D265 | D266 | D267 | D268 | D269 | D270 | D271 | D272 | D273 | D274 | D275 | D276 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 71 | D1971 | D1972 | D1973 | D1974 | D1975 | D1976 | D1977 | D1978 | D1979 | D1980 | D1961 | D1982 | D1983 | D1984 |
| 72 | D1999 | D2000 | D2001 | D2002 | D2093 | D2004 | D2005 | D2006 | D2007 | D2008 | D2009 | D2010 | D2011 | D2012 |
| 73 | D2027 | D2028 | D2029 | D2030 | D2031 | D2032 | D2033 | D2034 | D2035 | D2036 | D2037 | D2038 | D2039 | D2040 |
| 74 | 0 | 0 | 0 | 0 | 0 | 0 | 0 | 0 | 0 | 0 | 0 | 0 | 0 | |

TABLE Ib

Information block used for calculation of CRC parity bytes Nos. 5, 6, 7 and 8.

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | 0 | 0 | 0 | 0 | 0 | 0 | 0 | 0 | 0 | 0 | 0 | 0 | Res. 1 | Res. 2 |
| 2 | D2057 | D2058 | D2059 | D2080 | D2061 | D2062 | D2093 | D2064 | D2065 | D2066 | D2067 | D2068 | D2069 | D2070 |
| 3 | D2065 | D2066 | D2067 | D2068 | D2089 | D2090 | D2091 | D2092 | D2093 | D2094 | D2095 | D2096 | D2097 | D2098 |

TABLE Ib-continued

Information block used for calculation of CRC parity bytes Nos. 5, 6, 7 and 8.

| | | | | | | | | | | | | | | |
|---|---|---|---|---|---|---|---|---|---|---|---|---|---|---|
| 4 | D2113 | 02114 | D2115 | D2116 | D2111 | D2118 | D2119 | D2120 | D2121 | D2122 | D2123 | D2124 | D2125 | D2126 |
| 5 | D2141 | D2142 | D2143 | D2144 | D2145 | D2146 | D2147 | D2148 | D2149 | D2150 | D2151 | D2152 | D2153 | D2154 |
| 6 | D2169 | D217D | D2171 | D2172 | D2173 | D2174 | D2175 | D2116 | D2177 | D2118 | D2179 | D2180 | D2181 | D2182 |
| 7 | D2197 | D2198 | D2199 | D22QQ | D2201 | D2202 | D2203 | D2204 | D2205 | D2206 | D2207 | D2209 | D2209 | D2210 |
| 8 | D2225 | D2226 | D2221 | D2228 | D2229 | D2230 | D2231 | D2232 | D2233 | D2234 | D2235 | D2236 | D2237 | D2238 |
| 9 | D2253 | D2254 | D2255 | D2256 | D2257 | D2258 | D2259 | D2260 | D2261 | D2262 | D2263 | D2264 | D2265 | D2266 |
| 10 | D2281 | D2282 | D2283 | D2284 | D2285 | D2286 | D2287 | D2288 | D2289 | D2290 | D2291 | D2292 | D2293 | D2294 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 71 | D3989 | D3990 | D3991 | D3992 | D3993 | D3994 | D3995 | D3996 | D3997 | D3998 | D3999 | D4000 | D4001 | D4002 |
| 72 | D4017 | D4D18 | D4019 | D4020 | D4021 | D4022 | D4023 | D4024 | D4025 | D4026 | D4027 | D4028 | D4029 | D4030 |
| 13 | D4045 | D4046 | D4047 | D4048 | D4049 | D4050 | D4051 | D4052 | D4053 | D4054 | D4055 | D4058 | D4057 | D4058 |
| 74 | D4073 | D4074 | D4075 | D4D76 | D4077 | D4078 | D4079 | D4060 | D4081 | D4082 | D4063 | D4064 | D4065 | D4086 |

| | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| 1 | Res. 3 | Res. 4 | Res. 5 | Res. 6 | Res. 7 | Res. 8 | D2049 | D2050 | D2051 | D2052 | D2053 | D2054 | D2055 | D2056 |
| 2 | D2971 | D2072 | D2073 | D2074 | D2075 | D2076 | D2077 | D2078 | D2079 | D2080 | D2081 | D2082 | D2083 | D2064 |
| 3 | D2099 | D2100 | D2101 | D2102 | D2103 | D2104 | D2105 | D2106 | D2107 | D2108 | D2109 | D2110 | D2111 | D2112 |
| 4 | D2127 | D2128 | D2129 | D2130 | D2131 | D2132 | D2133 | D2134 | D2135 | D2136 | D2137 | D2138 | D2139 | D2140 |
| 5 | D2155 | D2156 | D2157 | D2158 | D2159 | D2160 | D2161 | D2162 | D2163 | D2164 | D2165 | D2166 | D2167 | D2168 |
| 6 | D2183 | D2184 | D2185 | D2186 | D2187 | D2188 | D2189 | D2190 | D2191 | D2192 | D2193 | D2194 | D2195 | D2196 |
| 7 | D2211 | D2212 | D2213 | D2214 | D2215 | D2216 | D2217 | D2218 | D2219 | D2220 | D2221 | D2222 | D2223 | D2224 |
| 8 | D2239 | D2240 | D2241 | D2242 | D2243 | D2244 | D2245 | D2246 | D2247 | D2248 | D2249 | D2250 | D2251 | D2252 |
| 9 | D2267 | D2268 | D2269 | D2270 | D2271 | D2272 | D2273 | D2274 | D2275 | D2276 | D2277 | D2278 | D2279 | D2280 |
| 10 | D2295 | D2296 | D2291 | D2298 | D2299 | D2300 | D2301 | D2302 | D2303 | D2304 | D2305 | D2306 | D2307 | D2308 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 71 | D4043 | D4004 | D4005 | D4006 | D4007 | D4008 | D4009 | D4010 | D4011 | D4012 | D4013 | D4014 | D4015 | D4016 |
| 72 | D4031 | D4032 | D4033 | D4034 | D4035 | D4036 | D4037 | D4038 | D4039 | D4040 | D4041 | D4042 | D4043 | D4044 |
| 73 | D4059 | D4060 | D4061 | D4062 | D4063 | D4064 | D4065 | D4066 | D4067 | D4068 | D4069 | D4070 | D4071 | D4072 |
| 74 | D4087 | D4088 | D4089 | D4090 | D4091 | D4092 | D4093 | D4094 | D4095 | D4096 | 0 | 0 | 0 | 0 |

TABLE IIa

Information block used for calculation of sector ECC parity bytes.

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | ID1 | 102 | 103 | Res. 0 | D1 | D2 | D3 | D4 | D5 | D6 | D7 | D8 | D9 | D10 |
| 2 | D25 | D26 | D27 | D28 | D29 | D30 | D31 | D32 | D33 | D34 | D35 | D36 | D37 | D36 |
| 3 | D53 | D54 | D55 | D58 | D57 | D58 | D59 | 060 | D61 | D62 | D63 | D64 | D65 | D66 |
| 4 | D81 | D82 | D83 | D84 | D85 | D86 | D87 | D88 | D89 | D99 | D91 | D92 | D93 | D94 |
| 5 | D109 | D110 | D111 | D112 | D113 | D114 | D115 | D118 | D111 | D118 | D119 | D120 | D121 | D122 |
| 6 | D137 | D138 | D139 | D140 | D141 | D142 | D143 | D144 | D145 | D148 | D147 | D148 | D149 | D150 |
| 7 | D165 | D166 | D161 | D188 | D189 | D170 | D111 | D172 | D173 | D174 | D175 | D176 | D177 | D178 |
| 8 | D193 | D194 | D195 | D196 | D197 | D198 | D199 | D200 | D201 | D202 | D203 | D204 | D205 | D296 |
| 9 | D221 | D222 | D223 | D224 | D225 | D228 | D227 | D228 | D229 | D230 | D231 | D232 | D233 | D234 |
| 10 | D249 | D250 | D251 | D252 | D253 | D254 | D255 | D258 | D257 | D258 | D259 | D260 | D261 | D282 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 71 | D1957 | D1958 | D1959 | D1960 | D1961 | D1952 | D1963 | D1964 | D1965 | D1966 | D1967 | D1068 | D1969 | D1970 |
| 72 | D1985 | D1986 | D1987 | D1988 | D1989 | D1990 | D1991 | D1992 | D1993 | D1994 | D1995 | D1995 | D1997 | D1998 |
| 73 | D2013 | D2014 | D2015 | D2016 | D2017 | D2018 | D2019 | D2020 | D2021 | D2022 | D2023 | D2024 | D2025 | D2026 |
| 74 | D2041 | D2042 | D2043 | D2044 | D2045 | D2048 | D2047 | D2048 | CRC1 | CRC2 | CRC3 | CRC4 | Res. 1 | Res. 2 |
| 75 | D2057 | D2058 | D2059 | D2060 | D2081 | D2962 | D2083 | D2054 | D2085 | D2086 | D20B7 | D2066 | D20B9 | 02070 |
| 76 | D2085 | D2086 | D2087 | D2088 | D2089 | D2090 | D2091 | D2992 | 02093 | D2994 | D2095 | D2096 | D2097 | 02998 |
| 77 | D2113 | D2114 | D2115 | D2116 | D2117 | D2118 | D2119 | D2120 | D2121 | D2122 | D2123 | D2124 | D2125 | 02126 |
| 78 | D2141 | D2142 | D2143 | D2144 | D2145 | D2148 | D2147 | D2148 | D2149 | D2150 | D2151 | D2152 | D2153 | 02154 |
| 79 | D2169 | D2170 | D2171 | D2172 | D2173 | D2174 | D2175 | D9176 | D2177 | D2178 | D2179 | D2180 | 02181 | 021B2 |
| 80 | D2197 | D2198 | D2199 | D2200 | D2201 | D2202 | D2203 | D2204 | D2205 | D2208 | D2207 | D2208 | D2209 | D22la |
| 81 | D2225 | D2226 | D2227 | D2228 | D2229 | D2230 | D2231 | D2232 | D2233 | D2234 | D2235 | D2236 | D2237 | D2236 |
| 82 | D2253 | D2254 | D2255 | D2258 | D2257 | D2258 | D2289 | D2280 | D2281 | D2262 | D2283 | D2264 | D2265 | D2286 |
| 83 | D2281 | D2282 | D2283 | D2284 | D2285 | D2286 | D2287 | D2288 | D2289 | D2290 | D2291 | D2292 | D2293 | D2294 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 144 | D3989 | D3990 | D9991 | D3992 | D3993 | D3994 | D3995 | D3998 | D3997 | D3998 | D3999 | D4000 | D4001 | D4002 |
| 145 | D4017 | D4018 | D4019 | D4020 | D4021 | D4022 | D4023 | D4024 | D4025 | D4026 | D4027 | D4028 | D4029 | D4030 |

TABLE IIa-continued

| Information block used for calculation of sector ECC parity bytes. | | | | | | | | | | | | | | |
|---|---|---|---|---|---|---|---|---|---|---|---|---|---|---|
| 146 | D4045 | D4046 | D4047 | D4048 | D4049 | D4050 | D4051 | D4052 | D4053 | D4054 | D4055 | D4056 | D4057 | D4058 |
| 147 | D4073 | D4074 | D4075 | D4076 | D4077 | D4078 | D4079 | D4080 | D4081 | D4082 | D4083 | D4084 | D4085 | D4086 |
| | 15 | 16 | 17 | 18 | 19 | 20 | 21 | 22 | 23 | 24 | 25 | 26 | 27 | 28 |
| 1 | D11 | D12 | D13 | D14 | D15 | D16 | D17 | D18 | D19 | D20 | D21 | D22 | D23 | D24 |
| 2 | D39 | D40 | D41 | D42 | 043 | D44 | D45 | D46 | D47 | 048 | D49 | D50 | D51 | D52 |
| 3 | D67 | D68 | D69 | D70 | D71 | D72 | D73 | D74 | D75 | D76 | D77 | D78 | D79 | D80 |
| 4 | D95 | D95 | D97 | D98 | D99 | D100 | D101 | D102 | D103 | D104 | D105 | D106 | D107 | D108 |
| 5 | D123 | D124 | D125 | D126 | D127 | D128 | D129 | D136 | D131 | D132 | D133 | D134 | D135 | D136 |
| 6 | D151 | D152 | D153 | D154 | D15S | D156 | D157 | D158 | D159 | D160 | D161 | D162 | D163 | D164 |
| 7 | D179 | D180 | D181 | D182 | D183 | D184 | D185 | D186 | D187 | D188 | D189 | D192 | D191 | D192 |
| 8 | D207 | D208 | D209 | D210 | D911 | D212 | D213 | D214 | D215 | D216 | D217 | D218 | D219 | D220 |
| 9 | D235 | D236 | D237 | D236 | D239 | D240 | D241 | D242 | D243 | D244 | D245 | D246 | D247 | D248 |
| 10 | D263 | D264 | D265 | D266 | D267 | D288 | D269 | D270 | D271 | D272 | D273 | D274 | D275 | D276 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 71 | D1971 | D1972 | D1913 | D1974 | D1975 | D1976 | D1977 | D1978 | D1979 | D1980 | D1981 | D1982 | D1963 | D1984 |
| 72 | D1999 | D2000 | D2001 | D2002 | D2003 | D2004 | D2005 | D2096 | 02007 | D2008 | D2009 | D2010 | D2011 | D2012 |
| 73 | D2027 | D2028 | D2029 | D2030 | D2031 | D2032 | D2033 | D2034 | 02035 | 02036 | D2037 | D2038 | D2039 | D2040 |
| 74 | Res. 3 | Res. 4 | Res. 5 | Res. 8 | Res.7 | Res. 8 | D2049 | D2050 | D2051 | D2052 | D2053 | D2054 | D2055 | D2056 |
| 75 | D2071 | D2072 | D2073 | D2074 | D2075 | D2076 | D2077 | D2078 | D2079 | D2080 | D2081 | D2082 | D2083 | D2084 |
| 76 | D2099 | D2100 | D2101 | D2102 | D2103 | D2104 | D2105 | D2106 | D2107 | D2108 | D2109 | D2110 | D2111 | D2112 |
| 77 | D2127 | D2128 | D2129 | D2130 | D2131 | D2132 | D2133 | D2134 | D2135 | D2136 | D2131 | D2136 | D2139 | D2140 |
| 78 | D2155 | D2158 | D2157 | D2158 | D2159 | D2160 | D2161 | D2182 | D2163 | D2164 | D2165 | D2166 | D2187 | D2168 |
| 79 | D2183 | D2184 | D2185 | D2188 | D2187 | D2186 | D2189 | D2190 | D2191 | D2192 | D2193 | D2194 | D2195 | D2195 |
| 80 | D2211 | D2212 | D2213 | D2214 | D2215 | D2216 | D2217 | D2218 | D2219 | 02220 | D2221 | D2222 | D2223 | D2224 |
| 81 | D2239 | D2240 | D2241 | D2242 | D2243 | D2244 | D2245 | D2245 | D2247 | 02248 | D2249 | D2258 | D2251 | D2252 |
| 82 | D2267 | D2268 | D2289 | D2270 | D2271 | D2272 | D2273 | D2274 | D2275 | D2276 | D2277 | D2278 | D2279 | 02280 |
| 83 | D2295 | D2296 | D2297 | D2298 | D2299 | D2390 | D2301 | D2302 | d2303 | d2304 | D2305 | D2306 | D23-7 | D2308 |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| 144 | D4003 | D4094 | D4005 | D4005 | D4007 | D4008 | D4009 | D4010 | D4011 | D1012 | D4013 | D4014 | D4015 | D4018 |
| 145 | D4031 | D4032 | D4033 | D4034 | D4035 | D4038 | D4037 | D4038 | D4039 | D4040 | D4041 | D4042 | D4043 | D4044 |
| 146 | D4059 | D4060 | D4061 | D4062 | D4063 | D4054 | D4065 | D4086 | D4067 | D4068 | D4069 | D4070 | D4071 | D4072 |
| 147 | D4088 | D4089 | D4090 | D4091 | D4092 | D4093 | D4094 | D4095 | D4095 | CRC5 | CRC6 | CRC7 | CRC8 | |

TABLE IIIA

1st logical sub-block CD-DASD Mode 01 sector.

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 1 | ID1 | ID2 | ID3 | Res. 0 | D1 | D2 | D3 | D4 | D5 | D6 | D7 | D8 | D9 | D10 | D11 | D12 | D13 | D14 | D15 | D16 | D17 | D18 | D19 |
| 2 | D20 | D21 | D22 | D23 | D24 | D25 | D28 | D27 | D28 | D29 | D30 | D31 | D32 | D33 | D34 | D35 | D36 | D31 | D38 | D39 | D40 | D41 | D42 |
| 3 | D43 | D44 | D45 | D46 | D47 | D48 | D49 | D50 | D51 | D52 | D53 | D54 | D55 | D56 | D57 | D58 | D59 | D60 | D61 | D62 | D63 | D64 | D65 |
| 4 | D66 | D67 | D68 | D69 | D70 | D71 | D72 | D73 | D74 | D75 | D76 | D77 | D78 | D79 | D80 | D81 | D82 | D83 | D84 | D85 | D85 | D87 | D88 |
| 5 | D89 | D90 | D91 | D92 | D93 | D94 | D95 | D96 | D97 | D98 | D99 | D100 | D101 | D102 | D103 | D104 | D105 | D106 | D107 | D108 | D109 | D110 | D111 |
| 6 | D112 | D113 | D114 | D115 | D118 | D117 | D118 | D119 | D120 | D121 | D122 | D123 | D124 | D125 | D126 | D127 | D128 | D129 | D130 | D131 | D132 | D133 | D134 |
| 7 | D135 | D136 | D137 | D138 | D139 | D140 | D141 | D142 | D143 | D144 | D145 | D146 | D147 | D148 | D149 | D150 | D151 | D152 | D153 | D154 | D155 | D156 | D157 |
| 8 | D158 | D159 | D160 | D161 | D162 | D163 | D164 | D165 | D166 | D167 | D168 | D169 | D170 | D171 | D172 | D173 | D174 | D175 | D176 | D177 | D178 | D179 | D180 |
| 9 | D181 | D182 | D183 | D184 | D185 | D186 | D187 | D188 | D189 | D190 | D191 | D192 | D193 | D194 | D195 | D196 | D197 | D198 | D199 | D200 | D201 | D202 | D203 |
| 10 | D204 | D205 | D206 | D207 | D208 | D209 | D210 | D211 | D212 | D213 | D214 | D215 | D216 | D217 | D218 | D219 | D220 | D221 | D222 | D223 | D224 | D225 | D226 |
| 11 | D227 | D228 | D229 | D230 | D231 | D232 | D233 | D234 | D235 | D236 | D237 | D238 | D239 | D240 | D241 | D242 | D243 | D244 | D245 | D246 | D247 | D248 | D249 |
| 12 | D250 | D251 | D252 | D253 | D254 | D255 | D258 | D257 | D258 | D259 | D260 | D261 | D262 | D263 | D264 | D265 | D266 | D267 | D268 | D269 | D270 | D271 | D272 |
| 13 | D273 | D274 | D275 | D276 | D277 | D278 | D279 | D260 | D281 | D282 | D283 | D284 | D285 | D286 | D287 | D288 | D289 | D290 | D291 | D292 | D293 | D294 | D295 |
| 14 | D296 | D297 | D298 | D299 | D300 | D301 | D302 | D303 | D304 | D305 | D306 | D307 | D308 | D309 | D310 | D311 | D312 | D313 | D314 | D315 | D316 | D317 | D318 |
| 15 | D319 | D320 | D321 | D322 | D323 | D324 | D325 | D326 | D327 | D328 | D329 | D330 | D331 | D332 | D333 | D334 | D335 | D336 | D337 | D338 | D339 | D340 | D341 |
| 18 | D342 | D343 | D344 | D345 | D346 | D347 | D348 | D349 | D350 | D351 | D352 | D353 | D354 | D355 | D356 | D357 | D358 | D359 | D360 | D361 | D362 | D363 | D384 |
| 17 | D365 | D368 | D367 | D368 | D359 | D370 | D371 | D372 | D373 | D374 | D375 | D378 | D377 | D378 | D379 | D380 | D381 | D382 | D383 | D384 | D385 | D388 | D387 |
| 18 | D388 | D389 | D390 | D391 | D392 | D393 | D394 | D395 | D396 | D397 | D398 | D399 | D400 | D401 | D402 | D403 | D404 | D405 | D406 | D407 | D408 | D409 | D410 |
| 19 | D411 | D412 | D413 | D414 | D415 | D416 | D417 | D418 | D419 | D420 | D421 | D422 | D423 | D424 | D425 | D426 | D427 | D428 | D429 | D430 | D431 | D432 | D433 |
| 20 | D434 | D435 | D436 | D437 | D438 | D439 | D440 | D441 | D442 | D443 | D444 | D445 | D446 | D447 | D448 | D449 | D450 | D451 | D452 | D453 | D454 | D455 | D456 |
| 21 | D457 | D458 | D459 | D460 | D461 | D462 | D463 | D464 | D465 | D466 | D467 | D468 | D469 | D470 | D471 | D472 | D473 | D474 | D475 | D476 | D477 | D478 | D479 |
| 22 | D480 | D481 | D482 | D483 | D484 | D485 | D486 | D487 | D488 | D489 | D490 | D491 | D492 | D493 | D494 | D495 | D496 | D497 | D498 | D499 | D500 | D501 | D502 |
| 23 | D503 | D504 | D505 | D506 | D507 | D508 | D509 | D510 | D511 | D512 | D513 | D514 | D515 | D516 | D517 | D518 | D519 | D520 | D521 | D522 | D523 | D524 | D525 |
| 24 | D526 | D527 | D528 | D529 | D530 | D531 | D532 | D533 | D534 | D535 | D536 | D537 | D538 | D539 | D540 | D541 | D542 | D543 | D544 | D545 | D546 | D547 | D548 |
| 25 | D549 | D550 | D551 | D552 | D553 | D554 | D555 | D556 | D557 | D558 | D559 | D560 | D561 | D562 | D563 | D564 | D565 | D566 | D567 | D568 | D569 | D570 | D571 |
| 26 | D572 | D573 | D574 | D575 | D576 | D577 | D578 | D579 | D580 | D581 | D582 | D583 | D584 | D585 | D586 | D587 | D588 | D589 | D590 | D591 | D592 | D593 | D594 |
| 27 | D595 | D596 | D597 | D598 | D599 | D600 | D601 | D602 | D603 | D604 | D605 | D606 | D607 | D608 | D609 | D610 | D611 | D612 | D613 | D614 | D615 | D616 | D617 |
| 28 | D618 | D619 | D620 | D621 | D622 | D623 | D624 | D625 | D626 | D627 | D628 | D629 | D626 | D631 | D632 | D633 | D634 | D635 | D636 | D637 | D638 | D639 | D640 |

TABLE IIIb

2nd logical suub-block of CD-DASD Mode 01 sector.

| | 24 | 26 | 26 | 27 | 28 | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|---|---|---|---|---|
| 1 | D641 | D642 | D643 | D644 | D645 | D646 | D647 | D648 | D649 | D650 | D651 | D652 | D653 | D654 | D655 | D656 | D657 | D658 | D659 | D663 | D661 | D662 | D663 |
| 2 | D664 | D665 | D666 | D667 | D666 | D689 | D670 | D671 | D672 | D673 | D674 | D675 | D676 | D677 | D676 | D679 | D680 | D681 | D862 | D863 | D864 | D665 | D666 |
| 3 | D667 | D686 | D669 | D690 | D691 | D692 | D693 | D694 | D695 | D696 | D697 | D698 | D699 | D700 | D701 | D702 | D703 | D704 | D705 | D708 | D707 | D708 | D709 |
| 4 | D710 | D711 | D112 | D713 | D714 | D715 | D716 | D717 | D718 | D719 | D720 | D721 | D722 | D723 | D724 | D725 | D726 | D727 | D728 | D729 | D730 | D731 | D732 |
| 5 | D733 | D734 | D735 | D736 | D737 | D738 | D739 | D740 | D741 | D742 | D743 | D744 | D745 | D746 | D747 | D748 | D749 | D750 | D751 | D752 | D753 | D754 | D755 |
| 6 | D756 | D757 | D756 | D759 | D780 | D761 | D762 | D763 | D764 | D765 | D786 | D767 | D768 | D769 | D770 | D771 | D772 | D773 | D774 | D775 | D776 | D777 | D778 |
| 7 | D779 | D780 | D781 | D782 | D763 | D764 | D765 | D786 | D787 | D786 | D789 | D790 | D791 | D792 | D793 | D794 | D795 | D796 | D797 | D798 | D799 | D800 | D801 |
| 6 | D802 | D803 | D804 | D805 | D806 | D807 | D808 | D809 | D810 | D811 | D812 | D813 | D814 | D815 | D816 | D817 | D818 | D819 | D820 | D821 | D822 | D823 | D824 |
| 9 | D825 | D826 | D827 | D828 | D829 | D830 | D831 | D832 | D833 | D834 | D835 | D836 | D837 | D838 | D839 | D840 | D841 | D842 | D843 | D844 | D845 | D846 | D847 |
| 10 | D848 | D849 | D850 | D851 | D852 | D853 | D854 | D855 | D856 | D857 | D858 | D859 | D860 | D861 | D862 | D863 | D864 | D865 | D866 | D867 | D868 | D869 | D870 |
| 11 | D871 | D872 | D873 | D874 | D875 | D876 | D877 | D878 | D879 | D880 | D881 | D882 | D883 | D884 | D885 | D886 | D887 | D886 | D889 | D890 | D891 | D892 | D893 |
| 12 | D894 | D895 | D696 | D697 | 0896 | 0899 | D900 | D901 | D902 | D903 | D904 | D905 | D906 | D907 | D906 | D909 | D910 | D911 | D912 | D913 | D914 | D915 | D916 |
| 13 | D917 | D918 | D819 | D920 | D921 | D922 | D923 | D924 | D925 | D926 | D927 | D928 | D929 | D930 | D931 | D932 | D933 | D934 | D935 | D936 | D937 | D938 | D939 |
| 14 | D940 | D941 | D942 | D943 | D944 | D945 | D946 | D947 | D948 | D949 | D950 | D951 | D952 | D953 | D954 | D955 | D956 | D957 | D958 | D959 | D960 | D961 | D962 |
| 15 | D963 | D964 | D965 | D966 | D967 | D966 | D969 | D970 | D971 | D972 | D933 | D974 | D975 | D976 | D977 | D978 | D979 | D980 | D981 | D982 | D983 | D984 | D985 |
| 16 | D986 | D967 | D988 | D989 | D990 | D991 | D992 | D993 | D994 | D995 | D996 | D997 | D996 | D999 | D1000 | D1001 | D1002 | D1003 | D1004 | D1005 | D1006 | D1007 | D1008 |
| 17 | D1009 | D1010 | D1011 | D1012 | D1013 | D1014 | D1015 | D1016 | D1017 | D1018 | D1019 | D1020 | D1021 | D1022 | D1023 | D1024 | D1025 | D1026 | D1027 | D1028 | D1029 | D1030 | D1031 |
| 18 | D1032 | D1033 | D1034 | D1035 | D1036 | D1037 | D1038 | D1039 | D1040 | D1041 | D1042 | D1043 | D1044 | D1045 | D1046 | D1047 | D1046 | D1049 | D1050 | D1051 | D1052 | D1053 | D1054 |
| 19 | D1055 | D1056 | D1057 | D1058 | D1059 | D1060 | D1061 | D1062 | D1063 | D1064 | D1065 | D1066 | D1067 | D1068 | D1069 | D1010 | D1011 | D1012 | D1073 | D1074 | D1015 | D1076 | D1077 |
| 20 | D1078 | D1079 | D1080 | D1081 | D1082 | D1083 | D1084 | D1085 | D1086 | D1087 | D1088 | D1089 | D1090 | D1091 | D1092 | D1093 | D1094 | D1095 | D1096 | D1097 | D1098 | D1099 | D1100 |
| 21 | D1101 | D1102 | D1103 | D1104 | D1105 | D1106 | D1107 | D1108 | D1109 | D1110 | D1111 | D1112 | D1113 | D1114 | D1115 | D1116 | D1117 | D1118 | D1119 | D1120 | D1121 | D1122 | D1123 |
| 22 | D1124 | D1125 | D1126 | D1127 | D1128 | D1129 | D1130 | D1131 | D1132 | D1133 | D1134 | D1135 | D1136 | D1137 | D1138 | D1139 | D1140 | D1141 | D1142 | D1143 | D1144 | D1145 | D1146 |
| 23 | D1147 | D1148 | D1149 | D1150 | D1151 | D1152 | D1153 | D1154 | D1155 | D1156 | D1157 | D1158 | D1159 | D1160 | D1161 | D1162 | D1163 | D1164 | D1165 | D1166 | D1167 | D1168 | D1169 |
| 24 | D1170 | D1171 | D1172 | D1173 | D1174 | D1175 | D1176 | D1117 | D1178 | D1179 | D1180 | D1181 | D1182 | D1183 | D1184 | D1185 | D1186 | D1187 | D1188 | D1189 | D1190 | D1191 | D1192 |
| 25 | D1193 | D1194 | D1195 | D1196 | D1191 | D1198 | D1199 | D1290 | D1201 | D1202 | D1203 | D1204 | D1205 | D1206 | D1207 | D1206 | D1209 | D1210 | D1211 | D1212 | D1213 | D1214 | D1215 |
| 26 | D1216 | D1217 | D1218 | D1219 | D1220 | D1221 | D1222 | D1223 | D1224 | D1225 | D1226 | D1227 | D1228 | D1229 | D1230 | D1231 | D1232 | D1233 | D1234 | D1235 | D1236 | D1237 | D1238 |
| 27 | D1239 | D1240 | D1241 | D1242 | D1243 | D1244 | D1245 | D1246 | D1247 | D1248 | D1249 | D1253 | D1251 | D1252 | D1253 | D1254 | D1255 | D1256 | D1257 | D1258 | D1259 | D1280 | D1281 |
| 28 | D1262 | D1263 | D1264 | D1265 | D1268 | D1267 | D1268 | D1269 | D1270 | D1271 | D1272 | D1273 | D1274 | D1275 | D1276 | D1277 | D1278 | D1279 | D1280 | D1281 | D1262 | D1263 | D1284 |

TABLE IIIc

3rd logical suub-block of CD-DASD Mode 01 sector.

| | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 |
|---|---|---|---|---|---|---|---|---|---|---|---|---|---|---|---|---|---|---|---|---|---|---|---|
| 1 | D1285 | D1288 | D1287 | D1288 | D1289 | D1290 | D1291 | D1292 | D1293 | D1294 | D1295 | D1296 | D1297 | D1298 | D1299 | D1390 | D1301 | D1302 | D1303 | D1304 | D1305 | D1306 | D1307 |
| 2 | D1358 | D1309 | D1310 | D1311 | D1312 | D1313 | D1314 | D1315 | D1318 | D1317 | D1318 | D1319 | D1320 | D1321 | D1322 | D1323 | D1324 | D1325 | D1326 | D1327 | D1328 | D1329 | D1330 |
| 3 | D1331 | D1332 | D1333 | D1334 | D1335 | D1336 | D1337 | D1338 | D1339 | D1340 | D1341 | D1342 | D1343 | D1344 | D1345 | D1346 | D1347 | D1348 | D1349 | D1350 | D1351 | D1352 | D1353 |
| 4 | D1354 | D1355 | D1358 | D1357 | D1358 | D1359 | D1360 | D1381 | D1362 | D1363 | D1364 | D1365 | D1388 | D1357 | D1368 | D1389 | D1310 | D1371 | D1372 | D1373 | D1374 | D1375 | D1376 |
| 5 | D1377 | D1378 | D1319 | D1380 | D1381 | D1382 | D1383 | D1364 | D1385 | D1388 | D1387 | D1388 | D1389 | D1390 | D1391 | D1392 | D1393 | D1394 | D1395 | D1396 | D1397 | D1398 | D1399 |
| 6 | D1400 | D1401 | D1402 | D1403 | D1404 | D1405 | D140S | D1407 | D1408 | D1409 | D1410 | D1411 | D1412 | D1413 | D1414 | D1415 | D1418 | D1417 | D1418 | D1419 | D1420 | D1421 | D1422 |
| 7 | D1423 | D1424 | D1425 | D1426 | D1427 | D1428 | D1429 | D1430 | D1431 | D1432 | D1433 | D1434 | D1435 | D1436 | D1437 | D1438 | D1439 | D1440 | D1441 | D1442 | D1443 | D1444 | D144S |
| 8 | D1448 | D1441 | D1448 | D1449 | D1456 | D14S1 | D1452 | D1453 | D1454 | D1455 | D1456 | D1451 | D1458 | D1459 | D1460 | D1461 | D1462 | D1463 | D1484 | D1465 | D1466 | D1467 | D1468 |
| 9 | D1469 | D1410 | D1411 | D1472 | D1473 | D1474 | D1475 | D1476 | D1477 | D1478 | D1479 | D1480 | D1481 | D1482 | D1483 | D1484 | D1485 | D1486 | D1487 | D1488 | D1489 | D1490 | D1491 |
| 10 | D1492 | D1493 | D1494 | D1495 | D1496 | D1497 | D1498 | D1499 | D1500 | D1501 | D1802 | D1503 | D1504 | D1505 | D1506 | D1507 | D1508 | D1509 | D1510 | D1511 | D1512 | D1513 | D1514 |
| 11 | D1515 | D1516 | D1517 | D1518 | D1519 | D1520 | D1521 | D1522 | D1523 | D1524 | D1525 | D1526 | D1527 | D1528 | D1529 | D1530 | D1531 | D1532 | D1533 | D1534 | D1535 | D1536 | D1537 |
| 12 | D1538 | D1539 | D1540 | D1541 | D1542 | D1543 | D1544 | D1546 | D1546 | D1547 | D1548 | D1549 | D1550 | D1551 | D1552 | D1553 | D1554 | D1555 | D1556 | D1557 | D1558 | D1559 | D1560 |
| 13 | D1561 | D1582 | D1583 | D1584 | D1585 | D1566 | D1567 | D1568 | D1569 | D1570 | D1571 | D1572 | D1573 | D1574 | D1575 | D1576 | D1577 | D1578 | D1579 | D1580 | D1581 | D1582 | D1583 |
| 14 | D1584 | D1585 | D1585 | D1587 | D1588 | D1589 | D1590 | D1591 | D1592 | D1593 | D1594 | D1595 | D1596 | D1597 | D1598 | D1599 | D1600 | D1601 | D1802 | D1803 | D1694 | D1805 | D1806 |
| 15 | D1607 | D1808 | D1809 | D1610 | D1611 | D1612 | D1613 | D1614 | D1815 | D1616 | D1617 | D1618 | D1619 | D1620 | D1621 | D1622 | D1623 | D1624 | D1625 | D1626 | D1627 | D1628 | D1629 |
| 16 | D1630 | D1631 | D1632 | D1633 | D1634 | D1635 | D1636 | D1631 | D1638 | D1639 | D1840 | D1641 | D1642 | D1643 | D1644 | D1645 | D1646 | D1647 | D1648 | D1649 | D1650 | D1651 | D1652 |
| 17 | D1653 | D1654 | D1656 | D1656 | D1651 | D1658 | D1659 | D1680 | D1661 | D1662 | D1663 | D1664 | D1665 | D1666 | D1667 | D1658 | D1669 | D1610 | D1671 | D1672 | D1673 | D1674 | D1675 |
| 18 | D1676 | D1677 | D1618 | D1879 | D1689 | D1681 | D1682 | D1683 | D1684 | D1685 | D1686 | D1687 | D1688 | D1689 | D1690 | D1691 | D1692 | D1693 | D1694 | D1695 | D1696 | D1697 | D1698 |
| 19 | D1699 | D1700 | D1701 | D1102 | D1703 | D1184 | D1105 | D1706 | D1707 | D1708 | D1709 | D1710 | D1711 | D1712 | D1713 | D1714 | D1715 | D1116 | D1717 | D1718 | D1719 | D1720 | D1721 |
| 20 | D1122 | D1723 | D1724 | D1125 | D1728 | D1127 | D1728 | D1729 | D1730 | D1731 | D1732 | D1733 | D1734 | D1735 | D1136 | D1737 | D1738 | D1739 | D1740 | D1741 | D1142 | D1743 | D1744 |
| 21 | D1745 | D1746 | D1747 | D1148 | D1749 | D1750 | D1751 | D1152 | D1753 | D1754 | D1755 | D1756 | D1757 | D1758 | D1759 | D1780 | D1761 | D1762 | D1763 | D1764 | D1765 | D1786 | D1767 |
| 22 | D1768 | D1769 | D1770 | D1771 | D1772 | D1773 | D1774 | D1775 | D1176 | D1777 | D1778 | D1779 | D1780 | D1781 | D1782 | D1783 | D1784 | D1785 | D1786 | D1787 | D1768 | D1789 | D1790 |
| 23 | D1791 | D1192 | D1793 | D1794 | D1795 | D1796 | D1797 | D1198 | D1799 | D1806 | D1801 | D1802 | D1803 | D1834 | D1805 | D1806 | D1807 | D1808 | D1809 | D1810 | D1811 | D1812 | D1813 |
| 24 | D1814 | D1815 | D1816 | D1817 | D1818 | D1819 | D1820 | D1821 | D1822 | D1823 | D1824 | D1825 | D1826 | D1827 | D1828 | D1829 | D1830 | D1831 | D1632 | D1633 | D1834 | D1835 | D1836 |
| 25 | D1837 | D1838 | D1839 | D1640 | D1841 | D1642 | D1643 | D1844 | D1845 | D1848 | D1847 | D1848 | D1649 | D1650 | D1BS1 | D1852 | D1853 | D1854 | D1855 | D1856 | D1857 | D1858 | D1859 |
| 26 | D1880 | D1861 | D1862 | D1863 | D1864 | D1665 | D1666 | D1667 | D1888 | D1869 | D1870 | D1871 | D1872 | D1873 | D1874 | D1875 | D1876 | D1877 | D1878 | D1879 | D1680 | D1881 | D1882 |
| 27 | D1883 | D1884 | D1885 | D1888 | D1887 | D1888 | D1689 | D1890 | D1891 | D1892 | D1893 | 01894 | D1895 | D1896 | D1897 | D1898 | D1899 | D1990 | D1901 | D1902 | D1903 | D1904 | D1905 |
| 28 | D1908 | D1907 | D1908 | D1909 | D1910 | D1911 | D1912 | D1913 | D1914 | D1915 | D1916 | D1917 | D1918 | D1919 | D1920 | D1921 | D1922 | D1923 | D1924 | D1925 | D1926 | D1921 | D1928 |

TABLE IIId

4th logical suub-block of CD-DASD Mode 01 sector.

| | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 |
|---|---|---|---|---|---|---|---|---|---|---|---|---|---|---|---|---|---|---|---|---|---|---|---|
| 1 | D1929 | D1933 | D1931 | D1932 | D1933 | D1934 | D1935 | D1936 | D1937 | D1938 | D1939 | D1940 | D1941 | D1942 | D1943 | D1944 | D1945 | D1945 | D1947 | D1948 | D1949 | D1950 | D1951 |
| 2 | D1952 | D1953 | D1954 | D1955 | D1956 | D1957 | D1958 | D1959 | D1980 | D1961 | D1962 | D1963 | D1964 | D1965 | D1965 | D1967 | D1968 | D1969 | D1910 | D1971 | D1972 | D1973 | D1974 |
| 3 | D1915 | D1976 | D1977 | D1978 | D1979 | D1980 | D1981 | D1982 | D1983 | D1984 | D1985 | D1986 | D1987 | D1988 | D1989 | D1993 | D1991 | D1992 | D1993 | D1994 | D1995 | D1996 | D1997 |
| 4 | D1998 | D1999 | D2000 | D2001 | D2002 | D2003 | D2004 | D2005 | D2006 | D2007 | D2058 | D2009 | D2010 | D2011 | D2012 | D2013 | D2014 | D2015 | D2016 | D2017 | D2018 | D2019 | D2020 |
| 5 | D2021 | D2022 | D2023 | D2024 | D2025 | D2026 | D2027 | D2028 | D2029 | D2930 | D2031 | D2032 | D2033 | D2034 | D2035 | D2035 | D2037 | D2038 | D2039 | D2040 | D2041 | D2042 | D2043 |
| 6 | D2044 | D2945 | D2048 | D2047 | D2048 | CRC1 | CRC2 | CRC3 | CRC4 | 3P1 | 3P2 | 3P3 | 3P4 | 3PS | 3PS | 3P7 | 3P8 | 3P9 | 3P10 | 3P11 | 3P12 | 3P13 | 3P14 |
| 7 | 3P15 | 3P16 | 3P17 | 3P18 | 3P19 | 3P2D | 3P21 | 3P22 | 3P23 | 3P24 | 3P25 | 3P26 | 3P27 | 3P28 | 3P29 | 3P30 | 3P31 | 3P32 | 3P33 | 3P34 | 3P35 | 3P38 | 3P37 |
| 8 | 3P38 | 3P39 | 3P40 | 3P41 | 3P42 | 3P43 | 3P44 | 3P45 | 3P46 | 3P47 | 3P48 | 3P49 | 3P50 | 3P51 | 3P52 | 3P53 | 3P54 | 3P55 | 3P56 | 3P57 | 3P58 | 3P59 | 3P60 |
| 9 | 3P51 | 3P52 | 3P53 | 3P84 | 3P55 | 3P86 | 3P67 | 3P68 | 3P69 | 3P70 | 3P71 | 3P72 | 3P73 | 3P74 | 3P75 | 3P76 | 3P77 | 3P78 | 3P79 | 3P80 | 3P81 | 3P82 | 3P53 |
| 10 | 3P84 | 3P85 | 3P86 | 3P57 | 3P88 | 3P89 | 3P96 | 3P91 | 3P92 | 3P93 | 3P94 | 3P95 | 3P96 | 3P97 | 3P98 | 3P99 | 3P100 | 3P101 | 3P102 | 3P103 | 3P104 | 3P105 | 3P196 |
| 11 | 3P101 | 3P108 | 3P109 | 3P110 | 3P111 | 3P112 | 3P113 | 3P114 | 3P115 | 3P116 | 3P111 | 3P118 | 3P119 | 3P120 | 3P121 | 3P122 | 3P123 | 3P124 | 3P125 | 3P126 | 3P127 | 3P128 | 3P129 |
| 12 | 3P130 | 3P131 | 3P132 | 3P133 | 3P134 | 3P135 | 3P136 | 3P137 | 3P138 | 3P139 | 3P140 | 3P141 | 3P142 | 3P143 | 3P144 | 3P145 | 3P146 | 3P147 | 3P148 | 3P149 | 3P150 | 3P151 | 3P152 |
| 13 | 3P153 | 3P154 | 3P155 | 3P156 | 3P157 | 3P158 | 3P159 | 3P180 | 3P161 | 3P162 | 3P163 | 3P164 | 3P165 | 3P168 | 3P167 | 3P188 | 3P189 | 3P170 | 3P111 | 3P172 | 3P173 | 3P174 | 3P175 |
| 14 | 3P176 | 3P177 | 3P178 | 3P179 | 3P180 | 3P181 | 3P182 | 3P183 | 3P184 | 3P185 | 3P186 | 3P187 | 3P188 | 3P189 | 3P190 | 3P191 | 3P192 | 3P193 | 3P194 | 3P195 | 3P196 | Res.1 | Res.2 |
| 15 | Res.3 | Res.4 | Res.5 | Res.6 | Res.7 | Res.8 | D2049 | D2050 | D2051 | D2052 | D2053 | D2054 | D2055 | D2056 | D2057 | D2058 | D2059 | D2060 | D2961 | D2962 | D2963 | D2084 | D2965 |
| 16 | D2096 | D2967 | D2968 | D2969 | D2970 | D2071 | D2072 | D2073 | D2074 | D2075 | D2076 | D2077 | D2078 | D2079 | D2080 | D2981 | D2962 | D2083 | D2584 | D2085 | D2086 | D2087 | D2988 |
| 17 | D2589 | D2090 | D2091 | D2092 | D2093 | D2094 | D2095 | D2096 | D2097 | D2998 | D2099 | D2100 | D2101 | D2102 | D2103 | D2104 | D2105 | D2196 | D2107 | D2158 | D2109 | D2110 | D2111 |
| 18 | D2112 | D2113 | D2114 | D2115 | D2116 | D2117 | D2118 | D2119 | D2120 | D2121 | D2122 | D2123 | D2124 | D2125 | D2126 | D2127 | D2128 | D2129 | D2130 | D2131 | D2132 | D2133 | D2134 |
| 19 | D2135 | D2136 | D2137 | D2138 | D2139 | D2140 | D2141 | D2142 | D2143 | D2144 | D2145 | D2146 | D2147 | D2148 | D2149 | D2150 | D2151 | D2152 | D2153 | D2154 | D2155 | D2156 | D2157 |
| 20 | D2158 | D2159 | D2180 | D2161 | D2162 | D2163 | D2184 | D2165 | D2186 | D2167 | D2188 | D2169 | D2170 | D2171 | D2172 | D2173 | D2174 | D2175 | D2176 | D2177 | D2178 | D2179 | D2180 |
| 21 | D2181 | D2182 | D2183 | D2184 | D2185 | D2186 | D2187 | D2188 | D2189 | D2190 | D2191 | D2192 | D2193 | D2194 | D2195 | D2196 | D2197 | D2198 | D2199 | D2200 | D2201 | D2202 | D2203 |
| 22 | D2204 | D2205 | D2296 | D2207 | D2238 | D2209 | D2210 | D2211 | D2212 | D2213 | D2214 | D2215 | D2216 | D2217 | D2218 | D2219 | D2220 | D2221 | D2222 | D2223 | D2224 | D2225 | D2226 |
| 23 | D2227 | D2228 | D2229 | D2230 | D2231 | D2232 | D2233 | D2234 | D2235 | D2236 | D2237 | D2238 | D2239 | D2240 | D2241 | D2242 | D2243 | D2244 | D2245 | D2246 | D2247 | D2248 | D2249 |
| 24 | D2250 | D2251 | D2252 | D2253 | D2254 | D2255 | D2256 | D2257 | D2298 | D2259 | D2280 | D2261 | D2262 | D2263 | D2264 | D2265 | D2266 | D2267 | D2268 | D2269 | D2270 | D2271 | D2272 |
| 25 | D2273 | D2274 | D2275 | D2276 | D2277 | D2278 | D2279 | D2280 | D2281 | D2282 | D2283 | D2284 | D2285 | D2286 | D2287 | D2288 | D2289 | D2290 | D2291 | D2292 | D2293 | D2294 | D2295 |
| 26 | D2296 | D2297 | D2298 | D2299 | D2300 | D2301 | D2302 | D2303 | D2304 | D2305 | D2396 | D2307 | D2358 | D2309 | D2310 | D2311 | D2312 | D2313 | D2314 | D2315 | D2316 | D2317 | D2318 |
| 27 | D2319 | D2320 | D2321 | D2322 | D2323 | D2324 | D2325 | D2329 | D2327 | D2328 | D2329 | D2330 | D2331 | D2332 | D2333 | D2334 | D2335 | D2336 | D2337 | D2338 | D2339 | D2340 | D2341 |
| 28 | D2342 | D2343 | D2344 | D2345 | D2345 | D2347 | D2348 | D2349 | D2350 | D2351 | D2352 | D2353 | D2354 | D2355 | D2386 | D2357 | D2358 | D2359 | D2380 | D2361 | D2382 | D2383 | D2364 |

TABLE IIIe

5th logical sub-block of CD-DASD Mode 01 sector.

| | 93 | 94 | 95 | 96 | 97 | 98 | 99 | 100 | 101 | 102 | 103 | 104 | 105 | 106 | 107 | 108 | 109 | 110 | 111 | 112 | 113 | 114 | 115 |
|---|---|---|---|---|---|---|---|---|---|---|---|---|---|---|---|---|---|---|---|---|---|---|---|
| 1 | D2365 | D2366 | D2367 | D2368 | D2369 | D2370 | D2371 | D2372 | D2373 | D2374 | D2375 | D2376 | D2377 | D2378 | D2379 | D2380 | D2361 | D2382 | D2363 | D2364 | D2365 | D2356 | D2387 |
| 2 | D2388 | D2369 | D2390 | D2391 | D2392 | D2393 | D2394 | D2395 | D2396 | D2397 | D2398 | D2399 | D2400 | D2401 | D2402 | D2403 | D2404 | D2405 | D2406 | D2407 | D2408 | D2409 | D2410 |
| 3 | D2411 | D2412 | D2413 | D2414 | D2415 | D2416 | D2417 | D2418 | D2419 | D2420 | D2421 | D2422 | D2423 | D2424 | D2425 | D2426 | D2421 | D2428 | D2429 | D2430 | D2431 | D2432 | D2433 |
| 4 | D2434 | D2436 | D2436 | D2437 | D2438 | D2439 | D2440 | D2441 | D2442 | D2443 | D2444 | D2445 | D2446 | D2447 | D2446 | D2449 | D2450 | D2451 | D2452 | D2453 | D2454 | D2455 | D2456 |
| 5 | D2457 | D2458 | D2459 | D2460 | D2461 | D2482 | D2463 | D2484 | D2465 | D2466 | D2467 | D2468 | D2469 | D2470 | D2471 | D2472 | D2473 | D2474 | D2475 | D2476 | D2477 | D2478 | D2479 |
| 6 | D2480 | D2481 | D2482 | D2483 | D2484 | D2485 | D2488 | D2487 | D2488 | D2489 | D2490 | D2491 | D2492 | D2493 | D2494 | D2495 | D2496 | D2497 | D2498 | D2499 | D2500 | D2S01 | D2532 |
| 7 | D2593 | D2504 | D2535 | D250B | D2537 | D2508 | D2509 | D2510 | D2511 | D2512 | D2513 | D2514 | D2515 | D2516 | D2517 | D2518 | D2519 | D2520 | D2521 | D2522 | D2523 | D2524 | D2525 |
| 8 | D2626 | D2527 | D2528 | D2529 | D2530 | D2531 | D2532 | D2533 | D2534 | D2535 | D2536 | D2537 | D2536 | D2539 | D2540 | D2541 | D2542 | D2643 | D2544 | D2545 | D2546 | D2547 | D2548 |
| 9 | D2549 | D2S50 | D2551 | D2552 | D2553 | D2554 | D2555 | D2556 | D2557 | D2558 | D2559 | D2560 | D2561 | D2562 | D2563 | D2564 | D2565 | D2566 | D2567 | D2568 | D2569 | D2570 | D2571 |
| 10 | D2572 | D2573 | D2574 | D2575 | D2578 | D2577 | D2578 | D2579 | D2553 | D2581 | D2582 | D2583 | D2584 | D2585 | D2586 | D2587 | D2588 | D2589 | D2590 | D2591 | D2592 | D2593 | D2594 |
| 11 | D2595 | D2596 | D2597 | D2598 | D2599 | D2800 | D2901 | D2662 | D2533 | D2604 | D2635 | D2696 | D2667 | D2638 | D2609 | D2610 | D2611 | D2612 | D2613 | D2614 | D2615 | D2816 | D2617 |
| 12 | D2618 | D2619 | D2620 | D2621 | D2622 | D2623 | D2624 | D2625 | D2626 | D2627 | D2628 | D2629 | D2630 | D2631 | D2632 | D2533 | D2634 | D2635 | D2636 | D2631 | D2638 | D2639 | D2640 |
| 13 | D2641 | D2642 | D2643 | D2644 | D2645 | D2648 | D2647 | D2648 | D2649 | D2650 | D2651 | D2652 | D2653 | D2654 | D2655 | D2656 | D2857 | D2658 | D2659 | D2660 | D2661 | D2682 | D2663 |
| 14 | D2664 | D2665 | D2666 | D2667 | D2688 | D2669 | D2670 | D2671 | D2672 | D2673 | D2674 | D2675 | D2676 | D2677 | D2678 | D2679 | D2880 | D2681 | D2682 | D2683 | D2664 | D2685 | D2685 |
| 15 | D2687 | D2686 | D2689 | D2690 | D2691 | D2692 | D2693 | D2694 | D2695 | D2696 | D2697 | D2698 | D2699 | D2700 | D2701 | D2702 | D2703 | D2704 | D270s | D270B | D2707 | D27DB | D2709 |
| 16 | D2710 | D2711 | D2712 | D2713 | D2714 | D2715 | D2718 | D2111 | D2718 | D2719 | D2720 | D2721 | D2722 | D2723 | D2724 | D2725 | D2726 | D2727 | D2728 | D2729 | D2730 | D2731 | D2732 |
| 11 | D2733 | D2734 | D2735 | D2736 | D2737 | D2738 | D2739 | D2740 | D2741 | D2742 | D2743 | D2744 | D2745 | D2746 | D2747 | D2748 | D2749 | D2750 | D2751 | D2752 | D2753 | D2754 | D2755 |
| 18 | D2756 | D2757 | D2758 | D2759 | D2766 | D2761 | D2762 | D2763 | D2764 | D2765 | D2766 | D2767 | D2768 | D2769 | D2770 | D2771 | D2772 | D2773 | D2774 | D2775 | D2776 | D2777 | D2778 |
| 19 | D2779 | D2780 | D2781 | D2782 | D2763 | D2784 | D2785 | D2786 | D2787 | D2766 | D2789 | D2790 | D2791 | D2792 | D2793 | D2794 | D2795 | D2798 | D2797 | D2798 | D2799 | D2800 | D2B01 |
| 20 | D2632 | D2803 | D2804 | D2635 | D2808 | D2B07 | D2808 | D2899 | D2810 | D2811 | D2812 | D2813 | D2814 | D2815 | D2816 | D2817 | D2818 | D2819 | D2820 | D2821 | D2822 | D2823 | D2824 |
| 21 | D2825 | D2826 | D2827 | D2828 | D2829 | D2830 | D2631 | D2632 | D2833 | D2834 | D2835 | D2836 | D2837 | D2838 | D2639 | D2840 | D2841 | D2642 | D2643 | D2844 | D2645 | D2846 | D2647 |
| 22 | D2648 | D2849 | D2850 | D2851 | D2852 | D2853 | D2854 | D2855 | D2656 | D2857 | D2858 | D2859 | D2860 | D2861 | D2862 | D2863 | D2864 | D2865 | D2865 | D2867 | D2868 | D2869 | D2870 |
| 23 | D2871 | D2872 | D2873 | 02B74 | D2875 | D2876 | D2871 | D2878 | D2879 | D2BB0 | D2661 | D2882 | D2883 | D2884 | D2665 | D2886 | D2667 | D2688 | D2689 | D2890 | D2891 | D2892 | D2893 |
| 24 | D2894 | D2895 | D2896 | D2897 | D2898 | D2899 | D2990 | D2901 | D2902 | D2903 | D2904 | D2905 | D2906 | D2907 | D2908 | D2909 | D2910 | D2911 | D2912 | D2913 | D2914 | D2915 | P2916 |
| 25 | D2917 | D2918 | D2919 | D2920 | D2921 | D2922 | D2923 | D2924 | D2925 | D2926 | D2927 | D2928 | D2929 | D2930 | D2931 | D2932 | D2933 | D2934 | D2935 | D2936 | D2937 | D2938 | D2939 |
| 26 | D2940 | D2941 | D2942 | D2943 | D2944 | D2945 | D2946 | D2947 | D2948 | D2949 | D2950 | D2951 | D2952 | D2953 | D2954 | D2955 | D2956 | D2957 | D2958 | D2959 | D2966 | D2961 | D2962 |
| 27 | D2963 | D2964 | D2985 | D2966 | D2967 | D2968 | D2969 | D2970 | D2911 | D2972 | D2973 | D2974 | D2975 | D2976 | D2977 | D2978 | D2979 | D29B0 | D2981 | D2982 | D2983 | D2984 | D2985 |
| 28 | D2986 | D2987 | D2988 | D2989 | D2990 | D2991 | D2992 | D2993 | D2994 | D2995 | D2996 | D2997 | D2998 | D2999 | D3000 | D3901 | D3902 | D3003 | D3904 | D3905 | D300B | D3907 | D3008 |

TABLE IIIf

6th logical sub-block of CD-DASD Mode 01 sector.

| | 116 | 117 | 118 | 119 | 120 | 121 | 122 | 123 | 124 | 125 | 126 | 127 | 128 | 129 | 130 | 131 | 132 | 133 | 134 | 135 | 136 | 137 | 138 |
|---|---|---|---|---|---|---|---|---|---|---|---|---|---|---|---|---|---|---|---|---|---|---|---|
| 1 | D3009 | D3010 | D3011 | D3012 | D3013 | D3014 | D3015 | D3016 | D3017 | D3018 | D3019 | D3020 | D3021 | D3022 | D3023 | D3024 | D3025 | D3026 | D3027 | D3028 | D3029 | D3030 | D3031 |
| 2 | D3032 | D3033 | D3034 | D3035 | D3036 | D3031 | D3039 | D3039 | D3040 | D3041 | D3042 | D3043 | D3044 | D3045 | D3046 | D3047 | D3048 | D3049 | D3050 | D3051 | D3052 | D3053 | D3054 |
| 3 | D3055 | D3056 | D3057 | D3088 | D3059 | D3080 | D3061 | D3062 | D3063 | D3064 | D3065 | D3086 | D3067 | D3068 | D3069 | D3070 | D3071 | D3072 | D3073 | D3074 | D3075 | D3076 | D3077 |
| 4 | D307B | D3079 | D3080 | D3081 | D3082 | D3083 | D3054 | D3085 | D3086 | D3087 | D3068 | D3089 | D3090 | D3091 | D3092 | D3093 | D3094 | D3095 | D3096 | D3097 | D3098 | D3099 | D3100 |
| 5 | D3101 | D3102 | D3103 | D3104 | D3105 | D3106 | D3107 | D3108 | D3109 | D3110 | D3111 | D3112 | D3113 | D3114 | D3115 | D3116 | D3117 | D3118 | D3119 | D3120 | D3121 | D3122 | D3123 |
| 6 | D3124 | D3125 | D3126 | D3127 | D3128 | D3129 | D3130 | D3131 | D3132 | D3173 | D3134 | D3135 | D3136 | D3137 | D3138 | D3139 | D3140 | D3141 | D3142 | D3143 | D3144 | D3145 | D3146 |
| 7 | D3147 | D3148 | D3149 | D3150 | D3151 | D3152 | D3153 | D3154 | D3155 | D3155 | D3157 | D3158 | D3159 | D3160 | D3161 | D3162 | D3163 | D3184 | D3165 | D3166 | D3167 | D3168 | D3169 |
| 8 | D3170 | D3l11 | D3172 | D3173 | D3174 | D3175 | D3176 | D3177 | D3178 | D3119 | D3182 | D3181 | D3182 | D3183 | D3184 | D3185 | D3186 | D3187 | D3158 | D31B9 | D3190 | D3191 | D3192 |
| 9 | D3193 | D3194 | D3195 | D3198 | D3191 | D3198 | D3199 | D3200 | D3201 | D3292 | D3203 | D3204 | D3205 | D3208 | D3207 | D320B | D3209 | D3210 | D3211 | D3212 | D3213 | D3214 | D3215 |
| 10 | D3216 | D3217 | D321B | D3219 | D3220 | D3221 | D3222 | D3223 | D3224 | D3225 | D3226 | D3227 | D3228 | D3229 | D3230 | D3231 | D3232 | D3233 | D3234 | D3235 | D3236 | D3237 | D3238 |
| 11 | D3239 | D3240 | D3241 | D3242 | D3243 | D3244 | D3245 | D3246 | D3247 | D3248 | D3249 | D3250 | D3251 | D3252 | D3253 | D3254 | D3255 | D3256 | D3257 | D3258 | D3259 | D3260 | D3261 |
| 12 | D3262 | D3263 | D3284 | D3265 | D3268 | D3261 | D3298 | D3269 | D3270 | D3271 | D3272 | D3273 | D3274 | D3215 | D3276 | D3277 | D3218 | D3279 | D3280 | D3281 | D3282 | D3283 | D3284 |
| 13 | D3285 | D3286 | D3287 | D3288 | D32B9 | D3290 | D3291 | D3292 | D3293 | D3294 | D3295 | D3298 | D3297 | D3298 | D3299 | D3302 | D2301 | D3302 | D3303 | D3304 | D3305 | D3306 | D3307 |
| 14 | D3308 | D3309 | D3310 | D3311 | D3312 | D3313 | D3314 | D3315 | D3316 | D3317 | D331B | D3319 | D3320 | D3321 | D3322 | D3323 | D3324 | D3325 | D3326 | D3327 | D3328 | D3329 | D3330 |
| 15 | D3331 | D3332 | D3333 | D3334 | D3335 | D3336 | D3331 | D3338 | D3339 | D3340 | D3341 | D3042 | D3343 | D3344 | D3345 | D3346 | D3341 | D3348 | D3349 | D3350 | D3351 | D3352 | D3353 |
| 16 | D3354 | D3355 | D3356 | D3357 | D3358 | D3359 | D3350 | D3361 | D3362 | D3363 | D3354 | D3368 | D3368 | D3367 | D3368 | D3369 | D3370 | D3311 | D3312 | D3313 | D3374 | D3075 | D3376 |
| 17 | D3377 | D337B | D3379 | D3382 | D3381 | D3382 | D3383 | D3384 | D3385 | D3386 | D3387 | D3368 | D3389 | D3390 | D3391 | D3392 | D3393 | D3394 | D3395 | D3396 | D3397 | D3398 | D3399 |
| 18 | D3408 | D3401 | D3402 | D3403 | D3494 | D3495 | D3408 | D3407 | D3408 | D3409 | D3410 | D3411 | D3412 | D3413 | D3414 | D3415 | D3416 | D3417 | D3418 | D3419 | D3420 | D3421 | D3422 |
| 19 | D3423 | D3424 | D3425 | D3426 | D3427 | D3428 | D3429 | D3430 | D3431 | D3432 | D3433 | D3434 | D3435 | D3436 | D3437 | D3438 | D3439 | D3440 | D3441 | D3442 | D3443 | D3444 | D3445 |
| 20 | D3448 | D3447 | D3448 | D3449 | D3450 | D3451 | D3482 | D3458 | D3454 | D3455 | D3456 | D3457 | D3458 | D3459 | D3450 | D3461 | D3482 | D3463 | D3464 | D3465 | D3466 | D3467 | D3495 |
| 21 | D3469 | D3410 | D3411 | D3472 | D3473 | D3474 | D3475 | D3476 | D3477 | D347B | D3479 | D3460 | D3481 | D3482 | D3483 | D3454 | D3485 | D3486 | D3487 | D3488 | D3489 | D3492 | D3491 |
| 22 | D3492 | D3493 | D3494 | D3495 | D3498 | D3497 | D3498 | D3499 | D3500 | D3501 | D3502 | D3503 | D3504 | D3505 | D3506 | D3507 | D3508 | D3509 | D3510 | D3511 | D3512 | D3513 | D3514 |
| 23 | D3515 | D3516 | D3517 | D351B | D3519 | D3520 | D3521 | D3522 | D3523 | D3524 | D3525 | D3526 | D3527 | D3528 | D3529 | D3530 | D3531 | D3532 | D3533 | D3834 | D3538 | D3536 | D3537 |
| 24 | D3838 | D3539 | D3540 | D3541 | D3542 | D3543 | D3544 | D3548 | D3546 | D3547 | D3548 | D3549 | D3550 | D3551 | D3552 | D3553 | D3554 | D3555 | D3556 | D3557 | D3558 | D3559 | D3560 |
| 25 | D3561 | D3552 | D3563 | D3564 | D3555 | D3566 | D3567 | D3568 | D3569 | D3570 | D3571 | D3572 | D3573 | D3574 | D3575 | D3576 | D3577 | D357B | D3579 | D3580 | D3581 | D3582 | D3583 |
| 26 | D3564 | D3585 | D3585 | D3587 | D3558 | D3589 | D3590 | D3591 | D3592 | D3593 | D3594 | D3595 | D3596 | D3597 | D3598 | D3599 | D3692 | D3601 | D3602 | D3803 | D3804 | D3625 | D3626 |
| 27 | D3927 | D3638 | D3609 | D3610 | D3611 | D3612 | D3813 | D3614 | D3615 | D3616 | D3617 | D361B | D3619 | D3620 | D3621 | D3622 | D3623 | D3624 | D3625 | D3626 | D3627 | D3828 | D3629 |
| 28 | D3630 | D3831 | D3832 | D3633 | D3834 | D3535 | D3638 | D3837 | D3638 | D3839 | D3840 | D3641 | D3642 | D3643 | D3644 | D3645 | D3646 | D3647 | D3648 | D3649 | D3650 | D3651 | D3652 |

TABLE IIIg

7th logical sub-block of CD-DASD Mode 01 sector.

| | 139 | 140 | 141 | 142 | 143 | 144 | 145 | 146 | 147 | 148 | 149 | 150 | 151 | 152 | 163 | 154 | 155 | 156 | 157 | 158 | 159 | 160 | 161 |
|---|---|---|---|---|---|---|---|---|---|---|---|---|---|---|---|---|---|---|---|---|---|---|---|
| 1 | D3653 | D3654 | D3655 | D3666 | D3657 | D3666 | D3659 | D3660 | D3661 | D3662 | D3663 | D3654 | D3665 | D3666 | D3667 | D3666 | D3669 | D3670 | D3671 | D3672 | D3673 | D3674 | D3675 |
| 2 | D3676 | D3677 | D3678 | D3679 | D3660 | D3661 | D3682 | D3663 | D3654 | D3665 | D3666 | D3667 | D3688 | D3689 | D3690 | D3691 | D3692 | D3693 | D3694 | D3695 | D3696 | D3697 | D3698 |
| 3 | D3699 | D3700 | D3701 | D3702 | D3703 | D3704 | D3705 | D3706 | D3707 | D3708 | D3709 | D3710 | D3711 | D3712 | D3713 | D3714 | D3715 | D3716 | D3717 | D3718 | D3719 | D3720 | D3721 |
| 4 | D3722 | D3723 | D3724 | D3725 | D3726 | D3727 | D3728 | D3729 | D3736 | D3731 | D3732 | D3133 | D3734 | D3735 | D3736 | D3737 | D3738 | D3739 | D3740 | D3741 | D3742 | D3143 | D3744 |
| 5 | b3745 | D3746 | D3747 | D3748 | D3749 | D3750 | D3751 | D3752 | D3753 | D3754 | D3755 | D3756 | D3757 | D3756 | D3759 | D3760 | D3761 | D3762 | D3763 | D3764 | D3765 | D3766 | D3767 |
| 6 | D3768 | D3769 | D3770 | D3771 | D3772 | D3773 | D3774 | D3775 | D3776 | D3777 | D3778 | D3779 | D3780 | D3781 | D3782 | D3783 | D3784 | D3785 | D3786 | D3787 | D3788 | D3789 | D3790 |
| 7 | D3791 | D3792 | D3793 | D3794 | D3795 | D3796 | D3797 | D3798 | D3799 | D3800 | D3601 | D3802 | D3803 | D3864 | D3605 | D3806 | D3607 | D3808 | D3609 | D3810 | D3811 | D3812 | D3813 |
| 8 | D3814 | D3815 | D3816 | D3811 | D3818 | D3819 | D3820 | D3621 | D3622 | D3823 | D3824 | D3825 | D3826 | D3827 | D3828 | D3829 | D3636 | D3831 | D3832 | D3833 | D3834 | D3835 | D3836 |
| 9 | D3837 | D3838 | D3839 | D3840 | D3841 | D3842 | D3843 | D3644 | D3845 | D3846 | D3847 | D3848 | D3849 | D3850 | D3651 | D3652 | D3653 | D3854 | D3855 | D3856 | D3657 | D3858 | D3859 |
| 10 | D3660 | D3861 | D3862 | D3863 | D3664 | D3865 | D3666 | D3667 | D3668 | D3869 | D3870 | D3871 | D3872 | D3873 | D3674 | D3875 | D3876 | D3877 | D3878 | D3879 | D3660 | D3681 | D3882 |
| 11 | D3663 | D3864 | D3885 | D3866 | D3867 | D3688 | D3669 | D3890 | D3891 | D3892 | D3893 | D3894 | D3895 | D3896 | D3897 | D3898 | D3899 | D3990 | D3901 | D3902 | D3903 | D3904 | D3905 |
| 12 | D3906 | D3907 | D3908 | D3909 | D3910 | D3911 | D3912 | D3913 | D3914 | D3915 | D3916 | D3917 | D3918 | D3919 | D3920 | D3921 | D3922 | D3923 | D3924 | D3925 | D3926 | D3927 | D3928 |
| 13 | D3929 | D3936 | D3931 | D3932 | D3933 | D3934 | D3935 | D3936 | D3937 | D3938 | D3939 | D3940 | D3941 | D3942 | D3943 | D3944 | D3945 | D3946 | D3947 | D3948 | D3949 | D3950 | D3951 |
| 14 | D3952 | D3953 | D3954 | D3985 | D3956 | D3957 | D3958 | D3959 | D3960 | D3961 | D3962 | D3963 | D3964 | D3965 | D3966 | D3967 | D3968 | D3969 | D3970 | D3971 | D3972 | D3973 | D3974 |
| 15 | D3975 | D3976 | D3977 | D3978 | D3979 | D3980 | D3981 | D3982 | D3983 | D3984 | D3985 | D3985 | D3987 | D3986 | D3989 | D3990 | D3991 | D3992 | D3993 | D3994 | D3995 | D3996 | D3997 |
| 16 | D3998 | D3999 | D4000 | D4001 | D4002 | D4903 | D4004 | D4005 | D4908 | D4007 | D4008 | D4009 | D4a10 | D4011 | D4012 | D4013 | D4014 | D4015 | D4016 | D4017 | D4018 | D4019 | D4020 |
| 17 | D4021 | D4022 | D4023 | D4024 | D4025 | D4026 | D4027 | D4028 | D4029 | D4036 | D4031 | D4032 | D4033 | D4034 | D4035 | D4036 | D4037 | D4038 | D4039 | D4040 | D4041 | D4042 | D4043 |
| 18 | D4044 | D4045 | D4046 | D4047 | D4048 | D4049 | D4050 | D4051 | D4052 | D4053 | D4054 | D4055 | D4056 | D4057 | D4058 | D4059 | D4060 | D4061 | D4062 | D4053 | D4064 | D4055 | D4066 |
| 19 | D4067 | D4068 | D4069 | D4070 | D4071 | D4072 | D4073 | D4074 | D4075 | D4076 | D4077 | D4078 | D4079 | D4080 | D4981 | D4982 | D4083 | D4084 | D4085 | D4086 | D4087 | D4088 | D4089 |
| 20 | D4090 | D4091 | D4092 | D4d93 | D4094 | D4095 | D4096 | CRC5 | CRC6 | CRC7 | CRC8 | 3P197 | 3P198 | 3P199 | 3P200 | 3P201 | 3P202 | 3P203 | 3P204 | 3P205 | 3P20B | 3P207 | 3P208 |
| 21 | 3P209 | 3P210 | 3P211 | 3P212 | 3P213 | 3P214 | 3P215 | 3P216 | 3P217 | 3P218 | 3P219 | 3P220 | 3P221 | 3P222 | 3P223 | 3P224 | 3P225 | 3P226 | 3P227 | 3P228 | 3P229 | 3P230 | 3P231 |
| 22 | 3P232 | 3P233 | 3P234 | 3P235 | 3P236 | 3P237 | 3P238 | 3P239 | 3P240 | 3P241 | 3P242 | 3P243 | 3P244 | 3P245 | 3P246 | 3P247 | 3P248 | 3P249 | 3P250 | 3P251 | 3P252 | 3P253 | 3P254 |
| 23 | 3P255 | 3P256 | 3P257 | 3P258 | 3P259 | 3P260 | 3P261 | 3P262 | 3P263 | 3P264 | 3P265 | 3P266 | 3P267 | 3P266 | 3P269 | 3P270 | 3P271 | 3P272 | 3P273 | 3P274 | 3P275 | 3P276 | 3P277 |
| 24 | 3P218 | 3P279 | 3P280 | 3P281 | 3P282 | 3P283 | 3P284 | 3P285 | 3P286 | 3P287 | 3P288 | 3P289 | 3P290 | 3P291 | 3P292 | 3P293 | 3P294 | 3P295 | 3P296 | 3P297 | 3P298 | 3P299 | 3P360 |
| 25 | 3P361 | 3P302 | 3P303 | 3P304 | 3P305 | 3P366 | 3P307 | 3P308 | 3P309 | 3P310 | 3P311 | 3P312 | 3P313 | 3P314 | 3P315 | 3P316 | 3P317 | 3P318 | 3P319 | 3P320 | 3P321 | 3P322 | 3P323 |
| 26 | 3P324 | 3P325 | 3P326 | 3P327 | 3P328 | 3P329 | 3P336 | 3P331 | 3P332 | 3P333 | 3P334 | 3P335 | 3P336 | 3P337 | 3P338 | 3P339 | 3P340 | 3P341 | 3P342 | 3P343 | 3P344 | 3P345 | 3P346 |
| 27 | 3P347 | 3P348 | 3P349 | 3P360 | 3P351 | 3P352 | 3P353 | 3P354 | 3P355 | 3P356 | 3P357 | 3P358 | 3P359 | 3P360 | 3P361 | 3P362 | 3P363 | 3P364 | 3P365 | 3P366 | 3P367 | 3P368 | 3P369 |
| 28 | 3P370 | 3P371 | 3P372 | 3P373 | 3P374 | 3P375 | 3P376 | 3P377 | 3P378 | 3P379 | 3P360 | 3P381 | 3P382 | 3P383 | 3P384 | 3P385 | 3P386 | 3P387 | 3P386 | 3P389 | 3P390 | 3P391 | 3P392 |

TABLE IVa

1st CD-DASD product codeword.

| | | 1 | 2 | 3 | 4 | 5 | 8 | 7 | 8 | 9 | 10 | 11 | 12 | 13 | 14 |
|---|---|---|---|---|---|---|---|---|---|---|---|---|---|---|---|
| | | | 139/1 | 146/3 | 147/9 | 154/16 | 155/17 | 140/2 | 141/3 | 148/10 | 149/11 | 156/15 | 157/19 | | |
| 1 | 27/1 | 0 | 3P347 | 3P354 | 3P355 | 3P382 | 3P383 | 3P348 | 3P349 | 3P358 | 3P357 | 3P364 | 3P365 | 2P1-1 | 2P1-2 |
| 2 | 28/2 | 0 | 3P370 | 3P377 | 3P378 | 3P385 | 3P388 | 3P371 | 3P372 | 3P379 | 3P380 | 3P387 | 3P388 | 2P2-1 | 2P2-2 |
| 3 | 1/3 | 0 | ID1 | D4 | D5 | D12 | D13 | ID2 | ID3 | D6 | D7 | D14 | D15 | 2P3-1 | 2P3-2 |
| 4 | 2/4 | 0 | D20 | D27 | D28 | D35 | D38 | D21 | D22 | D29 | D33 | D37 | D38 | 2P4-1 | 2P4-2 |
| 5 | 3/5 | 0 | D43 | D50 | D51 | D58 | D59 | D44 | D45 | D52 | D53 | D60 | D61 | 2P5-1 | 2P5-2 |
| 6 | 4/6 | 0 | D66 | D73 | D74 | D81 | D82 | D67 | D68 | D75 | D78 | D83 | D84 | 2P6-1 | 2P6-2 |
| 7 | 5/7 | 0 | D89 | D96 | D97 | D104 | D105 | D90 | D91 | D98 | D99 | D106 | D107 | 2P7-1 | 2P7-2 |
| 8 | 6/8 | 0 | D112 | D119 | D120 | D127 | D128 | D113 | D114 | D121 | D122 | D129 | D133 | 2P8-1 | 2P8-2 |
| 9 | 7/9 | 0 | D135 | D142 | D143 | D150 | D151 | D138 | D131 | D144 | D145 | D152 | D153 | 2P9-1 | 2P9-2 |
| 10 | 8/10 | 0 | D158 | D165 | D166 | D113 | D174 | D159 | D150 | D167 | D168 | D17S | D118 | 2P10-1 | 2P10-2 |
| 11 | 9/11 | 0 | D181 | D188 | D189 | D198 | D197 | D182 | D183 | D199 | D191 | D198 | D199 | 2P11-1 | 2P11-2 |
| 12 | 10/12 | 0 | D204 | D211 | D212 | D219 | D220 | D205 | D206 | D213 | D214 | D221 | D222 | 2P12-1 | 2P12-2 |
| 13 | 11/13 | 0 | D227 | D234 | D235 | D242 | D243 | D22B | D229 | D238 | D237 | D244 | D245 | 2P13-1 | 2P13-2 |
| 14 | 12/14 | 0 | D250 | D257 | D258 | D285 | D288 | D251 | D252 | D259 | D280 | D267 | D288 | 2P14-1 | 2P14-2 |
| 15 | 13/15 | 0 | D273 | D280 | D281 | D288 | D289 | D274 | D275 | D282 | D283 | D290 | D291 | 2P15-1 | 2P15-2 |
| 16 | 14/16 | 0 | D298 | D333 | D304 | D311 | D312 | D297 | D298 | D335 | D306 | D313 | D314 | 2P16-1 | 2P16-2 |
| 17 | 13/17 | 0 | D319 | D326 | D327 | D334 | D335 | D320 | D321 | D328 | D329 | D338 | D337 | 2P17-1 | 2P17-2 |
| 18 | 16/18 | 0 | D342 | D349 | D380 | D357 | D358 | D343 | D344 | D351 | D352 | D359 | D380 | 2P18-1 | 2P18-2 |
| 19 | 17/19 | 0 | D385 | D372 | D373 | D380 | D381 | D388 | D387 | D374 | D375 | D382 | D383 | 2P19-1 | 2P19-2 |
| 20 | 18/20 | 0 | D388 | D395 | D398 | D403 | D404 | D389 | D390 | D397 | D398 | D405 | D408 | 2P20-1 | 2P20-2 |
| 21 | 19/21 | 0 | D417 | D418 | D419 | D426 | D427 | D412 | D413 | D420 | D421 | D428 | D429 | 2P21-1 | 2P21-2 |
| 22 | 20/22 | 0 | D434 | D441 | D442 | D449 | D480 | D435 | D436 | D443 | D444 | D451 | D452 | 2P22-1 | 2P22-2 |
| 23 | 21/23 | 0 | D467 | D464 | D465 | D472 | D413 | D458 | D459 | D468 | D487 | D474 | D475 | 2P23-1 | 2P23-2 |
| 24 | 22/24 | 0 | D480 | D467 | D488 | D495 | D498 | D461 | D482 | D489 | D490 | D497 | D498 | 2P24-1 | 2P24-2 |
| 25 | 23/25 | 0 | D503 | D510 | D511 | D518 | D519 | D504 | D505 | D512 | D513 | D520 | D521 | 2P25-1 | 2P25-2 |
| 26 | 24/26 | 0 | D526 | D533 | D534 | D541 | D542 | D527 | D528 | D535 | D538 | D543 | D544 | 2P26-1 | 2P26-2 |
| 27 | 23/27 | 0 | D549 | DS58 | D557 | D564 | D565 | D580 | D581 | D558 | D559 | D566 | D587 | 2P27-1 | 2P27-2 |
| 28 | 26/28 | 0 | D572 | DS79 | D580 | D587 | D588 | D573 | D574 | D581 | D582 | D589 | D590 | 2P28-1 | 2P28-2 |
| | | 1P1-1 | 1P2-1 | 1P3-1 | 1P4-1 | 1P5-1 | 1P6-1 | 1P7-1 | 1P8-1 | 1P9-1 | 1P10-1 | 1P11-1 | 1P12-1 | 1P13-1 | 1P14-1 |
| | | 1P1-2 | 1P2-2 | 1P3-2 | 1P4-2 | 1P5-2 | 1P6-2 | 1P7-2 | 1P8-2 | 1P9-2 | 1P10-2 | 1P11-2 | 1P12-2 | 1P13-2 | 1P14-2 |
| | | 1P1-3 | 1P2-3 | 1P3-3 | 1P4-3 | 1P5-3 | 1P6-3 | 1P7-3 | 1P8-3 | 1P9-3 | 1P10-3 | 1P11-3 | 1P12-3 | 1P13-3 | 1P14-3 |
| | | 1P1-4 | 1P2-4 | 1P3-4 | 1P4-4 | 1P5-4 | 1P6-4 | 1P7-4 | 1P8-4 | 1P9-4 | 1P10-4 | 1P11-4 | 1P12-4 | 1P13-4 | 1P14-4 |

| | | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|
| | | | | 4 | 5 | 12 | 13 | 20 | 21 | 6 | 7 | 14 | 15 | 22 | 23 |
| 1 | 27/1 | 2P1-3 | 2P1-4 | ResD | D1 | D8 | D9 | D16 | D17 | D2 | D3 | D10 | D11 | D18 | D19 |
| 2 | 28/2 | 2P2-3 | 2P2-4 | D23 | D24 | D31 | D32 | D39 | D40 | D25 | D26 | D33 | D34 | D41 | D42 |
| 3 | 1/3 | 2P3-3 | 2P3-4 | D46 | D47 | D54 | D55 | D52 | D53 | D48 | D49 | D56 | D57 | D11 | D65 |
| 4 | 2/4 | 2P4-3 | 2P4-4 | D69 | D70 | D77 | D78 | D85 | D86 | D71 | D72 | D79 | D80 | D87 | D88 |
| 5 | 3/5 | 2P5-3 | 2P5-4 | D92 | D93 | D100 | D101 | D108 | D109 | D94 | D95 | D102 | D103 | D110 | D111 |
| 6 | 4/6 | 2P6-3 | 2P6-4 | D115 | D118 | D123 | D124 | D131 | D132 | D117 | D118 | D125 | D126 | D133 | D134 |
| 7 | 5/7 | 2P7-3 | 2P7-4 | D138 | D139 | D146 | D147 | D154 | D155 | D140 | D141 | D148 | D149 | D156 | D157 |
| 8 | 6/8 | 2P8-3 | 2P8-4 | D161 | D162 | D169 | D170 | D171 | D178 | D183 | D164 | D171 | D172 | D179 | D180 |
| 9 | 7/9 | 2P9-3 | 2P9-4 | D184 | D355 | D192 | D193 | D200 | D2D1 | D156 | D187 | D194 | D195 | D2D2 | D203 |
| 10 | 8/10 | 2P10-3 | 2P10-4 | D2D1 | D208 | D215 | D216 | D223 | D224 | D209 | D210 | D217 | D218 | D225 | D226 |
| 11 | 9/11 | 2P11-3 | 2P11-4 | D230 | D231 | D238 | D239 | D246 | D247 | D232 | D233 | D243 | D241 | D248 | D249 |
| 12 | 10/12 | 2P12-3 | 2P12-4 | D253 | D254 | D261 | D262 | D269 | D270 | D255 | D256 | D283 | D264 | D271 | D272 |
| 13 | 11/13 | 2P13-3 | 2P13-4 | D276 | D277 | D284 | D285 | D292 | D293 | D278 | D279 | D288 | D287 | D294 | D295 |
| 14 | 12/14 | 2P14-3 | 2P14-4 | D299 | D390 | D337 | D338 | D315 | D316 | D301 | D332 | D339 | D310 | D317 | D318 |
| 15 | 13/15 | 2P15-3 | 2P15-4 | D322 | D323 | D333 | D331 | D338 | D339 | D324 | D325 | D332 | D333 | D340 | D341 |
| 16 | 14/16 | 2P16-3 | 2P16-4 | D345 | D346 | D353 | D354 | D381 | D362 | D347 | D348 | D355 | D356 | D383 | D254 |
| 17 | 13/17 | 2P17-3 | 2P17-4 | D388 | D389 | D376 | D377 | D384 | D385 | D370 | D371 | D378 | D379 | D356 | D387 |
| 18 | 16/18 | 2P18-3 | 2P18-4 | D391 | D392 | D399 | D400 | D407 | D498 | D393 | D394 | D401 | D432 | D409 | D410 |
| 19 | 17/19 | 2P19-3 | 2P19-4 | D414 | D415 | D422 | D423 | D433 | D431 | D416 | D417 | D424 | D425 | D432 | D433 |
| 20 | 18/20 | 2P20-3 | 2P20-4 | D437 | D438 | D445 | D448 | D453 | D454 | D439 | D44D | D447 | D448 | D455 | D456 |
| 21 | 19/21 | 2P21-3 | 2P21-4 | D480 | D461 | D468 | D469 | D476 | D477 | D462 | D463 | D47D | D471 | D478 | D479 |
| 22 | 20/22 | 2P22-3 | 2P22-4 | D483 | D484 | D491 | D492 | D499 | D590 | D485 | D486 | D493 | D494 | D501 | D502 |
| 23 | 21/23 | 2P23-3 | 2P23-4 | D506 | D807 | D514 | D515 | D522 | D523 | D808 | D509 | D516 | D517 | D524 | D525 |
| 24 | 22/24 | 2P24-3 | 2P24-4 | D529 | D533 | D537 | D538 | D545 | D546 | D531 | D532 | D539 | D540 | D547 | D548 |
| 25 | 23/25 | 2P25-3 | 2P25-4 | D552 | D553 | D580 | D561 | D868 | D569 | D554 | D555 | D562 | D563 | DS7D | D571 |
| 26 | 24/26 | 2P26-3 | 2P26-4 | D575 | D576 | D583 | D564 | D591 | D592 | D577 | D578 | D585 | D586 | D593 | D594 |
| 27 | 23/27 | 2P27-3 | 2P27-4 | D598 | D599 | D506 | D507 | D614 | D615 | D500 | D501 | D508 | D609 | D616 | D617 |
| 28 | 26/28 | 2P28-3 | 2P28-4 | D621 | D622 | D629 | D633 | D637 | D638 | D623 | D624 | D631 | D632 | D639 | D640 |
| | | 1P15-1 | 1P16-1 | 1P17-1 | 1P18-1 | 1P19-1 | 1P20-1 | 1P21-1 | 1P22-1 | 1P23-1 | 1P24-1 | 1P25-1 | 1P26-1 | 1P27-1 | 1P28-1 |
| | | 1P15-2 | 1P16-2 | 1P17-2 | 1P18-2 | 1P19-2 | 1P20-2 | 1P21-2 | 1P22-2 | 1P23-2 | 1P24-2 | 1P25-2 | 1P26-2 | 1P27-2 | 1P28-2 |
| | | 1P15-3 | 1P16-3 | 1P17-3 | 1P18-3 | 1P19-3 | 1P20-3 | 1P21-3 | 1P22-3 | 1P23-3 | 1P24-3 | 1P25-3 | 1P26-3 | 1P27-3 | 1P28-3 |
| | | 1P15-4 | 1P16-4 | 1P17-4 | 1P18-4 | 1P19-4 | 1P20-4 | 1P21-4 | 1P22-4 | 1P23-4 | 1P24-4 | 1P25-4 | 1P26-4 | 1P27-4 | 1P28-4 |

TABLE IVb

2nd CD-DASD product codeword.

| | | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|
| | | | 1/24 | 8/31 | 9/32 | 16/39 | 17/40 | 2/25 | 3/26 | 10/33 | 11/34 | 1/41 | 19/42 | | |
| 29 | 27/1 | 0 | D595 | D602 | D603 | D610 | D611 | D596 | D597 | D504 | D505 | D512 | D513 | 2P29-1 | 2P29-2 |
| 30 | 28/2 | 0 | D618 | D625 | D626 | D633 | D634 | D519 | D520 | D527 | D528 | D535 | D536 | 2P30-1 | 2P30-2 |
| 31 | 1/3 | 0 | D641 | D648 | D649 | D656 | D657 | D642 | D843 | D850 | D851 | D858 | D859 | 2P31-1 | 2P31-2 |
| 32 | 2/4 | 0 | D664 | D871 | D872 | D879 | D880 | D885 | D666 | D873 | D874 | D881 | DS82 | 2P32-1 | 2P32-2 |
| 33 | 3/5 | 0 | D667 | D594 | D695 | D702 | D703 | D666 | D669 | D596 | D897 | D704 | D705 | 2P33-1 | 2P33-2 |
| 34 | 4/6 | 0 | D710 | D717 | D718 | D725 | D726 | D711 | D712 | D719 | D720 | D727 | D728 | 2P34-1 | 2P34-2 |
| 35 | 5/7 | 0 | D733 | D743 | D741 | D748 | D749 | D734 | D735 | D742 | D743 | D750 | D751 | 2P35-1 | 2P35-2 |
| 36 | 6/8 | 0 | D756 | D763 | D764 | D771 | D772 | D757 | D758 | D765 | D766 | D773 | D774 | 2P36-1 | 2P36-2 |
| 37 | 7/9 | 0 | D779 | D788 | D787 | D794 | D795 | D780 | D781 | D788 | D789 | D796 | D797 | 2P37-1 | 2P37-2 |
| 38 | 8/10 | 0 | D802 | D809 | D810 | D817 | D816 | D803 | D804 | D811 | DB12 | DB19 | D820 | 2P38-1 | 2P38-2 |
| 39 | 9/11 | 0 | D825 | D832 | D833 | D840 | D841 | D826 | D827 | D834 | DB35 | D842 | D843 | 2P39-1 | 2P39-2 |
| 40 | 10/12 | 0 | D848 | D855 | D856 | D863 | D664 | D649 | D850 | D8S7 | D858 | D885 | D886 | 2P40-1 | 2P40-2 |
| 41 | 11/13 | 0 | D871 | D878 | D879 | D886 | D887 | D872 | D873 | D680 | D881 | D888 | D889 | 2P41-1 | 2P41-2 |
| 42 | 12/14 | 0 | D894 | D931 | D902 | D939 | D910 | D895 | D896 | D903 | D904 | D911 | D912 | 2P42-1 | 2P42-2 |
| 43 | 13/15 | 0 | D917 | D924 | D925 | D932 | D933 | D918 | D919 | D928 | D927 | D934 | D935 | 2P43-1 | 2P43-2 |
| 44 | 14/16 | 0 | D940 | D947 | D948 | D955 | D956 | D941 | D942 | D949 | D950 | D957 | D958 | 2P44-1 | 2P44-2 |
| 45 | 15/17 | 0 | D963 | D970 | D971 | D980 | D979 | D964 | D965 | D972 | D973 | D880 | D981 | 2P45-1 | 2P45-2 |
| 46 | 16/18 | 0 | D986 | D993 | D994 | D1001 | D1902 | D987 | D388 | D995 | D996 | D1962 | D1004 | 2P46-1 | 2P46-2 |
| 47 | 17/19 | 0 | D1009 | D1018 | D1017 | D1024 | D1025 | D1010 | D1011 | D1018 | D1019 | D1036 | D1027 | 2P47-1 | 2P47-2 |
| 48 | 15/20 | 0 | D1032 | D1039 | D1040 | D1047 | D1948 | D1033 | D1934 | D1941 | D1042 | D1049 | D1D50 | 2P48-1 | 2P48-2 |
| 49 | 19/21 | 0 | D1055 | D1962 | D10B3 | D1070 | D1071 | D1D56 | D10S7 | D1964 | D1965 | D1072 | D1073 | 2P49-1 | 2P49-2 |
| 50 | 20/22 | 0 | D1078 | D1085 | D1086 | D1093 | D1094 | D1079 | D1080 | D1DB7 | D1968 | D1095 | D1096 | 2P50-1 | 2P50-2 |
| 51 | 21/23 | 0 | D1101 | D1105 | D1109 | D1116 | D1117 | D1103 | D1103 | D1110 | D1111 | D1118 | D1119 | 2P51-1 | 2P51-2 |
| 52 | 22/24 | 0 | D1124 | D1131 | D1132 | D1139 | D1143 | D1125 | D1126 | D1133 | D1134 | D1141 | D1142 | 2P52-1 | 2P52-2 |
| 53 | 23/25 | 0 | D1147 | D1154 | D1155 | D1162 | D1163 | D1148 | D1149 | D1156 | D1157 | D1164 | D1165 | 2P53-1 | 2P53-2 |
| 54 | 24/26 | 0 | D1170 | D1177 | D1178 | D1185 | D1188 | D1171 | D1172 | D1179 | D1180 | D1181 | D1188 | 2P54-1 | 2P54-2 |
| 55 | 25/27 | 0 | D1193 | D1233 | D1201 | D1208 | D1209 | D1194 | D1195 | D1202 | D1203 | D1210 | D1211 | 2P55-1 | 2P55-2 |
| 56 | 26/28 | 0 | D1216 | D1223 | D1224 | D1231 | D1232 | D1217 | D1218 | D1225 | D1226 | D1233 | D1234 | 2P56-1 | 2P56-2 |
| | | 1P29-1 | 1P30-1 | 1P31-1 | 1P32-1 | 1P33-1 | 1P34-1 | 1P35-1 | 1P36-1 | 1P37-1 | 1P38-1 | 1P39-1 | 1P40-1 | 1P41-1 | 1P42-1 |
| | | 1P29-2 | 1P30-2 | 1P31-2 | 1P32-2 | 1P33-2 | 1P34-2 | 1P35-2 | 1P36-2 | 1P37-2 | 1P38-2 | 1P39-2 | 1P40-2 | 1P41-2 | 1P42-2 |
| | | 1P29-3 | 1P30-3 | 1P31-3 | 1P32-3 | 1P33-3 | 1P34-3 | 1P35-3 | 1P36-3 | 1P37-3 | 1P38-3 | 1P39-3 | 1P40-3 | 1P41-3 | 1P42-3 |
| | | 1P29-4 | 1P30-4 | 1P31-4 | 1P32-4 | 1P33-4 | 1P34-4 | 1P35-4 | 1P36-4 | 1P37-4 | 1P38-4 | 1P39-4 | 1P40-4 | 1P41-4 | 1P42-4 |

| | | 43 | 44 | 45 | 46 | 47 | 48 | 49 | 50 | 51 | 52 | 53 | 54 | 55 | 56 |
|---|---|---|---|---|---|---|---|---|---|---|---|---|---|---|---|
| | | | | 27 | 28 | 35 | 36 | 43 | 44 | 29 | 30 | 37 | 38 | 45 | 46 |
| 29 | 27/1 | 2P29-3 | 2P29-4 | D644 | D645 | D652 | D653 | D880 | D881 | D546 | D647 | D654 | D655 | D662 | D663 |
| 30 | 28/2 | 2P30-3 | 2P30-4 | D667 | D888 | DS75 | DB76 | D883 | D664 | D569 | D570 | D677 | D678 | D665 | D666 |
| 31 | 1/3 | 2P31-3 | 2P31-4 | D690 | D591 | D698 | DB99 | D706 | D707 | D892 | D893 | D700 | D701 | D708 | D709 |
| 32 | 2/4 | 2P32-3 | 2P32-4 | D713 | D714 | D721 | D722 | D729 | D730 | D715 | D716 | D723 | D724 | D731 | D732 |
| 33 | 3/5 | 2P33-3 | 2P33-4 | D736 | D737 | D744 | D745 | D752 | D753 | D738 | D739 | D746 | D747 | D754 | D755 |
| 34 | 4/6 | 2P34-3 | 2P34-4 | D759 | D760 | D767 | D768 | D775 | D776 | D761 | D762 | D769 | D770 | D777 | D778 |
| 35 | 5/7 | 2P35-3 | 2P35-4 | D782 | D783 | D790 | D791 | D798 | D799 | D764 | D785 | D792 | D793 | D800 | D801 |
| 36 | 6/8 | 2P36-3 | 2P36-4 | D805 | D806 | D813 | D814 | D821 | D822 | D807 | D808 | DB15 | D816 | D823 | D824 |
| 37 | 7/9 | 2P37-3 | 2P37-4 | D828 | D829 | D838 | D837 | D644 | D845 | D832 | D831 | D838 | D839 | D846 | D847 |
| 38 | 8/10 | 2P38-3 | 2P38-4 | D851 | DB52 | D859 | D850 | D857 | D868 | D853 | D854 | D881 | D882 | D869 | D870 |
| 39 | 9/11 | 2P39-3 | 2P39-4 | D874 | DB75 | D882 | D883 | DB90 | DB91 | D876 | D877 | D884 | D885 | D892 | D893 |
| 40 | 10/12 | 2P40-3 | 2P40-4 | D897 | D898 | D905 | D936 | D913 | D914 | D899 | D9000 | D907 | D908 | D915 | D916 |
| 41 | 11/13 | 2P41-3 | 2P41-4 | D920 | D921 | D928 | DB29 | D936 | D937 | D922 | D923 | D933 | D931 | D938 | D339 |
| 42 | 12/14 | 2P42-3 | 2P42-4 | D943 | D944 | D951 | DB52 | D959 | D980 | D945 | D946 | D353 | D954 | D961 | D962 |
| 43 | 13/15 | 2P43-3 | 2P43-4 | D966 | D967 | D974 | DB75 | D982 | D983 | D968 | D889 | D976 | D977 | D964 | D985 |
| 44 | 14/16 | 2P44-3 | 2P44-4 | D989 | D990 | D997 | D998 | D1005 | D1006 | D991 | DB92 | D999 | D1000 | D1007 | D1008 |
| 45 | 15/17 | 2P45-3 | 2P45-4 | D1012 | D1013 | D1000 | D1021 | D1028 | D1029 | D1014 | D1015 | D1022 | D1023 | D1000 | D1031 |
| 46 | 16/18 | 2P46-3 | 2P46-4 | D1035 | D1036 | D1043 | D1944 | D1051 | D1962 | D1037 | D1038 | D1945 | D1046 | D1053 | D1054 |
| 47 | 17/19 | 2P47-3 | 2P47-4 | D1058 | D1059 | D1085 | D1967 | D1074 | D1075 | D1080 | D1961 | D1968 | D1969 | D1076 | D1077 |
| 48 | 15/20 | 2P48-3 | 2P48-4 | D1081 | D1082 | D1039 | D1090 | D1097 | D1098 | D1083 | D1084 | D1081 | D1092 | D1099 | D1100 |
| 49 | 19/21 | 2P49-3 | 2P49-4 | D1104 | D1105 | D1112 | D1113 | P1120 | D1121 | D1196 | D1107 | D1114 | D1115 | D1122 | D1123 |
| 50 | 20/22 | 2P50-3 | 2P50-4 | D1127 | D1128 | D1135 | D1136 | D1143 | D1144 | D1129 | D1133 | D1137 | D1138 | D1145 | D1145 |
| 51 | 21/23 | 2P51-3 | 2P51-4 | D1150 | D1151 | D1158 | D1159 | D1165 | D1167 | D1152 | D1153 | D1180 | D1161 | D1168 | D1169 |
| 52 | 22/24 | 2P52-3 | 2P52-4 | D1173 | D1174 | D1181 | D1182 | D1189 | D1190 | D1175 | D1176 | D1183 | D1184 | D1191 | D1192 |
| 53 | 23/25 | 2P53-3 | 2P53-4 | D1196 | D1191 | D1204 | D1205 | D1212 | D1213 | D1198 | D1199 | D1296 | D1207 | D1214 | D1215 |
| 54 | 24/26 | 2P54-3 | 2P54-4 | D1219 | D1220 | D1227 | D1228 | D1235 | D1238 | D1221 | D1222 | D1229 | D1230 | D1237 | D1238 |
| 55 | 25/27 | 2P55-3 | 2P55-4 | D1242 | D1243 | D1250 | D1251 | D1258 | D1259 | D1244 | D1245 | D1252 | D1253 | D1260 | D1261 |
| 56 | 26/28 | 2P56-3 | 2P56-4 | D1265 | D1266 | D1273 | D1274 | D1281 | D1282 | D1267 | D1268 | D1275 | D1276 | D1283 | D1284 |
| | | 1P43-1 | 1P44-1 | 1P45-1 | 1P46-1 | 1P47-1 | 1P48-1 | 1P49-1 | 1P50-1 | 1P51-1 | 1P52-1 | 1P53-1 | 1P54-1 | 1P55-1 | 1P56-1 |
| | | 1P43-2 | 1P44-2 | 1P45-2 | 1P46-2 | 1P47-2 | 1P48-2 | 1P49-2 | 1P50-2 | 1P51-2 | 1P52-2 | 1P53-2 | 1P54-2 | 1P55-2 | 1P56-2 |
| | | 1P43-3 | 1P44-3 | 1P45-3 | 1P46-3 | 1P47-3 | 1P48-3 | 1P49-3 | 1P50-3 | 1P51-3 | 1P52-3 | 1P53-3 | 1P54-3 | 1P55-3 | 1P56-3 |
| | | 1P43-4 | 1P44-4 | 1P45-4 | 1P46-4 | 1P47-4 | 1P48-4 | 1P49-4 | 1P50-4 | 1P51-4 | 1P52-4 | 1P53-4 | 1P54-4 | 1P55-4 | 1P56-4 |

TABLE IVc

3rd CD-D450 Product codeword.

| | | 57 | 58 | 59 | 60 | 61 | 62 | 63 | 64 | 65 | 66 | 67 | 68 | 69 70 |
|---|---|---|---|---|---|---|---|---|---|---|---|---|---|---|
| | | | 24/47 | 31/54 | 32/55 39/62 | 40/63 | 25/48 | 26/49 | 33/56 | 34/51 | 37/54 | 42/65 | | |
| 57 | 27/1 | 0 | D1239 | D1248 | D1247 | D1254 | D1255 | D1240 | D1241 | D1248 | D1249 | D1256 | D1257 | ZP57-1 ZP57-2 |
| 58 | 28/2 | 0 | D1262 | D1269 | D1210 | D1211 | D1278 | D1263 | D1264 | D1271 | D1272 | D1279 | D1280 | ZP58-1 ZP58-2 |
| 59 | 1/3 | 0 | D1285 | D1292 | D1293 | D1300 | D1301 | D1286 | D1281 | D1294 | D1295 | D1302 | D1303 | ZP59-1 ZP59-2 |
| 80 | 2/4 | 0 | D130B | D1315 | D1318 | D1323 | D1324 | D1309 | D1310 | D1317 | D131B | D1325 | D1326 | ZP60-1 ZP60-2 |
| 61 | 3/5 | 0 | D1331 | D1338 | D1339 | D1346 | D1347 | D1332 | D1333 | D1340 | D1341 | D1348 | D1349 | ZP61-1 ZP61-2 |
| 62 | 4/6 | 0 | D1354 | D1361 | D1362 | D1369 | D1370 | D1355 | D1358 | D1363 | D1384 | D1371 | D1372 | ZP62-1 ZP62-2 |
| 63 | 5/7 | 0 | D1377 | D1384 | D1385 | D1392 | D1393 | D1378 | D1379 | D1386 | D1367 | D1394 | D1395 | ZP63-1 ZP63-2 |
| 64 | 6/8 | 0 | D1400 | D1407 | D1438 | D1415 | D1416 | D1401 | D1402 | D1409 | D1410 | D1417 | D1418 | ZP64-1 ZP64-2 |
| 65 | 7/9 | 0 | D1423 | D1433 | D1431 | D1438 | D1439 | D1424 | D1425 | D1432 | D1433 | D144D | D1441 | ZP65-1 2P65-2 |
| 66 | 8/10 | 0 | D1448 | D1453 | D1454 | D1461 | D1462 | D1447 | D1448 | D1455 | D1456 | D1463 | D1464 | ZP66-1 ZP66-2 |
| 67 | 9/11 | 0 | D1469 | D1476 | D1477 | D1464 | D1485 | D1470 | D1471 | D1478 | D1479 | D1486 | D1487 | ZP67-1 ZP67-2 |
| 68 | 16/12 | 0 | D1492 | D1499 | D1500 | D1537 | D1568 | D1493 | D1494 | D1501 | D1502 | D1509 | D1510 | ZP68-1 ZP68-2 |
| 69 | 11/13 | 0 | D1515 | D1522 | D1523 | D1533 | D1531 | D1516 | D1517 | D1524 | D1525 | D1532 | D1533 | ZP69-1 ZP69-2 |
| 70 | 12/14 | 0 | D1538 | D1545 | D1545 | D1553 | D1554 | D1539 | D1540 | D1541 | D1546 | D15ss | D1556 | ZP70-1 ZP70-2 |
| 11 | 13/13 | 0 | D1561 | D1568 | D1569 | D1576 | D1511 | D1562 | D1563 | D1570 | D1571 | D1578 | D1579 | ZP71-1 ZP71-2 |
| 72 | 14/16 | 0 | D1584 | D1591 | D1592 | D1599 | D1600 | D1585 | D1588 | D1593 | D1594 | D1801 | D1802 | ZP72-1 2P72-2 |
| 73 | 15/17 | 0 | D1637 | D1614 | D1615 | D1622 | D1623 | D1638 | D1639 | D1616 | D1617 | D1624 | D1625 | ZP73-1 ZP73-2 |
| 74 | 16/18 | 0 | D1632 | D1637 | D1638 | D1645 | D1648 | D1631 | D1632 | D1639 | D1640 | D1647 | D1648 | ZP74-1 ZP74-2 |
| 75 | 17/19 | 0 | D1653 | D1663 | D1661 | D1668 | D1669 | D1654 | D1655 | D1862 | D1663 | D1670 | D1671 | ZP75-1 ZP75-2 |
| 76 | 18/20 | 0 | D1676 | D1663 | D1684 | D1691 | D1692 | D1677 | D1678 | D1685 | D1686 | D1693 | D1694 | ZP76-1 ZP76-2 |
| 77 | 19/21 | 0 | D1699 | D1706 | D1707 | D1714 | D1715 | D1700 | D1701 | D1708 | D1109 | D1716 | D1717 | ZP77-1 ZP77-2 |
| 78 | 29/22 | 0 | D1722 | D1129 | D1730 | D1737 | D1738 | D1723 | D1124 | D1131 | D1732 | D1739 | D1740 | ZP78-1 ZP78-2 |
| 79 | 21/23 | 0 | D1745 | D1752 | D1753 | D1780 | D1161 | D1748 | D1747 | D1754 | D1755 | D1762 | D1763 | ZP79-1 ZP79-2 |
| 80 | 22/24 | 0 | D1768 | D1115 | D1778 | D1783 | D1784 | D1769 | D1770 | D1711 | D1778 | D1785 | D1786 | ZP80-1 ZP80-2 |
| 81 | 23/25 | 0 | D1791 | D1796 | D1799 | D1896 | D1807 | D1792 | D1793 | D1800 | D1801 | D1808 | D1809 | ZP81-1 ZP81-2 |
| 82 | 24/26 | 0 | D1814 | D1821 | D1822 | D1829 | D1830 | D1815 | D1816 | D1823 | D1824 | D1831 | D1832 | ZP82-1 ZP82-2 |
| 83 | 25/27 | 0 | D1637 | D1864 | D1645 | D1852 | D1853 | D1838 | D1839 | D1848 | D1847 | D1854 | D1855 | ZP83-1 ZP83-2 |
| 84 | 26/28 | 0 | D1860 | D1867 | D1888 | D1875 | D1876 | D1861 | D1862 | D1869 | D1870 | D1877 | D1878 | ZP84-1 ZP84-2 |
| | | IP57.1 | IP58.1 | IP59.1 | IP60.1 | IP61.1 | IP62.1 | IP63.1 | IP64.1 | IP65.1 | IP66.1 | IP67.1 | IP68.1 | IP69.1 IP70.1 |
| | | IP57.2 | IP58.2 | IP59.2 | IP60.2 | IP61.2 | IP62.2 | IP63.2 | IP64.2 | IP65.2 | IP66.2 | IP67.2 | IP68.2 | IP69.2 IP70.2 |
| | | IP57.3 | IP58.3 | IP59.3 | IP60.3 | IP61.3 | IP62.3 | IP63.3 | IP64.3 | IP65.3 | IP66.3 | IP67.3 | IP68.3 | IP69.3 IP70.3 |
| | | IP57.4 | IP58.4 | IP59.4 | IP60.4 | IP61.4 | IP62.4 | IP63.4 | IP64.4 | IP65.4 | IP66.4 | IP67.4 | IP68.4 | IP69.4 IP70.4 |
| | | 71 | 72 | 73 | 74 | 75 | 76 | 77 | 78 | 79 | 80 | 81 | 82 | 83 84 |
| | | | | 50 | 51 | 58 | 59 | 66 | 67 | 52 | 53 | 60 | 61 | 68 69 |
| 57 | 27/1 | ZP57-3 | ZP57-4 | D1288 | D1289 | D1296 | D1297 | D1304 | D1305 | D1290 | D1291 | D1298 | D1299 | D1306 D1307 |
| 58 | 28/2 | ZP58-3 | ZP58-4 | D1311 | D1312 | D1319 | D1320 | D1327 | D1326 | D1313 | D1314 | D1321 | D1322 | D1329 D1330 |
| 59 | 1/3 | ZP59-3 | ZP59-4 | D1334 | D1335 | D1342 | D1343 | D1350 | D1351 | D1336 | D1337 | D1344 | D1345 | D1352 D1353 |
| 80 | 2/4 | ZP60-3 | ZP60-4 | D1357 | D1358 | D1385 | D1366 | D1373 | D1374 | D1359 | D1360 | D1367 | D1366 | D1375 D1376 |
| 61 | 3/5 | 2P61-3 | ZP61-4 | D1380 | D1381 | D1388 | D1369 | D1396 | D1397 | D1382 | D1383 | D1393 | D1391 | D1398 D1399 |

TABLE IVc-continued

3rd CD-D450 Product codeword.

| | | | | | | | | | | | | | | | |
|---|---|---|---|---|---|---|---|---|---|---|---|---|---|---|---|
| 62 | 4/6 | 2P62-3 | ZP62-4 | D1403 | D1404 | D1411 | D1412 | D1419 | D142D | D1405 | D1406 | | D1413 | D1414 | D1421<br>D1422 |
| 63 | 5/7 | ZP63-3 | ZP63-4 | D1426 | D1427 | D1434 | D1435 | D1442 | D1443 | D1428 | D1429 | | D1436 | D1437 | D1444<br>D1445 |
| 64 | 6/8 | ZP64-3 | ZP64-4 | D1449 | D1450 | D1457 | D1458 | D1465 | D1456 | D1451 | D1452 | | D1459 | D1460 | D1457<br>D1458 |
| 65 | 7/9 | ZP65-3 | ZP65-4 | D1472 | D1473 | D1480 | D1481 | D1488 | D1489 | D1474 | D1475 | | D1462 | D1463 | D1490<br>D1491 |
| 66 | 8/10 | ZP66-3 | ZP66-4 | D1495 | D1496 | D1523 | D1504 | D1511 | D1512 | D1497 | D1498 | | D1505 | D1506 | D1513<br>D1514 |
| 67 | 9/11 | ZP67-3 | ZP67-4 | D1518 | D1519 | D1526 | D1527 | D1534 | D1535 | D1520 | D1521 | | D1528 | D1529 | D1536<br>D1537 |
| 68 | 16/12 | ZP68-3 | ZP68-4 | D1541 | D1542 | D1549 | D1550 | D1557 | D1558 | D1543 | D1544 | | D1551 | D1552 | D1559<br>D1580 |
| 69 | 11/13 | ZP69-3 | ZP69-4 | D1564 | D1565 | D1572 | D1573 | D1580 | D1581 | D1566 | D1567 | | D1574 | D1575 | D1582<br>D1583 |
| 70 | 12/14 | ZP70-3 | ZP70-4 | D1587 | D1588 | D1595 | D1596 | D1803 | D1604 | D1589 | D1592 | | D1597 | D1598 | D1605<br>D1639 |
| 11 | 13/13 | ZP71-3 | ZP71-4 | D1610 | D1611 | D1618 | D1819 | D1626 | D1627 | D1812 | D1613 | | D1620 | D1621 | D1628<br>D1629 |
| 72 | 14/16 | ZP72-3 | ZP72-4 | D1633 | D1634 | D1641 | D1642 | D1649 | D1650 | D1635 | D1636 | | D1643 | D1644 | D1651<br>D1652 |
| 73 | 15/17 | ZP73-3 | ZP73-4 | D1856 | D16S1 | D1664 | D1665 | D1672 | D1673 | D1658 | D1659 | | D1666 | D1667 | D1674<br>D1675 |
| 74 | 16/18 | ZP74-3 | ZP74-4 | D1679 | D1680 | D1687 | D1688 | D1695 | D1696 | D1681 | D1682 | | D5659 | D5693 | D1697<br>D1698 |
| 75 | 17/19 | ZP75-3 | ZP75-4 | D1702 | D1105 | D1710 | D1711 | D1118 | D1719 | D1704 | D1705 | | D1712 | D1713 | D172D<br>D1721 |
| 76 | 18/20 | ZP76-3 | ZP76-4 | D1725 | D1126 | D1733 | D1134 | D1741 | D1742 | D1727 | D1728 | | D1735 | D1736 | D1743<br>D1744 |
| 77 | 19/21 | ZP77-3 | ZP77-4 | D1748 | D1749 | D1756 | D1757 | D1764 | D1765 | D1750 | D1751 | | D1758 | D1759 | D1766<br>D1767 |
| 78 | 29/22 | ZP78-3 | ZP78-4 | D1111 | D1112 | D1779 | D1780 | D1787 | D1788 | D1773 | D1714 | | D1781 | D1782 | D1789<br>D1792 |
| 79 | 21/23 | ZP79-3 | ZP79-4 | D1794 | D1795 | D1802 | D1803 | D1810 | D1811 | D1796 | D1797 | | D1804 | D1805 | D1812<br>D1813 |
| 80 | 22/24 | ZP80-3 | ZP80-4 | D1817 | D1818 | D1825 | D1826 | D1833 | D1834 | D1819 | D1820 | | D1827 | D1828 | D1835<br>D1836 |
| 81 | 23/25 | ZP81-3 | ZP80-4 | D1840 | D1841 | D1848 | D1649 | D1856 | D1857 | D1642 | D1643 | | D1853 | D1851 | D1858<br>D1859 |
| 82 | 24/26 | ZP83-3 | ZP83-4 | D1863 | D1864 | D1871 | D1872 | D1879 | D1880 | D1865 | D1856 | | D1873 | D1874 | D1881<br>D1882 |
| 83 | 25/27 | ZP83-3 | ZP83-4 | D1886 | D1887 | D1894 | D1895 | D1922 | D1903 | D1688 | D1689 | | D1896 | D1B91 | D1904<br>D1965 |
| 84 | 26/28 | ZP84-3 | ZP84-4 | D1909 | D1910 | D1917 | D1918 | D1925 | D1926 | D1911 | D1912 | | D1919 | D1920 | D1927<br>D1928 |
| | | IP71.1 | IP72.1 | IP73.1 | IP74.1 | IP75.1 | IP76.1 | IP77.1 | IP78.1 | IP79.1 | IP80.1 | | IP81.1 | IP82.1 | IP83.1<br>IP84.1 |
| | | IP71.2 | IP72.2 | IP73.2 | IP74.2 | IP75.2 | IP76.2 | IP77.2 | IP78.2 | IP79.2 | IP80.2 | | IP81.2 | IP82.2 | IP83.2<br>IP84.2 |
| | | IP71.3 | IP72.3 | IP73.3 | IP74.3 | IP75.3 | IP76.3 | IP77.3 | IP78.3 | IP79.3 | IP80.3 | | IP81.3 | IP82.3 | IP83.3<br>IP84.3 |
| | | IP71.4 | IP72.4 | IP73.4 | IP74.4 | IP75.4 | IP76.4 | IP77.4 | IP78.4 | IP79.4 | IP80.4 | | IP81.4 | IP82.4 | IP83.4<br>IP84.4 |

TABLE IVd

4th CD-DASD product codeword.

| | | 85 | 66 | B7 | 86 | 89 | 90 | 91 | 92 | 93 | 94 | 95 | 96 | 97 | 98 |
|---|---|---|---|---|---|---|---|---|---|---|---|---|---|---|---|
| | | | 47/70 | 54/77 | 55/78 | 76/85 | 77/86<br>48/71 | 49/72 | 56/79 | 57/80 | 64/87 | 65/88 | | | |
| 85 | 27/1 | 0 | D1883 | D1B90 | D1B91 | D1898 | D1899 | D1884 | D1885 | D1892 | D1893 | D1990 | D1901 | 2P85-1 | 2P85-2 |
| 86 | 28/2 | 0 | D1906 | D1913 | D1914 | D1921 | D1922 | D1907 | D1908 | D1915 | D1916 | D1923 | D1924 | 2P86-1 | 2P86-2 |
| 87 | 1/3 | 0 | D1929 | D1938 | D1931 | D1944 | D1945 | D1930 | D1931 | D1938 | D1939 | D1946 | D1947 | 2P87-1 | 2P87-2 |
| 88 | 2/4 | 0 | D1952 | D1959 | D1980 | D1967 | D1968 | D1953 | D1954 | D1975 | D1976 | D1969 | D1970 | 2P88-1 | 2P88-2 |
| 89 | 3/5 | 0 | D1975 | D1982 | D1983 | D1990 | D1991 | D1976 | D1977 | D1984 | D1985 | D1992 | D1993 | 2P89-1 | 2P89-2 |
| 90 | 4/6 | 0 | D1998 | D2906 | D2008 | D2013 | D2014 | D1999 | D2000 | D2037 | D2008 | D2015 | D2016 | 2P90-1 | 2P90-2 |
| 91 | 5/7 | 0 | D2021 | D2028 | D2029 | D2336 | D2037 | D2022 | D2023 | D2030 | D2031 | D2038 | D2039 | 2P91-1 | 2P91-2 |
| 92 | 6/8 | 0 | D2044 | CRC3 | CRC4 | 3P7 | 3P8 | D2045 | D2046 | 3P1 | 3P2 | 3P9 | 3P10 | 2P92-1 | 2P92-2 |
| 93 | 7/9 | 0 | 3P15 | 3P22 | 3P23 | 3P44 | 3P45 | 3P16 | 3P17 | 3P24 | 3P25 | 3P32 | 3P33 | 2P93-1 | 2P93-2 |
| 94 | 8/10 | 0 | 3P38 | 3P45 | 3P46 | 3P53 | 3P54 | 3P39 | 3P40 | 3P47 | 3P48 | 3P55 | 3P56 | 2P94-1 | 2P94-2 |
| 95 | 9/11 | 0 | 3PB1 | 3PB8 | 3PB9 | 3P76 | 3P77 | 3P76 | 3PB3 | 3P10 | 3P71 | 3P78 | 3P79 | 2P95-1 | 2P95-2 |
| 96 | 10/12 | 0 | 3P84 | 3P91 | 3P92 | 3P99 | 3P100 | 3P85 | 3P86 | 3P83 | 3P94 | 3P101 | 3P102 | 2P96-1 | 2P96-2 |
| 97 | 11/13 | 0 | 3P107 | 3P114 | 3P115 | 3P122 | 3P123 | 3P108 | 3P108 | 3P116 | 3P117 | 3P124 | 3P125 | 2P97-1 | 2P97-2 |
| 98 | 12/14 | 0 | 3P130 | 3P137 | 3P138 | 3P145 | 3P148 | 3P131 | 3P132 | 3P139 | 3P142 | 3P147 | 3P148 | 2P98-1 | 2P98-2 |
| 99 | 13/15 | 0 | 3P153 | 3P180 | 3P175 | 3P168 | 3P169 | 3P154 | 3P155 | 3P176 | 3P177 | 3P170 | 3P371 | 2P99-1 | 2P99-2 |
| 100 | 14/16 | 0 | 3P176 | 3P383 | 3P164 | 3P191 | 3P192 | 3P177 | 3P178 | 3P185 | 3P166 | 3P193 | 3P194 | 2P100-1 | 2P100-2 |

TABLE IVd-continued

4th CD-DASD product codeword.

| | | | | | | | | | | | | | | | |
|---|---|---|---|---|---|---|---|---|---|---|---|---|---|---|---|
| 101 | 15/17 | 0 | Res.3 | D2050 | D2051 | D2058 | D2039 | Res.4 | Res.5 | D2052 | D2053 | D2080 | D2075 | 2P101-1 | 2P101-2 |
| 102 | 16/18 | 0 | D2966 | D2073 | D2074 | D2081 | D2082 | D2067 | D2068 | D2075 | D2078 | D2083 | D2084 | 2P102-1 | 2P102-2 |
| 103 | 17/19 | 0 | D2089 | D2096 | D2097 | D2104 | D2105 | D2090 | D2091 | D2098 | D2099 | D2108 | D2107 | 2P103-1 | 2P103-2 |
| 104 | 15/20 | 0 | D2112 | D2119 | D2120 | D2127 | D2128 | D2113 | D2114 | D2121 | D2122 | D2129 | D2130 | 2P104-1 | 2P104-2 |
| 105 | 19/21 | 0 | D2135 | D2142 | D2143 | D2150 | D2151 | D2138 | D2137 | D2144 | D2145 | D2152 | D2153 | 2P105-1 | 2P105-2 |
| 106 | 20/22 | 0 | D2158 | D2165 | D2186 | D2173 | D2174 | D2159 | D2160 | D2167 | D2168 | D2175 | D2176 | 2P106-1 | 2P106-2 |
| 107 | 21/23 | 0 | D2181 | D2188 | D2189 | D2196 | D2197 | D2182 | D2182 | D2190 | D2191 | D2198 | D2199 | 2P107-1 | 2P107-2 |
| 108 | 22/24 | 0 | D2204 | D2211 | D2212 | D2219 | D2220 | D2215 | D2208 | D2213 | D2214 | D2221 | D2222 | 2P108-1 | 2P108-2 |
| 109 | 23/25 | 0 | D2227 | D2234 | D2235 | D2242 | D2243 | D2228 | D2229 | D2236 | D2237 | D2244 | D2245 | 2P109-1 | 2P109-2 |
| 110 | 24/26 | 0 | D2250 | D2257 | D2258 | D2265 | D2268 | D2251 | D2252 | D2259 | D2280 | D2267 | D2268 | 2P110-1 | 2P110-2 |
| 111 | 25/27 | 0 | D2273 | D2280 | D2281 | D2286 | D2289 | D2274 | D2275 | D2282 | D2283 | D2290 | D2291 | 2P111-1 | 2P111-2 |
| 112 | 26/38 | 0 | D2296 | D2303 | D2304 | D2311 | D2312 | D2297 | D2298 | D2305 | D2336 | D2313 | D2314 | 2P112-1 | 2P112-2 |
| | | IP85-1 | IP86-1 | IP87-1 | IP88-1 | IP89-1 | IP90-1 | IP91-1 | IP92-1 | IP93-1 | IP94-1 | IP95-1 | IP96-1 | IP97-1 | IP98-1 |
| | | IP85-2 | IP86-2 | IP87-2 | IP88-2 | IP89-2 | IP90-2 | IP91-2 | IP92-2 | IP93-2 | IP94-2 | IP95-2 | IP96-2 | IP97-2 | IP98-2 |
| | | IP85-3 | IP86-3 | IP87-3 | IP88-3 | IP89-3 | IP90-3 | IP91-3 | IP92-3 | IP93-3 | IP94-3 | IP95-3 | IP96-3 | IP97-3 | IP98-3 |
| | | IP85-4 | IP86-4 | IP87-4 | IP88-4 | IP89-4 | IP90-4 | IP91-4 | IP92-4 | IP93-4 | IP94-4 | IP95-4 | IP96-4 | IP97-4 | IP98-4 |

| | | 99 | 100 | 101 | 102 | 103 | 104 | 105 | 108 | 107 | 108 | 109 | 110 | 111 | 112 |
|---|---|---|---|---|---|---|---|---|---|---|---|---|---|---|---|
| | | | | 73 | 74 | 81 | 82 | 89 | 90 | 75 | 76 | 83 | 84 | 91 | 92 |
| 85 | 27/1 | 2P85-3 | 2P85-4 | D1932 | D1933 | D1940 | D1941 | D1948 | D1949 | D1934 | D1935 | D1942 | D1943 | D1950 | D1951 |
| 86 | 28/2 | 2P86-3 | 2P86-4 | D1955 | D1956 | D1977 | D1964 | D1971 | D1972 | D1957 | D1958 | D1985 | D1966 | D1973 | D1974 |
| 87 | 1/3 | 2P87-3 | 2P87-4 | D1978 | D1979 | D1986 | D1987 | D1994 | D1995 | D1980 | D1981 | D1988 | D1989 | D1996 | D1997 |
| 88 | 2/4 | 2P88-3 | 2P88-4 | D2001 | D2902 | D2009 | D2010 | D2011 | D2018 | D2003 | D2004 | D2011 | D2012 | D2019 | D2020 |
| 89 | 3/5 | 2P89-3 | 2P89-4 | D2024 | D2025 | D2032 | D2033 | D2040 | D2041 | D2026 | D2027 | D2034 | D2035 | D2042 | D2043 |
| 90 | 4/6 | 2P90-3 | 2P90-4 | D2047 | D2048 | 3P3 | 3P4 | 3P11 | 3P12 | CRC1 | CRC2 | 3P5 | 3P6 | 3P13 | 3P14 |
| 91 | 5/7 | 2P91-3 | 2P91-4 | 3P18 | 3P19 | 3P26 | 3P27 | 3P34 | 3P35 | 3P20 | 3P21 | 3P28 | 3P | 3P36 | 3P37 |
| 92 | 6/8 | 2P92-3 | 2P92-4 | 3P41 | 3P42 | 3P49 | 3P50 | 3Ps7 | 3P58 | 2P43 | 3P44 | 3P51 | 3P52 | 3P59 | 3P80 |
| 93 | 7/9 | 2P93-3 | 2P93-4 | 3P64 | 3P65 | 3P72 | 3P73 | 3P80 | 3PB1 | 3P66 | 3PB7 | 3P74 | 3P75 | 3PB2 | 3P83 |
| 94 | 8/10 | 2P94-3 | 2P94-4 | 3P87 | 3P88 | 3P95 | 3P96 | 3P103 | 3P104 | 3P89 | 3P90 | 3P97 | 3P98 | 3P105 | 3P106 |
| 95 | 9/11 | 2P95-3 | 2P95-4 | 3P110 | 3P111 | 3P118 | 3P119 | 3P126 | 3P127 | 3P112 | 3P113 | 3P120 | 3P121 | 3P128 | 3P129 |
| 96 | 10/12 | 2P96-3 | 2P96-4 | 3P133 | 3P134 | 3P141 | 3P142 | 3P149 | 3P135 | 3P136 | 3P143 | 3P144 | 3P151 | 3P152 | |
| | | | | | | | | 3P150 | | | | | | | |
| 97 | 11/13 | 2P97-3 | 2P97-4 | 3P156 | 3P157 | 3P164 | 3P165 | 3P172 | 3P173 | 3P158 | 3P159 | 3P166 | 3P167 | 3P174 | 3P175 |
| 98 | 12/14 | 2P98-3 | 2P98-4 | 3P179 | 3P182 | 3P167 | 3P188 | 3P195 | 3P196 | 3P181 | 3P182 | 3P189 | 3P190 | Res.1 | Res.2 |
| 99 | 13/15 | 2P99-3 | 2P99-4 | Res.6 | Res.7 | D2054 | D2055 | D2976 | D2977 | Res.8 | D2049 | D2056 | D2057 | D2964 | D20B5 |
| 100 | 14/16 | 2P100-3 | 2P100-4 | D2089 | D2070 | D2077 | D2078 | D2035 | D2085 | D3071 | D2072 | D2079 | D2080 | D2087 | D2088 |
| 101 | 15/17 | 2P101-3 | 2P101-4 | D2092 | D2093 | D2100 | D2101 | D2106 | D2108 | D2094 | D2095 | D2302 | D2103 | D2110 | D2111 |
| 102 | 16/18 | 2P102-3 | 2P102-4 | D2115 | D2116 | D2123 | D2124 | D2131 | D2132 | D2317 | D2118 | D2125 | D2126 | D2133 | D2134 |
| 103 | 17/19 | 2P103-3 | 2P103-4 | D2138 | D2139 | D2146 | D2147 | D2154 | D2155 | D2140 | D2141 | D2148 | D2349 | D2156 | D2157 |
| 104 | 15/20 | 2P104-3 | 2P104-4 | D2175 | D2176 | D2169 | D2170 | D2177 | D2178 | D2377 | D2164 | D2171 | D2172 | D2179 | D2150 |
| 105 | 19/21 | 2P105-3 | 2P105-4 | D2164 | D2185 | D2192 | D2193 | D2200 | D2201 | D2186 | D2187 | D2194 | D2195 | D2202 | D2203 |
| 106 | 20/22 | 2P106-3 | 2P106-4 | D2207 | D2208 | D2215 | D2216 | D2223 | D2224 | D2209 | D2210 | D2217 | D2218 | D2225 | D2226 |
| 107 | 21/23 | 2P107-3 | 2P107-4 | D2230 | D2231 | D2238 | D2239 | D2246 | D2247 | D2232 | D2233 | D2240 | D2241 | D2248 | D2249 |
| 108 | 22/24 | 2P108-3 | 2P108-4 | D2253 | D2254 | D2275 | D2276 | D2269 | D2270 | D2255 | D2256 | D2277 | D2264 | D2271 | D2272 |
| 109 | 23/25 | 2P109-3 | 2P109-4 | D2276 | D2277 | D2264 | D2285 | D2292 | D2293 | D2278 | D2279 | D2286 | D2287 | D2294 | D2295 |
| 110 | 24/26 | 2P110-3 | 2P110-4 | D2299 | D2300 | D2307 | D2308 | D2315 | D2316 | D2301 | b2302 | D2309 | D2310 | D2317 | D2318 |
| 111 | 25/27 | 2P111-3 | 2P111-4 | D2322 | D2323 | D2330 | D2331 | D2338 | D2339 | D2324 | D2325 | D2332 | D2333 | D2342 | D2341 |
| 112 | 26/38 | 2P112-3 | 2P112-4 | D2345 | D2346 | D2353 | D2354 | D2375 | D2376 | D2347 | D2348 | D2355 | D2356 | D2377 | D2364 |
| | | IP99-1 | IP100-1 | IP101-1 | IP102-1 | IP103-1 | IP104-1 | IP105-1 | IP106-1 | IP107-1 | IP108-1 | IP109-1 | IP110-1 | IP111-1 | IP112-1 |
| | | IP99-2 | IP100-2 | IP101-2 | IP102-2 | IP103-2 | IP104-2 | IP105-2 | IP106-2 | IP107-2 | IP108-2 | IP109-2 | IP110-2 | IP111-2 | IP112-2 |
| | | IP99-3 | IP100-3 | IP101-3 | IP102-3 | IP103-3 | IP104-3 | IP105-3 | IP106-3 | IP107-3 | IP108-3 | IP109-3 | IP110-3 | IP111-3 | IP112-3 |
| | | IP99-4 | IP100-4 | IP101-4 | IP102-4 | IP103-4 | IP104-4 | IP105-4 | IP106-4 | IP107-4 | IP108-4 | IP109-4 | IP110-4 | IP111-4 | IP112-4 |

TABLE IVe

5th CD-DASD product codeword.

| | | 113 | 114 | 115 | 116 | 117 | 118 | 119 | 120 | 121 | 122 | 123 | 124 | 125 | 126 |
|---|---|---|---|---|---|---|---|---|---|---|---|---|---|---|---|
| | | | 70/93 | 77/100 | 78/101 | 85/108 | 86/109 | 71/94 | 72/95 | 79/102 | 80/103 | 87/110 | 88/111 | | |
| 113 | 27/1 | 0 | D2319 | D2328 | D2327 | D2334 | D2335 | D2320 | D2321 | D2328 | D2329 | D2335 | D2337 | 2P113-1 | 2P113-2 |
| 114 | 28/2 | 0 | D2342 | D2349 | D2350 | D2357 | D2358 | D2343 | D2344 | D2351 | D2352 | D2359 | D2360 | 2P114-1 | 2P114-2 |
| 115 | 1/3 | 0 | D2365 | D2372 | D2373 | D2380 | D2381 | D2386 | D2367 | D2374 | D2375 | D2382 | D2383 | 2P115-1 | 2P115-2 |
| 116 | 2/4 | 0 | D2358 | D2395 | D2396 | D2403 | D2404 | D2389 | D2390 | D2397 | D2398 | D2405 | D2405 | 2P116-1 | 2P116-2 |
| 117 | 3/5 | 0 | D2411 | D2418 | D2419 | D2425 | D2427 | D2412 | D2413 | D2420 | D2421 | D2428 | D2429 | 2P117-1 | 2P117-2 |
| 118 | 4/6 | 0 | D2434 | D2441 | D2442 | D2449 | D2450 | D2435 | D2436 | D2443 | D2444 | D2451 | D2452 | 2P118-1 | 2P118-2 |
| 119 | 5/7 | 0 | D2457 | D2454 | D2455 | D2472 | D2473 | D2458 | D2459 | D2486 | D2467 | D2474 | D2415 | 2P119-1 | 2P119-2 |
| 120 | 6/8 0 | D2460 | D2487 | D2488 | D2495 | D2496 | D2481 | D2482 | D2489 | D2490 | D2497 | D2498 | 2P120-1 | 2P120-2 | |
| 121 | 7/9 | 0 | D2503 | D2510 | D2511 | D2518 | D2519 | D2594 | D2505 | D2512 | D2513 | D2520 | D2521 | 2P121-1 | 2P121-2 |
| 122 | 8/10 | 0 | D2526 | D2533 | D2534 | D2541 | D2542 | D2527 | D2528 | D2535 | D2538 | D2543 | D2544 | 2P122-1 | 2P122-2 |
| 123 | 9/11 | 0 | D2549 | D2558 | D2557 | D2564 | D2565 | D2550 | D2551 | D2558 | D2559 | D2586 | D2567 | 2P123-1 | 2P123-2 |
| 124 | 10/12 | 0 | D2572 | D2519 | D2589 | D2587 | D2558 | D2573 | D2574 | D2581 | D2582 | D2589 | D2590 | 2P124-1 | 2P124-2 |
| 125 | 11/13 | 0 | D2595 | D2602 | D2603 | D2750 | D2751 | D2595 | D2597 | D2604 | D2695 | D2752 | D2753 | 2P125 1 | 2P125-2 |

TABLE IVe-continued

5th CD-DASD product codeword.

| | | | | | | | | | | | | | | |
|---|---|---|---|---|---|---|---|---|---|---|---|---|---|---|
| 126 12/14 | 0 | D2758 | D2765 | D2766 | D2773 | D2774 | D2759 | D2760 | D2767 | D2768 | D2775 | D2776 | 2P126 1 | 2P126-2 |
| 127 13/15 | 0 | D2641 | D2648 | D2649 | D2658 | D2651 | D2642 | D2643 | D2660 | D2651 | D2658 | D2659 | 2P127-1 | 2P127-2 |
| 128 14/16 | 0 | D2664 | D2671 | D2672 | D2679 | D2680 | D2668 | D2686 | D2673 | D2674 | D2681 | D2682 | 2P128-1 | 2P128-2 |
| 129 15/17 | 0 | D2687 | D2694 | D2895 | D2702 | D2703 | D2668 | D2689 | D2696 | D2697 | D2704 | D2795 | 2P129-1 | 2P129-2 |
| 130 16/18 | 0 | D271D | D2717 | D2718 | D2725 | D2726 | D2711 | D2712 | D2719 | D2720 | D2727 | D2728 | 2P130-1 | 2P130-2 |
| 131 17/19 | 0 | D2733 | D2740 | D2741 | D2748 | D2749 | D2734 | D2735 | D2742 | D2743 | D2750 | D2751 | 2P131-1 | 2P131-2 |
| 132 18/20 | 0 | D2756 | D2777 | D2764 | D2771 | D2772 | D2757 | D2758 | D2765 | D2786 | D2773 | D2774 | 2P132-1 | 2P132-2 |
| 133 19/21 | 0 | D2779 | D2786 | D2787 | D2194 | D2795 | D2780 | D2781 | D2788 | D2789 | D2795 | D2797 | 2P133-1 | 2P133-2 |
| 134 20/22 | 0 | D2602 | D2809 | D2660 | D2817 | D2818 | D2803 | D2804 | D2811 | D2812 | D2819 | D2820 | 2P134-1 | 2P134-2 |
| 135 21/23 | 0 | D2825 | D2832 | D2833 | D2840 | D2841 | D2828 | D2827 | D2834 | D2535 | D2842 | D2843 | 2P135-1 | 2P135-2 |
| 136 22/24 | 0 | D2848 | D2855 | D2858 | D2877 | D2864 | D2849 | D2850 | D2657 | D2858 | D2865 | D2885 | 2P136-1 | 2P136-2 |
| 137 23/25 | 0 | D2871 | D2878 | D2819 | D2888 | D2887 | D2872 | D2873 | D2883 | D2881 | D2888 | D2889 | 2P137-1 | 2P137-2 |
| 138 24/26 | 0 | D2894 | D2901 | D2902 | D2909 | D2910 | D2895 | D2896 | D2903 | D2934 | D2911 | D2912 | 2P138-1 | 2P138-2 |
| 139 25/27 | 0 | D2917 | D2924 | D2925 | D2932 | D2933 | D2918 | D2919 | D2928 | D2927 | D2934 | D2935 | 2P139-1 | 2P139-2 |
| 140 26/28 | 0 | D2940 | D2947 | D2948 | D2985 | D2956 | D2941 | D2942 | D2949 | D2950 | D2957 | D2958 | 2P140-1 | 2P140-2 |
| | IP113-1 | IP114-1 | IP115-1 | IP116-1 | IP117-1 | IP118-1 | IP119-1 | IP120-1 | IP121-1 | IP122-1 | IP123-1 | IP124-1 | IP125-1 | IP126-1 |
| | IP113-2 | IP114-2 | IP115-2 | IP116-2 | IP117-2 | IP118-2 | IP119-2 | IP120-2 | IP121-2 | IP122-2 | IP123-2 | IP124-2 | IP125-2 | IP126-2 |
| | IP113-3 | IP114-3 | IP115-3 | IP116-3 | IP117-3 | IP118-3 | IP119-3 | IP120-3 | IP121-3 | IP122-3 | IP123-3 | IP124-3 | IP125-3 | IP126-3 |
| | IP113-4 | IP114-4 | IP115-4 | IP116-4 | IP117-4 | IP118-4 | IP119-4 | IP120-4 | IP121-4 | IP122-4 | IP123-4 | IP124-4 | IP125-4 | IP126-4 |

| | 127 | 128 | 129 | 130 | 131 | 132 | 133 | 134 | 135 | 135 | 137 | 138 | 139 | 140 |
|---|---|---|---|---|---|---|---|---|---|---|---|---|---|---|
| | | | 96 | 97 | 104 | 105 | 112 | 113 | 98 | 99 | 106 | 107 | 114 | 115 |
| 113 27/1 | 2P113-3 | 2P113-4 | D2366 | D2389 | D2376 | D2377 | D2384 | D2385 | D2370 | D2371 | D2378 | D2379 | D2388 | D2387 |
| 114 28/2 | 2P114-3 | 2P114-4 | D2391 | D2392 | D2389 | D2400 | D2407 | D2408 | D2393 | D2394 | D2401 | D2402 | D2409 | D2410 |
| 115 1/3 | 2P115-3 | 2P115-4 | D2414 | D2415 | D2422 | D2423 | D2430 | D2431 | D2416 | D2427 | D2424 | D2425 | D2432 | D2433 |
| 116 2/4 | 2P116-3 | 2P116-4 | D2437 | D2438 | D2445 | D2446 | D2453 | D2454 | D2439 | D2440 | D2447 | D2448 | D2455 | D2456 |
| 117 3/5 | 2P117-3 | 2P117-4 | D2460 | D2481 | D2488 | D2459 | D2476 | D2477 | D2476 | D2477 | D2470 | D2471 | D2478 | D2479 |
| 118 4/6 | 2P118-3 | 2P118-4 | D2483 | D2454 | D2491 | D2492 | D2499 | D2500 | D2485 | D2488 | D2493 | D2494 | D2601 | D2502 |
| 119 5/7 | 2P119-3 | 2P119-4 | D2508 | D2507 | D2514 | D2S15 | D2522 | D2523 | D2508 | D2509 | D2516 | D2517 | D2524 | D2525 |
| 120 6/8 2P120-3 | 2P120-4 | D2529 | D2530 | D2537 | D2538 | D2545 | D2546 | D2531 | D2532 | D2539 | D2540 | D2547 | D2548 | |
| 121 7/9 | 2P121-3 | 2P121-4 | D2552 | D2553 | D2580 | D2551 | D2588 | D2569 | D2554 | D2555 | D2552 | D2577 | D2570 | D2571 |
| 122 8/10 | 2P122-3 | 2P122-4 | D2575 | D2576 | D2583 | D2564 | D2591 | D2592 | D2577 | D2578 | D2585 | D2565 | D2593 | D2594 |
| 123 9/11 | 2P123-3 | 2P123-4 | D2598 | D2599 | D2605 | D2607 | D2754 | D2755 | D2600 | D2501 | D2608 | D2699 | D2758 | D2757 |
| 124 10/12 | 2P124-3 | 2P124-4 | D2761 | D2762 | D2769 | D2770 | D2777 | D2778 | D2777 | D2764 | D2771 | D2772 | D2779 | D2640 |
| 125 11/13 | 2P125-3 | 2P125-4 | D2644 | D2645 | D2652 | D2653 | D2660 | D2675 | D2645 | D2647 | D2654 | D2655 | D2682 | D2677 |
| 126 12/14 | 2P126-3 | 2P126-4 | D2667 | D2668 | D2675 | D2676 | D2883 | D2684 | D2689 | D2670 | D2677 | D2678 | D2685 | D2686 |
| 127 13/15 | 2P127-3 | 2P127-4 | D2690 | D2691 | D2698 | D2699 | D27DB | D2707 | D2692 | D2693 | D27GG | D27D1 | D2708 | D2709 |
| 128 14/16 | 2P128-3 | 2P128-4 | D2713 | D2714 | D2721 | D2722 | D2729 | D2730 | D2715 | D2716 | D2723 | D2724 | D2731 | D2732 |
| 129 15/17 | 2P129-3 | 2P329-4 | D2736 | D2737 | D2744 | D2745 | D2752 | D2753 | D2738 | D2739 | D2748 | D2747 | D2754 | D2755 |
| 130 16/18 | 2P130-3 | 2P130-4 | D2759 | D2760 | D2767 | D2768 | D2775 | D2776 | D2775 | D2776 | D2769 | D2770 | D2777 | D2778 |
| 131 17/19 | 2P131-3 | 2P131-4 | D2782 | D2783 | D2790 | D2791 | D2798 | D2799 | D2784 | D2785 | D2792 | D2793 | D2800 | D2801 |
| 132 18/20 | 2P132-3 | 2P132-4 | D2935 | D2806 | D2813 | D2814 | D2761 | D2822 | D2607 | D2608 | D2815 | D2816 | D2823 | D2824 |
| 133 19/21 | 2P133-3 | 2P133-4 | D2768 | D2829 | D2838 | D2837 | D2644 | D2845 | D2830 | D2831 | D2838 | D2839 | D2848 | D2847 |
| 134 20/22 | 2P134-3 | 2P134-4 | D2651 | D2852 | D2859 | D2860 | D2687 | D2668 | D2653 | D2854 | D2681 | D2882 | D2869 | D2870 |
| 135 21/23 | 2P135-3 | 2P135-4 | D2874 | D2875 | D2882 | D2883 | D2890 | D2891 | D2876 | D2877 | D2884 | D2885 | D2892 | D2893 |
| 136 22/24 | 2P136-3 | 2P136-4 | D2997 | D2898 | D2905 | D2906 | D2913 | D2914 | D2899 | D2900 | D2907 | D2908 | D2915 | D2916 |
| 137 23/25 | 2P137-3 | 2P137-4 | D2920 | D2921 | D2928 | D2929 | D2936 | D2937 | D2922 | D2923 | D2930 | D2931 | D2938 | D2939 |
| 138 24/26 | 2P138-3 | 2P138-4 | D2943 | D2944 | D2951 | D2952 | D2959 | D2960 | D2945 | D2945 | D2953 | D2954 | D2951 | D2952 |
| 139 25/27 | 2P139-3 | 2P139-4 | D2986 | D2967 | D2974 | D2975 | D2976 | D2983 | D2958 | D2969 | D2976 | D2977 | D2984 | D2985 |
| 140 26/28 | 2P140-3 | 2P140-4 | D2889 | D2990 | D2997 | D2998 | D3905 | D3006 | D2991 | D2992 | D2959 | D3000 | D3007 | D3008 |
| | IP127-1 | IP128-1 | IP129-1 | IP130-1 | IP131-1 | IP132-1 | IP133-1 | IP134-1 | IP135-1 | IP136-1 | IP137-1 | IP138-1 | IP139-1 | IP140-1 |
| | IP127-2 | IP128-2 | IP129-2 | IP130-2 | IP131-2 | IP132-2 | IP133-2 | IP134-2 | IP135-2 | IP136-2 | IP137-2 | IP138-2 | IP139-2 | IP140-2 |
| | IP127-3 | IP128-3 | IP129-3 | IP130-3 | IP131-3 | IP132-3 | IP133-3 | IP134-3 | IP135-3 | IP136-3 | IP137-3 | IP138-3 | IP139-3 | IP140-3 |
| | IP127-4 | IP128-4 | IP129-4 | IP130-4 | IP131-4 | IP132-4 | IP133-4 | IP134-4 | IP135-4 | IP136-4 | IP137-4 | IP138-4 | IP139-4 | IP140-4 |

TABLE IVf

6th CD-DASD product codeword.

| | 141 | 142 | 143 | 144 | 145 | 148 | 147 | 148 | 149 | 153 | l51 | 152 | 153 | 154 |
|---|---|---|---|---|---|---|---|---|---|---|---|---|---|---|
| | | 93/116 | 100/123 | 101/124 | 108/131 | 109/132 | 94/117 | 93/118 | 102/125 | 103/126 | 110/133 | 111/134 | | |
| 141 27/1 | 0 | D2977 | D2970 | D2971 | D2978 | D2919 | D2964 | D2965 | D2972 | D2973 | D2980 | D2981 | 2P141-1 | 2P141-2 |
| 142 28/2 | 0 | D2986 | D2993 | D2994 | D1001 | D3002 | D2987 | D2988 | D2995 | D2996 | D3033 | D3004 | 2P142-1 | 2P142-2 |
| 143 1/3 | 0 | D3009 | D3018 | D3017 | D3024 | D3025 | D1010 | D3011 | D3018 | D3019 | D3026 | D3027 | 2P143-1 | 2P143-2 |
| 144 2/4 | 0 | D3032 | D1039 | D3940 | D3047 | D3048 | D3033 | D3034 | D3041 | D3042 | D3049 | D3053 | 2P144-1 | 2P144-2 |
| 145 3/5 | 0 | D3055 | D1082 | D2877 | D3070 | D3071 | D3058 | D3057 | D3064 | D3965 | D3372 | D3073 | 2P145-1 | 2P145-2 |
| 146 4/6 | 0 | D3078 | D3085 | D3088 | D3093 | D3094 | D3079 | D3080 | D3087 | D3088 | D3095 | D3096 | 2P146-1 | 2P146-2 |
| 147 5/7 | 0 | D1101 | D110B | D3119 | D3116 | D1117 | D1112 | D3103 | D3110 | D1111 | D111B | D3119 | 2P147-1 | 2P147-2 |
| 148 6/8 | 0 | D3124 | D3131 | D3132 | D3139 | D3143 | D3125 | D3126 | D3133 | D3134 | D3141 | D3142 | 2P148-1 | 2P148-2 |
| 149 7/9 | 0 | D3147 | D3154 | D1155 | D3176 | D3177 | D3148 | D3149 | D3156 | D1151 | D3164 | D3165 | 2P149-1 | 2P149-2 |
| 150 8/10 | 0 | D1170 | D3177 | D3178 | D3185 | D3188 | D3171 | D3172 | D1179 | D3183 | D3187 | D3188 | 2P150-1 | 2P150-2 |
| 151 9/11 | 0 | D3193 | D32DD | D3201 | D3208 | D3209 | D3194 | D3195 | D3202 | D3203 | D3210 | D1211 | 2P151-1 | 2P151-2 |

TABLE IVf-continued

6th CD-DASD product codeword.

| | | | | | | | | | | | | | | |
|---|---|---|---|---|---|---|---|---|---|---|---|---|---|---|
| 152 10/12 | 0 | D3216 | D3223 | D3224 | D3231 | D3232 | D3217 | D3218 | D3225 | D3228 | D3233 | D3234 | 2P152-1 | 2P152-2 |
| 153 11/13 | 0 | D3239 | D3246 | D3247 | D3254 | D3255 | D3240 | D3241 | D3248 | D3249 | D3256 | D3257 | 2P153-1 | 2P153-2 |
| 154 12/14 | 0 | D3276 | D3269 | D3270 | D3277 | D3278 | D3277 | D3264 | D3271 | D3272 | D3279 | D3283 | 2P154-1 | 2P154-2 |
| 155 13/15 | 0 | D3285 | D3292 | D3293 | D3300 | D3301 | D3286 | D3287 | D3294 | D3295 | D3332 | D3303 | 2P155-1 | 2P155-2 |
| 156 14/16 | 0 | D3308 | D1315 | D3316 | D3323 | D3324 | D3309 | D3310 | D3317 | D3318 | D3315 | D3326 | 2P156-1 | 2P156-2 |
| 157 15/17 | 0 | D3331 | D3338 | D3339 | D3346 | D3347 | D1332 | D3333 | D3343 | D3341 | D3348 | D3349 | 2P157-1 | 2P157-2 |
| 158 16/18 | 0 | D3354 | D3375 | D3376 | D3369 | D3370 | D3355 | D3356 | D1377 | D3354 | D3371 | D3372 | 2P158-1 | 2P158-2 |
| 159 17/19 | 0 | D3377 | D3384 | D3365 | D3392 | D3393 | D3378 | D33Y9 | D3336 | D3387 | 03394 | D3395 | 2P159-1 | 2P159-2 |
| 160 18/20 | 0 | D3490 | D3407 | D3448 | D3415 | D3416 | D3401 | D3432 | D3409 | D341D | D3417 | D3418 | 2P160-1 | 2P160-2 |
| 161 19/21 | 0 | D3423 | D3430 | D3431 | D3438 | D3439 | D3424 | D3425 | D3432 | D3433 | D3440 | D3441 | 2P161-1 | 2P161-2 |
| 162 20/22 | 0 | D3446 | D3453 | D3454 | D3475 | D3476 | D3441 | D3448 | D3455 | D3456 | D3477 | D3464 | 2P162-1 | 2P162-2 |
| 163 21/23 | 0 | D3469 | D3476 | D3477 | D3484 | D3465 | D347D | D3471 | D3478 | D3479 | D3488 | D3487 | 2P163-1 | 2P163-2 |
| 164 23/24 | 0 | D3492 | D3499 | D3770 | D1507 | D3508 | D3493 | D3494 | D1501 | D3532 | D3539 | D1510 | 2P164-1 | 2P164-2 |
| 165 23/25 | 0 | D3515 | D1522 | D3523 | D1533 | D3531 | D3516 | D3517 | D3524 | D3525 | D3532 | D3533 | 2P165-1 | 2P165-2 |
| 166 24/26 | 0 | D3538 | D3545 | D3546 | D3553 | D3554 | D3539 | D3540 | D3547 | D3548 | D3555 | D3556 | 2P166-1 | 2P166-2 |
| 167 25/27 | 0 | D3575 | D3568 | D3569 | D3576 | D3577 | D3576 | D3577 | D3570 | D3571 | D3578 | D3579 | 2P167-1 | 2P167-2 |
| 168 26/28 | 0 | D3584 | D3591 | D3582 | D3599 | D3600 | D3585 | D3588 | D3593 | D3594 | D3831 | D3772 | 2P168-1 | 2P168-2 |
| | 1P141-1 | 1P142-1 | 1P143-1 | 1P144-1 | 1P145-1 | 1P146-1 | 1P147-1 | 1P148-1 | 1P149-1 | 1P150-1 | 1P151-1 | 1P152-1 | 1P153-1 | 1P154-1 |
| | 1P141-2 | 1P142-2 | 1P143-2 | 1P144-2 | 1P145-2 | 1P146-2 | 1P147-2 | 1P148-2 | 1P149-2 | 1P150-2 | 1P151-2 | 1P152-2 | 1P153-2 | 1P154-2 |
| | 1P141-3 | 1P142-3 | 1P143-3 | 1P144-3 | 1P145-3 | 1P146-3 | 1P147-3 | 1P148-3 | 1P149-3 | 1P150-3 | 1P151-3 | 1P152-3 | 1P153-3 | 1P154-3 |
| | 1P141-4 | 1P142-4 | 1P143-4 | 1P144-4 | 1P145-4 | 1P146-4 | 1P147-4 | 1P148-4 | 1P149-4 | 1P150-4 | 1P151-4 | 1P152-4 | 1P153-4 | 1P124-4 |
| | 155 | 156 | 157 | 158 | 159 | 177 | 175 | 176 | 177 | 164 | 165 | 166 | 167 | 168 |

| | | | | | | | | | | | | | | |
|---|---|---|---|---|---|---|---|---|---|---|---|---|---|---|
| | | | 119 | 120 | 127 | 128 | 133 | 136 | 121 | 122 | 129 | 130 | 137 | 138 |
| 141 27/1 | 2P141-3 | 2P141-4 | D3012 | D3013 | D3020 | D3021 | D3028 | D3029 | D3014 | D3015 | D3022 | D3023 | D3030 | D3031 |
| 142 28/2 | 2P142-3 | 2P142-4 | D3035 | D3036 | D3043 | D3044 | D3051 | D3052 | D3037 | D3D38 | D3045 | D3046 | D3053 | D3054 |
| 143 1/3 | 2P143-3 | 2P143-4 | D3058 | D3059 | D3068 | D3067 | D3074 | D3015 | D3077 | D3d75 | D3068 | D3089 | D3076 | D3077 |
| 144 2/4 | 2P144-3 | 2P144-4 | D3081 | D3076 | D3089 | D3090 | D3097 | D3098 | D3083 | D3084 | D3091 | D3092 | D3099 | D3100 |
| 145 3/5 | 2P145-3 | 2P145-4 | D3104 | D1105 | D3112 | D3113 | D3120 | D3121 | D3116 | D1107 | D3114 | D3115 | D3122 | D3123 |
| 146 4/6 | 2P146-3 | 2P146-4 | D3127 | D3128 | D3135 | D3136 | D3143 | D3144 | D3129 | D3130 | D3131 | D3138 | D3145 | D3146 |
| 147 5/7 | 2P147-3 | 2P147-4 | D3150 | D1151 | D3158 | D3159 | D1166 | D3167 | D3152 | D3153 | D316D | D3175 | D3168 | D3169 |
| 148 6/8 | 2P148-3 | 2P148-4 | D1173 | D1174 | D3181 | D3182 | D3189 | D3190 | D3175 | D3176 | D3183 | D3154 | D3191 | D3192 |
| 149 7/9 | 2P149-3 | 2P149-4 | D3196 | D3197 | D3204 | D3205 | D3212 | D3213 | D3198 | D3199 | D3220 | D3201 | D3214 | D3215 |
| 150 8/10 | 2P150-3 | 2P150-4 | D3219 | D3220 | D3227 | D3228 | D3235 | D3236 | D3221 | D3222 | D3229 | D3230 | D3237 | D3238 |
| 151 9/11 | 2P151-3 | 2P151-4 | D3242 | D3243 | D3250 | D3251 | D3258 | D3259 | D3244 | D3245 | D3252 | D3253 | D3277 | D3275 |
| 152 10/12 | 2P152-3 | 2P152-4 | D3265 | D3266 | D3273 | D3274 | D3281 | D3282 | D3267 | D3268 | D3275 | D3276 | D3283 | D3284 |
| 153 11/13 | 2P153-3 | 2P153-4 | D3277 | D3289 | D3298 | D3297 | D3394 | D3335 | D3290 | D3291 | D3298 | D3299 | D3306 | D3307 |
| 154 12/14 | 2P154-3 | 2P154-4 | D3311 | D3312 | D3319 | D3320 | D3327 | D3328 | D3313 | D3314 | D3321 | D3322 | D3329 | D3333 |
| 155 13/15 | 2P155-3 | 2P155-4 | D3334 | D3335 | D3342 | D3343 | D3350 | D3351 | D3336 | D3337 | D3344 | D3345 | D3352 | D3353 |
| 156 14/16 | 2P156-3 | 2P156-4 | D3357 | D3358 | D3365 | D3366 | D3373 | D3374 | D3359 | D3383 | D3367 | D3368 | D3375 | D3376 |
| 157 15/17 | 2P157-3 | 2P157-4 | D3383 | D3381 | D7888 | D3389 | D3396 | D3397 | D3382 | D3383 | D3390 | D1391 | D3398 | D3399 |
| 158 16/18 | 2P158-3 | 2P158-4 | D3403 | D3404 | D3411 | D3412 | D3419 | D342D | D3435 | D3405 | D3413 | D3414 | D3421 | D3422 |
| 159 17/19 | 2P159-3 | 2P159-4 | D3426 | D3427 | D3434 | D3435 | D3442 | D3443 | D3428 | D3429 | D3436 | D3437 | D3444 | D3445 |
| 160 18/20 | 2P160-3 | 2P160-4 | D3449 | D3477 | D3457 | D3458 | D3465 | D3466 | D3451 | D3452 | D3459 | D3477 | D3467 | D3468 |
| 161 19/21 | 2P161-3 | 2P161-4 | D3472 | D3473 | D3477 | D3481 | D3488 | D3489 | D3474 | D3475 | D3482 | D3477 | D3490 | D3491 |
| 162 20/22 | 2P162-3 | 2P162-4 | D3495 | D3466 | D3533 | D3504 | D15ll | D3512 | D3497 | D3498 | D3505 | D3506 | D3513 | D3514 |
| 163 21/23 | 2P163-3 | 2P163-4 | D3518 | D3519 | D3526 | D3527 | D3534 | D3535 | D3520 | D3521 | D3528 | D3529 | D3536 | D1537 |
| 164 23/24 | 2P164-3 | 2P164-4 | D3541 | D3542 | D3549 | D3553 | D3557 | D3558 | D3543 | D3544 | D3551 | D3552 | D3559 | D3577 |
| 165 23/25 | 2P165-3 | 2P165-4 | D3584 | D3565 | D3572 | D3573 | D1550 | D3581 | D3566 | D3567 | D3574 | D3575 | D3582 | D3583 |
| 166 24/26 | 2P166-3 | 2P166-4 | D3587 | D3588 | D3595 | D3598 | D3773 | D3664 | D3589 | D3590 | D1597 | D3598 | D3835 | D3776 |
| 167 25/27 | 2P167-3 | 2P167-4 | D3750 | D3751 | D3758 | D3759 | D3766 | D3767 | D3752 | D3753 | D3760 | D3761 | D3768 | D3769 |
| 168 26/28 | 2P168-3 | 2P168-4 | D3773 | D3774 | D3641 | D3542 | D3649 | D3683 | D3775 | D3776 | D3643 | D3544 | D3651 | D3652 |
| | 1P155-1 | 1P156-1 | 1P157-1 | 1P158-1 | 1P159-1 | 1P160-1 | 1P161-1 | 1P162-1 | 1P163-1 | 1P164-1 | 1P165-1 | 1P166-1 | 1P167-2 | 1P168-1 |
| | 1P155-2 | 1P156-2 | 1P157-2 | 1P158-2 | 1P159-2 | 1P160-2 | 1P161-2 | 1P162-2 | 1P163-2 | 1P164-2 | 1P165-2 | 1P166-2 | 1P167-2 | 1P168-2 |
| | 1P155-3 | 1P156-3 | 1P157-3 | 1P158-3 | 1P159-3 | 1P160-3 | 1P161-3 | 1P162-3 | 1P163-3 | 1P164-2 | 1P165-3 | 1P166-3 | 1P167-3 | 1P168-3 |
| | 1P155-4 | 1P156-4 | 1P157-4 | 1P158-4 | 1P159-4 | 1P160-4 | 1P161-4 | 1P162-4 | 1P163-4 | 1P164-4 | 1P165-4 | 1P166-4 | 1P167-4 | 1P168-4 |

TABLE IVg

7th CD-DASD product codeword.

| | 169 | 170 | 171 | 172 | 173 | 174 | 175 | 176 | 177 | 178 | 179 | 180 | 181 | 182 |
|---|---|---|---|---|---|---|---|---|---|---|---|---|---|---|
| | | 116/139 | 123/146 134/147 131/154 132/155 | 117/140 | 118/141 | 125/148 | 126/149 | 133/156 | 134/157 | | | | | |
| 169 27/1 | 0 | D3807 | D3754 | D3755 | D3762 | D3777 | D3608 | D3809 | D3756 | D3757 | D3764 | D3765 | 2P169-1 | 2P169-2 |
| 170 28/2 | 0 | D3770 | D3777 | D3838 | D3645 | D3646 | D3771 | D3772 | D3779 | D3640 | D3647 | D3648 | 2P170-1 | 2P170-2 |
| 171 1/3 | 0 | D3653 | D3660 | D3675 | D3668 | D3669 | D3654 | D3655 | D3676 | D3677 | D3678 | D3671 | 2P171-1 | 2P171-2 |
| 172 2/4 | 0 | D3676 | D3683 | D3884 | D3691 | D3692 | D3671 | D3678 | D3685 | D3686 | D3693 | D3694 | 2P172-1 | 2P172-2 |
| 173 3/5 | 0 | D3699 | D3706 | D3707 | D3714 | D3715 | D3700 | D3701 | D370B | D3709 | D3716 | D3717 | 2P173-1 | 2P173-2 |
| 174 4/6 | 0 | D3722 | D3729 | D3736 | D3737 | D3738 | D3723 | D3724 | D3731 | D3732 | D3739 | D3740 | 2P174-1 | 2P174-2 |
| 175 5/7 | 0 | D3745 | D3752 | D3753 | D3777 | D3781 | D3746 | D3747 | D3754 | D3755 | D3776 | D3777 | 2P175-1 | 2P175-2 |

TABLE IVg-continued

| 7th CD-DASD product codeword. | | | | | | | | | | | | | | |
|---|---|---|---|---|---|---|---|---|---|---|---|---|---|---|
| 176 7/8 | 0 | D3768 | D3775 | D3776 | D3783 | D3784 | D3769 | D3776 | D3777 | D3778 | D3785 | D3788 | 2P176-1 | 2P176-2 |
| 177 7/9 | 0 | D3791 | D3798 | D3799 | D3808 | D3807 | D3792 | D3793 | D3800 | D3801 | D3808 | D3809 | 2P177-1 | 2P177-2 |
| 178 8/10 | 0 | D3814 | D3821 | D3822 | D3829 | D3836 | D3815 | D3816 | D3823 | D3824 | D3831 | D3772 | 2P178-1 | 2P178-2 |
| 179 9/11 | 0 | D3837 | D3844 | D3845 | D3852 | D3853 | D3838 | D3839 | D3845 | D3847 | D3854 | D3855 | 2P179-1 | 2P179-2 |
| 180 10/12 | 0 | D3877 | D3867 | D3868 | D3875 | D3876 | D3875 | D3876 | D3869 | D3870 | D3877 | D3878 | 2P180-1 | 2P180-2 |
| 181 11/13 | 0 | D3883 | D3890 | D3891 | D3898 | D3899 | D3684 | D3885 | D3892 | D3893 | D7990 | D3901 | 2P181-1 | 2P181-2 |
| 182 12/14 | 0 | D3906 | D3913 | D3914 | D3921 | D3922 | D3907 | D3908 | D3915 | D3916 | D3923 | D3924 | 2P182-1 | 2P182-2 |
| 180 13/15 | 0 | D3929 | D3936 | D3937 | D3944 | D3945 | D3936 | D3931 | D3936 | D3939 | D3946 | D3947 | 2P183-1 | 2P183-2 |
| 184 14/16 | 0 | D3952 | D3959 | D3977 | D3967 | D3968 | D3953 | D3954 | D3975 | D3976 | D3969 | D3970 | 2P184-1 | 2P184-2 |
| 185 15/17 | 0 | D3975 | D3982 | D3983 | D3990 | D3991 | D3978 | D3977 | D3984 | D3985 | D3992 | D3993 | 2P185-1 | 2P185-2 |
| 186 16/18 | 0 | D3998 | D4005 | D4006 | D4013 | D4014 | D3999 | D4000 | D4007 | D4008 | D4015 | D4016 | 2P186-1 | 2P186-2 |
| 187 17/19 | 0 | D4D21 | D4028 | D4029 | D4036 | D4037 | D4022 | D4023 | D4030 | D4031 | D4038 | D4039 | 2P187-1 | 2P187-2 |
| 188 18/20 | 0 | D4011 | D4051 | D4052 | D4059 | D4060 | D4045 | D4046 | 04053 | D4054 | D4075 | D4082 | 2P188-1 | 2P188-2 |
| 189 19/21 | 0 | D4067 | D4074 | D4015 | D4082 | D4083 | D4068 | 04069 | D4076 | D4077 | 04084 | D4085 | 2P189-1 | 2P189-2 |
| 190 20/22 | 0 | D4090 | CRC5 | CRC6 | 3P201 | 3P202 | D4091 | D4092 | CRC7 | CRC8 | 3P203 | 3P204 | 2P190-1 | 2P190-2 |
| 191 21/23 | 0 | 3P209 | 3P216 | 3P217 | 3P224 | 3P225 | 3P210 | 3P211 | 3P218 | 3P219 | 3P226 | 3P221 | 2P191-1 | 2P191-2 |
| 192 22/24 | 0 | 3P222 | 3P239 | 3P240 | 3P247 | 3P248 | 3P233 | 3P234 | 3P241 | 3P242 | 3P249 | 3P280 | 2P192-1 | 2P192-2 |
| 193 23/25 | 0 | 3P265 | 3P276 | 3P283 | 3P270 | 3P211 | 3P258 | 3P257 | 3P284 | 3P265 | 38272 | 3P273 | 2P193-1 | 2P193-2 |
| 194 24/26 | 0 | 3P278 | 3P285 | 3P288 | 3P293 | 3P294 | 3P279 | 3P280 | 3P287 | 3P288 | 3P285 | 3P822 | 2P194-1 | 2P194-2 |
| 195 25/27 | 0 | 3P441 | 3P448 | 3P309 | 3P456 | 3P457 | 3P335 | 38377 | 37710 | 3P451 | 3P458 | 39319 | 2P195-1 | 2P195-2 |
| 196 26/28 | 0 | 3P324 | 3P331 | 3P332 | 3P339 | 37740 | 3P725 | 33326 | 3P333 | 3P334 | 3P341 | 3P342 | 2P196-1 | 2P196-2 |
| | 1P169-1 | 1P170-1 | 1P171-1 | 1P172-1 | 1P173-1 | 1P174-1 | 1P175-1 | 1P176-1 | 1P177-1 | 1P178-1 | 1P179-1 | 1P180-1 | 1P181-1 | 1P182-1 |
| | 1P169-2 | 1P170-2 | 1P171-2 | 1P172-2 | 1P173-2 | 1P174-2 | 1P175-2 | 1P176-2 | 1P177-2 | 1P178-2 | 1P179-2 | 1P180-2 | 1P181-2 | 1P182-2 |
| | 1P169-3 | 1P170-3 | 1P171-3 | 1P172-3 | 1P175-3 | 1P174-3 | 1P175-3 | 1P176-3 | 1P177-3 | 1P178-3 | 1P179-3 | 1P180-3 | 1P181-3 | 1P182-3 |
| | 1P169-4 | 1P170-4 | 1P171-4 | 1P172-4 | 17173-4 | 1P174-4 | 1P173-4 | 1P176-4 | 1P177-4 | 1P178-4 | 1P179-4 | 1P180-4 | 1P181-4 | 1P182-4 |
| | | | 183 | 184 | 185 | 188 | 187 | 188 | 189 | 190 | 191 | 192 | 193 | 194 195 196 |
| 169 27/1 | 2P169-3 | 2P169-4 | D3686 | D3651 | D3684 | D3665 | D3672 | D3673 | D3658 | D3659 | D3686 | D3667 | D3674 | D3675 |
| 170 28/2 | 2P170-3 | 2P170-4 | D3679 | D3680 | D3687 | D3686 | D3695 | D3696 | D3681 | D3682 | D3689 | D3693 | D3697 | D3698 |
| 171 1/3 | 2P171-3 | 2P171-4 | D3702 | D3703 | D3710 | D3711 | D3718 | D3719 | D3704 | D3705 | D3712 | D3713 | D3720 | D3721 |
| 172 2/4 | 2P172-3 | 2P172-4 | D3725 | D3726 | D3733 | D3734 | D3741 | D3742 | D3727 | D3728 | D3735 | D3736 | D3743 | D3744 |
| 173 3/5 | 2P173-3 | 2P173-4 | D3148 | D3749 | D3756 | D3757 | D3764 | D3765 | D3750 | D3751 | D3758 | D3759 | D3766 | D3767 |
| 174 4/6 | 2P174-3 | 2P174-4 | D3771 | D3772 | D3779 | D3780 | D3787 | D3788 | D3773 | D3774 | D3781 | D3782 | D3789 | D3790 |
| 175 5/7 | 2P175-3 | 2P175-4 | D3794 | D3795 | D3802 | D3808 | D3810 | D3811 | D3796 | D3797 | D3884 | D3805 | D3812 | D3813 |
| 176 7/8 | 2P176-3 | 2P176-4 | D3817 | D3818 | D3825 | D3826 | D3833 | D3834 | D3819 | D3820 | D3827 | D3828 | D3835 | D3836 |
| 177 7/9 | 2P177-3 | 2P177-4 | D3640 | D3841 | D3648 | D3849 | D3856 | D3857 | D3842 | D3843 | D3850 | D3851 | D3858 | D3859 |
| 178 8/10 | 2P178-3 | 2P178-4 | D3853 | D3884 | D3871 | D3872 | D3879 | D3880 | D3865 | D3865 | D3873 | D3874 | D3881 | D3882 |
| 179 9/11 | 2P179-3 | 2P179-4 | D3885 | D3887 | D3894 | D3895 | D3902 | D3903 | D3888 | D3889 | D3896 | D3897 | D3904 | D3905 |
| 180 10/12 | 2P180-3 | 2P180-4 | D3909 | D3910 | D3917 | D3918 | D3925 | D3926 | D3911 | D3912 | D3919 | D3920 | D3927 | D3928 |
| 181 11/13 | 2P181-3 | 2P181-4 | D3932 | D3933 | D3940 | D3941 | D3948 | D3949 | D3934 | D3935 | D3942 | D3943 | D3950 | D3951 |
| 182 12/14 | 2P182-3 | 2P182-4 | D3985 | D3956 | D3983 | D3964 | D3971 | D3972 | D3957 | D3958 | D3965 | D3966 | D3973 | D3974 |
| 180 13/15 | 2P183-3 | 2P183-4 | D3978 | D3979 | D3988 | D3987 | D3994 | D3995 | D3980 | D3981 | D3988 | D3989 | D3996 | D3997 |
| 184 14/16 | 2P184-3 | 2P184-4 | D4001 | D4002 | D4009 | D4010 | D4017 | D4018 | D4003 | D4004 | D1011 | D4D12 | D1019 | D4020 |
| 185 15/17 | 2P185-3 | 2P185-4 | D4024 | D4025 | D4D32 | D4033 | D4010 | D4041 | D4028 | D4027 | D4034 | D4035 | D4042 | D4943 |
| 186 16/18 | 2P186-3 | 2P186-4 | D4047 | D4048 | D4055 | D4056 | D4077 | D4064 | D4049 | D4050 | D4057 | D4058 | D4059 | D4066 |
| 187 17/19 | 2P187-3 | 2P187-4 | D4070 | D4071 | D4078 | D4079 | D4086 | D4087 | D4072 | D4073 | D4080 | D4081 | D4088 | D4089 |
| 188 18/20 | 2P188-3 | 2P188-4 | D4093 | D4094 | 3P197 | 3P198 | 3P205 | 3P206 | D4015 | D4096 | 3P199 | 3P200 | 3P207 | 3P208 |
| 189 19/21 | 2P189-3 | 2P189-4 | 3P212 | 3P213 | 3P220 | 3P221 | 3P228 | 3P229 | 3P214 | 3P215 | 3P222 | 3P223 | 3P230 | 3P231 |
| 190 20/22 | 2P190-3 | 2P190-4 | 3P235 | 3P236 | 3P243 | 3P244 | 3P251 | 3P252 | 3P237 | 3P238 | 3P245 | 3P245 | 3P253 | 3P254 |
| 191 21/23 | 2P191-3 | 2P191-4 | 3P258 | 3P259 | 3P268 | 3P267 | 3P274 | 3P275 | 3P260 | 3P275 | 3P288 | 3P269 | 3P276 | 3P277 |
| 192 22/24 | 2P192-3 | 2P192-4 | 3P281 | 37682 | 3P289 | 3P290 | 3P297 | 3P298 | 3P283 | 3P284 | 3P291 | 3P292 | 3P299 | 3P440 |
| 193 23/25 | 2P193-3 | 2P193-4 | 3P304 | 3P305 | 3P402 | 3P453 | 3P320 | 3P321 | 3P306 | 3P307 | 3P314 | 3P315 | 3P322 | 3P323 |
| 194 24/26 | 2P194-3 | 2P194-4 | 3P327 | 3P328 | 3P335 | 3P336 | 3P343 | 3P344 | 3P329 | 3P330 | 3P337 | 3P338 | 3P345 | 3P346 |
| 195 25/27 | 2P195-3 | 2P195-4 | 3P350 | 3P381 | 3P358 | 3P389 | 3P366 | 3P367 | 3P352 | 3P377 | 3P377 | 3P375 | 3P368 | 3P369 |
| 196 26/28 | 2P196-3 | 2P196-4 | 3P373 | 3P374 | 3P381 | 3P382 | 3P389 | 3P390 | 3P375 | 3P378 | 3P383 | 3P384 | 3P391 | 3P392 |
| | 1P183-1 | IP184-1 | IP185-1 | IP186-1 | IP187-1 | IP188-1 | IP189-1 | IP190-1 | IP191-1 | IP192-1 | IP193-1 | IP194-1 | IP195-1 | IP196-1 |
| | 1P183-2 | IP184-2 | IP185-2 | IP186-2 | IP187-2 | IP188-2 | IP189-2 | IP190-2 | IP191-2 | IP192-2 | IP193-2 | IP194-2 | IP195-2 | IP196-2 |
| | 1P183-3 | IP184-3 | IP185-3 | IP186-3 | IP187-3 | IP188-3 | IP189-3 | IP190-3 | IP191-3 | IP192-3 | IP193-3 | IP194-3 | IP195-3 | IP196-3 |
| | 1P183-4 | IP184-4 | IP185-4 | IP186-4 | IP187-4 | IP188-4 | IP189-4 | IP190-4 | IP191-4 | IP192-4 | IP193-4 | IP194-4 | IP195-4 | IP196-4 |

TABLE V

The first twenty-nine columns of a CD-DASD logical sector after depth-7 interleaving of C1/C2 product codewords. The twenty-eight columns numbered 1, 8, 15, 22, 29, . . . , 168 belong to the 1st product codeword; the twenty-eight columns numbered 2, 9, 16, 23, . . . , 169 belong to the 2nd product codeword, etc.

| 1 | 2 | 3 | 4 | 5 | 6 | 7 | 8 | 0 | 10 | 11 | 12 | 13 | 14 | 15 |
|---|---|---|---|---|---|---|---|---|---|---|---|---|---|---|
| 1 | 29 | 57 | 85 | 113 | 141 | 169 | 2 | 30 | 58 | 88 | 114 | 142 | 170 | 3 |
| | | | | | | | 139/1 | 1/24 | 24/47 | 47/70 | 70/93 | 93/116 | 116/139 | 146/8 |
| 0 | 0 | 0 | 0 | 0 | 0 | 0 | 3P347 | D595 | D1239 | D1883 | D2319 | D2963 | D3607 | 3P354 |
| 0 | 0 | 0 | 0 | 0 | 0 | 0 | 3P370 | D618 | D1262 | D1906 | D2342 | D2966 | D3630 | 3P377 |

TABLE V-continued

The first twenty-nine columns of a CD-DASD logical sector after depth-7 interleaving of C1/C2 product codewords. The twenty-eight columns numbered 1, 8, 15, 22, 29, . . . , 168 belong to the 1st product codeword; the twenty-eight columns numbered 2, 9, 16, 23, . . . , 169 belong to the 2nd product codeword, etc.

| | | | | | | | | | | | | | | |
|---|---|---|---|---|---|---|---|---|---|---|---|---|---|---|
| 0 | 0 | 0 | 0 | 0 | 0 | 0 | 1D1 | D641 | D1285 | D1929 | D2365 | D3009 | D3653 | D4 |
| 0 | 0 | 0 | 0 | 0 | 0 | 0 | D20 | D664 | D1308 | D1952 | D2388 | D3032 | D3676 | D27 |
| 0 | 0 | 0 | 0 | 0 | 0 | 0 | D43 | D687 | D1331 | D1975 | D2411 | D3055 | D3699 | D50 |
| 0 | 0 | 0 | 0 | 0 | 0 | 0 | D66 | D710 | D1354 | D1998 | D2434 | D3078 | D3722 | D73 |
| 0 | 0 | 0 | 0 | 0 | 0 | 0 | D89 | D733 | D1377 | D2021 | D2457 | D3101 | D3745 | D96 |
| 0 | 0 | 0 | 0 | 0 | 0 | 0 | D112 | D758 | D1400 | D2044 | D2460 | D3124 | D3788 | D119 |
| 0 | 0 | 0 | 0 | 0 | 0 | 0 | D135 | D779 | D1423 | 3P15 | D2503 | D3147 | D3791 | D142 |
| 0 | 0 | 0 | 0 | 0 | 0 | 0 | D156 | D802 | D1445 | 3P38 | D2528 | D3170 | D3814 | D165 |
| 0 | 0 | 0 | 0 | 0 | 0 | 0 | D181 | D825 | D1469 | 3P51 | D2549 | DB193 | D3837 | D188 |
| 0 | 0 | 0 | 0 | 0 | 0 | 0 | D204 | D848 | D1492 | 3P84 | D2572 | D3218 | D3660 | D211 |
| 0 | 0 | 0 | 0 | 0 | 0 | 0 | D227 | D871 | D1515 | 3P107 | D2595 | D3239 | D3883 | D234 |
| 0 | 0 | 0 | 0 | 0 | 0 | 0 | D250 | DB94 | D1536 | 3P130 | D2758 | D3276 | D3906 | D257 |
| 0 | 0 | 0 | 0 | 0 | 0 | 0 | D273 | D917 | D1581 | 3P153 | D2641 | D3285 | D3929 | D280 |
| 0 | 0 | 0 | 0 | 0 | 0 | 0 | D296 | D940 | D1564 | 3P176 | D2664 | D3306 | D3952 | D303 |
| 0 | 0 | 0 | 0 | 0 | 0 | 0 | D319 | D977 | D1807 | Res.3 | D2687 | D3331 | D3975 | D326 |
| 0 | 0 | 0 | 0 | 0 | 0 | 0 | D342 | D986 | D1770 | D2066 | D2710 | D3354 | D3996 | D349 |
| 0 | 0 | 0 | 0 | 0 | 0 | 0 | D365 | D1009 | D1653 | D2089 | D2733 | D3377 | D4021 | D372 |
| 0 | 0 | 0 | 0 | 0 | 0 | 0 | D386 | D1032 | D1676 | D2112 | D2758 | D3400 | D4044 | D395 |
| 0 | 0 | 0 | 0 | 0 | 0 | 0 | D411 | D1055 | D1699 | D2135 | D2179 | D3423 | D4067 | D418 |
| 0 | 0 | 0 | 0 | 0 | 0 | 0 | D434 | D1088 | D1722 | D2158 | D2802 | D3446 | D4090 | D441 |
| 0 | 0 | 0 | 0 | 0 | 0 | 0 | D457 | D1101 | D1745 | D2181 | D2825 | D3469 | 3P209 | D464 |
| 0 | 0 | 0 | 0 | 0 | 0 | 0 | D480 | D1124 | D1788 | D2204 | D2846 | D3492 | 3P232 | D487 |
| 0 | 0 | 0 | 0 | 0 | 0 | 0 | D503 | D1147 | D1791 | D2227 | D2871 | D3515 | 3P255 | D510 |
| 0 | 0 | 0 | 0 | 0 | 0 | 0 | D526 | D1170 | D1Bl4 | D2250 | D2B94 | D3538 | 3P278 | D533 |
| 0 | 0 | 0 | 0 | 0 | 0 | 0 | D549 | D1193 | D1837 | D2273 | D2917 | D3581 | 3P441 | D556 |
| 0 | 0 | 0 | 0 | 0 | 0 | 0 | D572 | D1216 | D1880 | D2296 | D2940 | D3584 | 3P324 | D579 |
| 1P1-1 | 1P29-1 | 1P57-1 | 1P85-1 | IP113-1 | 19241-1 | IP169-1 | 1P2-1 | 1P30-1 | 1P58-1 | 1P86-1 | 1P114-1 | 1P142-1 | 1P170-1 | 1P3-1 |
| 1P1-2 | 1P29-2 | 1P57-2 | 1P85-2 | 1P113-2 | 19241-2 | IP169-2 | 1P2-2 | 1P30-2 | 1P58-2 | 1P86-2 | 1P114-2 | 1P142-2 | 1P170-2 | 1P3-2 |
| 1P1-3 | 1P29-3 | 1P57-3 | IP85-3 | 1P113-3 | 19241-3 | 1P169-3 | 1P2-3 | 1P30-3 | 1P58-3 | 1P86-3 | 1P114-3 | 1P142-3 | 1P170-3 | 1P3-3 |
| 1P1-4 | 1P29-4 | 1P57-4 | 1985-4 | IP113-4 | 19241-4 | IP169-4 | 1P2-4 | 1P30-4 | 1P58-4 | 1P86-4 | 1P114-4 | 1P142-4 | 1P170-4 | 1P3-4 |

| 16 | 17 | 18 | 19 | 20 | 21 | 22 | 23 | 24 | 25 | 26 | 27 | 28 | 29 |
|---|---|---|---|---|---|---|---|---|---|---|---|---|---|
| 8/31 | 31/54 | 54/77 | 77/100 | 100/123 | 123/146 | 147/9 | 9/32 | 32/55 | 55/78 | 78/101 | 101/124 | 124/147 | 154/16 |
| D602 | D1246 | D1890 | D2326 | D2970 | D3754 | 3P355 | D803 | D1247 | D1891 | D2327 | D2971 | D3755 | 3P376 |
| D625 | D1269 | D1913 | D2349 | D2993 | D3777 | 3P378 | D626 | D1270 | D1914 | D2350 | D2994 | D3778 | 3P385 |
| D648 | D1292 | D1936 | D2372 | D3016 | D3660 | D5 | D649 | D1293 | D1937 | D2373 | D3017 | D3661 | D12 |
| D894 | D1336 | D1982 | D241B | D3076 | D370B | D51 | D595 | D1339 | D1983 | D2419 | D2577 | D3707 | D58 |
| D717 | D1375 | D2005 | D2441 | D3085 | D3729 | D74 | D718 | D1376 | D2026 | D2442 | D3086 | D3730 | D81 |
| D740 | D1364 | D2028 | D2464 | D310B | D3752 | D97 | D741 | D1385 | D2029 | D2465 | D3109 | D3753 | D104 |
| D783 | D1407 | CRC3 | D2467 | D3131 | D3775 | D120 | D764 | D1408 | CRC4 | D2488 | D3132 | D3776 | D127 |
| D766 | D1430 | 3P22 | D2510 | D3154 | D3798 | D143 | D787 | D1431 | 3P23 | D2511 | D3155 | D3799 | D150 |
| D809 | D1453 | 3P45 | D2533 | D3177 | D3821 | D168 | D810 | D1454 | 3P46 | D2534 | D3178 | D3822 | D173 |
| D832 | D1478 | 3P68 | D2558 | D3200 | D3844 | D189 | D833 | D1477 | 3P69 | D2557 | D3201 | D2645 | D196 |
| D855 | D1499 | 3P91 | D2579 | D3223 | D3587 | D212 | D858 | D1500 | 3P92 | D2360 | D3224 | D3866 | D219 |
| D878 | D1522 | 37514 | D2802 | D3246 | D3890 | D235 | D879 | D1523 | 3P115 | D2603 | D3247 | D3691 | D242 |
| D901 | D1545 | 3P137 | D2765 | D3269 | DB913 | D258 | D902 | D1546 | 3P136 | D2766 | D3270 | D3914 | D265 |
| D924 | D1568 | 3P160 | D2648 | D3292 | D3936 | D281 | D925 | D1589 | 3P175 | D2649 | D3293 | D3937 | D288 |
| D947 | D1591 | 3P183 | D2671 | D3315 | D3959 | D304 | D948 | D1592 | 3P184 | D2672 | D3316 | D3960 | D311 |
| D970 | D1B14 | D2050 | D2694 | D3336 | D3982 | D327 | D971 | D1755 | D2D51 | D2695 | D3339 | D3983 | D334 |
| D993 | D1777 | D2073 | D2717 | D3375 | D4005 | D350 | D994 | D1778 | D2074 | D2718 | D3376 | D4006 | D357 |
| D1016 | D1660 | D2096 | D2740 | D3364 | D4028 | D373 | D1017 | D1675 | D2097 | D2741 | D3385 | D4029 | D360 |
| D1039 | D1683 | D2119 | D2777 | D3407 | D4051 | D396 | D1040 | D1684 | D2120 | D2754 | D3406 | D4052 | D403 |
| D1062 | D1706 | D2142 | D2788 | D3430 | D4074 | D419 | D1077 | D1707 | D2143 | D2787 | D3431 | D4075 | D426 |
| D1085 | D1729 | D2165 | D2809 | D3453 | CRC5 | D442 | D1DBB | D1730 | D2166 | D2810 | D3454 | CRC6 | D449 |
| D1108 | D1752 | D21BB | D2832 | D3476 | 3P216 | D465 | D1109 | D1753 | D2189 | D2833 | D3477 | 3P217 | D472 |
| D1131 | D1775 | D2211 | D2855 | D3499 | 3P239 | D488 | D1132 | D1776 | D2212 | D2858 | D3500 | 3P240 | D495 |
| D1154 | D1798 | D2234 | D2878 | D3322 | 3P276 | D511 | D1155 | D1799 | D2235 | D2679 | D3523 | 3P277 | D518 |
| D1177 | D1821 | D2257 | D2901 | D3545 | 3P285 | D534 | D1178 | D1822 | D2258 | D2902 | D3546 | 3P288 | D541 |
| D1200 | D1844 | D2280 | D2924 | D3568 | 3P308 | D557 | D1201 | D1845 | D2281 | D2925 | D3589 | 3P449 | D564 |
| D1223 | D1867 | D2303 | D2947 | D3591 | 3P331 | D560 | D1224 | D1888 | D2304 | D2948 | D3592 | 3P332 | D587 |
| 1P21-1 | 1P59-1 | 1P87-1 | 1P115-1 | 1P143-1 | 1P171-1 | 1P4-1 | 1P32-1 | 1P60-1 | 1P88-1 | 1P116-1 | 1P144-1 | 1P172-1 | 1P5-1 |
| 1P21-2 | 1P59-2 | 1P87-2 | 1P115-2 | 1P143-2 | 1P171-2 | 1P4-2 | 1P32-2 | 1P60-2 | 1P88-2 | 1P116-2 | 1P144-2 | 1P172-2 | 1P5-2 |
| 1P21-3 | 1P59-3 | 1P87-3 | 1P115-3 | 1P143-3 | 1P171-3 | 1P4-3 | 1P32-3 | 1P60-3 | 1P88-3 | 1P116-3 | 1P144-3 | 19272-3 | 1P5-3 |
| 1P21-4 | 1P59-4 | 1P87-4 | 1P115-4 | 1P143-4 | 1P171-4 | 1P4-4 | 1P32-4 | 1P60-4 | 1P88-4 | 1P116-4 | 1P144-4 | 1P172-4 | 1P5-4 |

TABLE VI (a)

| 1 | 2 | 3 | 4 | 5 | 6 | 7 |
|---|---|---|---|---|---|---|
| 1 | 2 | 3 | 4 | 5 | 6 | 7 |
| 7 | 1 | 2 | 3 | 4 | 5 | 6 |
| 6 | 7 | 1 | 2 | 3 | 4 | 5 |
| 5 | 6 | 7 | 1 | 2 | 3 | 4 |
| 4 | 5 | 6 | 7 | 1 | 2 | 3 |
| 3 | 4 | 5 | 6 | 7 | 1 | 2 |
| 2 | 3 | 4 | 5 | 6 | 7 | 1 |
| 1 | 2 | 3 | 4 | 5 | 6 | 7 |
| 7 | 1 | 2 | 3 | 4 | 5 | 6 |
| 6 | 7 | 1 | 2 | 3 | 4 | 5 |
| 5 | 6 | 7 | 1 | 2 | 3 | 4 |
| 4 | 5 | 6 | 7 | 1 | 2 | 3 |
| 3 | 4 | 5 | 6 | 7 | 1 | 2 |
| 2 | 3 | 4 | 5 | 6 | 7 | 1 |
| 1 | 2 | 3 | 4 | 5 | 6 | 7 |
| 7 | 1 | 2 | 3 | 4 | 5 | 6 |
| 6 | 7 | 1 | 2 | 3 | 4 | 5 |
| 5 | 6 | 7 | 1 | 2 | 3 | 4 |
| 4 | 5 | 6 | 7 | 1 | 2 | 3 |
| 3 | 4 | 5 | 6 | 7 | 1 | 2 |
| 2 | 3 | 4 | 5 | 6 | 7 | 1 |
| 1 | 2 | 3 | 4 | 5 | 6 | 7 |
| 7 | 1 | 2 | 3 | 4 | 5 | 6 |
| 6 | 7 | 1 | 2 | 3 | 4 | 5 |
| 5 | 6 | 7 | 1 | 2 | 3 | 4 |
| 4 | 5 | 6 | 7 | 1 | 2 | 3 |

TABLE VI-continued

| | | | | | | |
|---|---|---|---|---|---|---|
| 3 | 4 | 5 | 6 | 7 | 1 | 2 |
| 2 | 3 | 4 | 5 | 6 | 7 | 1 |
| 1 | 2 | 3 | 4 | 5 | 6 | 7 |
| 7 | 1 | 2 | 3 | 4 | 5 | 6 |
| 6 | 7 | 1 | 2 | 3 | 4 | 5 |
| 5 | 6 | 7 | 1 | 2 | 3 | 4 |

(b)

| 8 | 9 | 10 | 11 | 12 | 13 | 14 |
|---|---|---|---|---|---|---|
| 3P347 | D595 | D1239 | D1883 | D2319 | D2963 | D3607 |
| D3630 | 3P370 | D618 | D1262 | D1908 | D2342 | D2986 |
| D3009 | D3653 | ID1 | D641 | D1285 | D1929 | D2365 |
| D2388 | D3032 | D3676 | D20 | D664 | D1308 | D1952 |
| D1975 | D2411 | D3055 | D3699 | D43 | D687 | D1331 |
| D1354 | D1998 | D2434 | D3078 | D3722 | D66 | D710 |
| D733 | D1377 | D2021 | D2457 | D3101 | D3745 | D89 |
| D112 | D756 | D1400 | D2044 | D2480 | D3124 | D3768 |
| D3791 | D135 | D779 | D1423 | 3P15 | D2503 | D3147 |
| D3170 | D3814 | D158 | D802 | D1446 | 3P38 | D2526 |
| D2549 | D3193 | D3837 | D181 | D825 | D1469 | 3P61 |
| 3P84 | D2572 | D3216 | D3860 | D204 | D848 | D1492 |
| D1515 | 3P107 | D2595 | D3239 | D3883 | D227 | D871 |
| D894 | D1538 | 3P130 | D2618 | D3262 | D3906 | D250 |
| D273 | D917 | D1561 | 3P163 | D2641 | D3285 | D3929 |
| D3952 | D296 | D940 | D1584 | 3P176 | D2664 | D3308 |
| D3331 | D3975 | D319 | D963 | D1607 | Res3 | D2687 |
| D2710 | D3354 | D3998 | D342 | D986 | D1630 | D2066 |
| D2089 | D2733 | D3377 | D4021 | D365 | D1009 | D1653 |
| D1676 | D2112 | D2756 | D3400 | D4044 | D388 | D1032 |

TABLE VI-continued

| | | | | | | |
|---|---|---|---|---|---|---|
| D1055 | D1699 | D2136 | D2779 | D3423 | D4067 | D411 |
| D434 | D1078 | D1722 | D2158 | D2802 | D3446 | D4090 |
| 3P209 | D457 | D1101 | D1745 | D2181 | D2825 | D3469 |
| D3492 | 3P232 | D480 | D1124 | D1768 | D2204 | D2848 |
| D2871 | D3515 | 3P255 | D503 | D1147 | D1791 | D2227 |
| D2250 | D2894 | D3538 | 3P278 | D526 | D1170 | D1814 |
| D1837 | D2273 | D2917 | D3561 | 3P301 | D549 | D1193 |
| D1216 | D1660 | D2296 | D2940 | D3584 | 3P324 | D572 |
| 1P2-1 | 1P30-1 | 1P58-1 | 1P86-1 | 1P114-1 | 1P142-1 | 1P170-1 |
| 1P170-2 | 1P2-2 | 1P30-2 | 1P58-2 | 1P86-2 | 1P114-2 | 1P142-2 |
| 1P142-3 | 1P170-3 | 1P2-3 | 1P30-3 | 1P58-3 | 1P86-3 | 1P114-3 |
| 1P114-4 | 1P142-4 | 1P170-4 | 1P2-4 | 1P30-4 | 1P58-4 | 1P86-4 |

(a) Illustration of the seven-fold cyclic column interleaving of seven consecutive 32-byte C1 codewords that are identified as codewords No. 1 through No. 7 (each of the bytes of codeword No. 1 is labeled as a ‘1’, each byte of word No. 2 is labeled as a ‘2’, etc., and the 32 bytes of codeword No. 1 are shaded);
(b) the seven consecutive C1 codewords that reside in columns 8 through 14 in Table Va after seven-fold cyclic column interleaving (the 32 bytes of the codeword shown as column 11 of Table Va, i.e., C1 codeword No. 86, are shaded).

| Reference Number List |
|---|
| 10 Processor |
| 12 Display |
| 14 I/O device |
| 16 CD drive |
| 18 Compact disc |
| 32 C2 word byte |
| 34 C1 word |
| 36 data flow direction |
| 50 Decoder |
| 52,152,154 RAM |
| 54 Demodulator |
| 56 Internal processor |
| 58 C1 decoder |
| 60 C2 decoder |
| 68 Rectangular product code |
| 70 Column codewords |
| 72 Row codewords |
| 80 Non-interleaved product code |
| 82,84 Interleaved product codes |
| 88 Sector |
| 90 Header |
| 92 Preamble |
| 94 Data/ECC parity |
| 96 Buffer |
| 98 Logica1 Sector |
| 102,108 User data |
| 104,110 Parity |
| 106 System data |
| 112–116 Read steps |
| 118–128 Write steps |

-continued

| Reference Number List |
|---|
| 148 Disable generator |
| 150 CD-DASD decoder |
| 156 Address/translator controller |
| 160,162,180 Interleave diagram array |
| 170 Write capture circuit |
| 172 Write discriminator |
| 174 Write selector |
| 176 Row address discriminator |
| 178 Write frame detector |
| 182,184 Memory map |
| 190 Tracking circuit |
| 192,194 Programmable divider |
| 196 Phase-lock-loop circuit |
| 198 Calibration table |

What is claimed is:

1. A compact disc, comprising:

a compact disc storage media; and data stored on said media with a compact disc encoding and physical marking in a direct access storage device format comprising independently addressable sectors, wherein said disc is preformatted with sector headers which are produced separately and prior to any subsequent writing of information onto the disc using a CD-DASD drive.

2. A disc as recited in claim 1, wherein said data comprises user data encoded in a rectangular product code.

3. A disc as recited in claim 2, wherein said product code comprises C1 and C2 Reed-Solomon codes.

4. A disc as recited in claim 2, wherein the rectangular product code is interleaved at an interleave depth.

5. A disc as recited in claim 2, wherein user defined data includes bytes usable for one of additional error correction, synchronization, sector addresses, sector boundary location, sector mode type and disc type.

6. A disc as recited in claim 2, wherein all symbols of the code are stored contiguously within a single sector on said disc.

7. A disc as recited in claim 2, wherein the user data includes a preamble, a buffer, user defined data and parity.

8. A disc as recited in claim 7, wherein sectors are spliced together in the buffer.

9. A disc as recited in claim 1, wherein said format includes an eight-to-fourteen modulation.

10. A disc as recited in claim 1, wherein said format includes control and display data.

11. A disc as recited in claim 1, wherein the data contained in the sector headers is one of directly accessible upon reading of the disc and optionally accessible after only C1 decoding in performed.

12. A disc as recited in claim 1, wherein said format includes eight-to-fourteen modulation and the headers include interleaving of header data and zero value bytes within eight-to-fourteen modulation frames of the headers.

13. A disc as recited in claim 1, wherein the headers end with a mark and are followed by a preamble with a space bit sequence.

14. A disc as recited in claim 13, wherein the space bit sequence comprises eleven bits.

15. A disc as recited in claim 1, wherein the headers include a cyclic permutation of a variable frequency oscillator signal yielding a minimum digital sum variation channel data stream.

16. A disc as recited in claim 1, wherein said data is logically mapped between the compact disc encoding and marking and the direct access storage device format.

17. A disc as recited in claim 1, wherein a direct access storage device operating system process can access said data.

18. A disc as recited in claim 1, wherein said format includes a header area having eight-to-fourteen modulation frames and header data is repetitively encoded in separate C1 codewords each written in separate ones of the eight-to-fourteen modulation frames of the header area.

19. A disc as recited in claim 1, wherein each header on the disc is written with constant offset relative to synchronization bits of codewords of absolute time in a pregroove information stream encoded in a wobble pregroove of an unwritten compact disc.

20. A disc as recited in claim 19, further comprising a disc substrate having a spiral pregroove, wherein the headers on the disc are formed by molding, or embossing, pits and intervening land areas at regular length intervals along the spiral pregroove of the disc substrate.

21. A disc as recited in claim 1, wherein further comprising a header area storing plural instances of data which is read using a majority logic voting process.

22. A compact disc comprising:

a compact disc storage media; and data stored on said media with a compact disc encoding and physical marking in a direct access storage device format comprising independently addressable sectors, wherein the data includes information stored in a preamble, such information being one of directly accessible upon reading the disc and optionally accessible after only C1 decoding is performed.

23. A disc as recited in claim 22, wherein the preamble includes a gap.

24. A disc as recited in claim 22, wherein the preamble includes a virtual field adapted to allow recording of eight-to-fourteen modulation frames of constant size.

25. A disc as recited in claim 22, wherein said disc includes a data synchronization field, wherein the relationship between the recovered instance of the data synchronization field and a replica of the data synchronization field which is stored in a register in a drive indicates the synchronization quality of the data recovered from the disc.

26. A compact disc, comprising:

a compact disc storage media; and data stored on said media with a compact disc encoding and physical marking in a direct access storage device format comprising independently addressable sectors, wherein said format includes sectors with a prerecorded header area, a preamble area, a data area including address/identification data, user defined data and reserved bytes together with corresponding parity data, and a buffer area.

27. A disc as recited in claim 26, wherein each of said sectors are recoverable distinctly from reading/writing any other of the sectors.

28. A compact disc, comprising:

a compact disc storage media; and data stored on said media with a compact disc encoding and physical marking in a direct access storage device format comprising independently addressable sectors, wherein said data is recorded, using eight-to-fourteen modulation, as a succession of eight-to-fourteen modulation frames which each include the eight-to-fourteen modulation representation of a Compact Disc control and display byte.

29. A disc as recited in claim 28, wherein said eight-to-fourteen modulation frames include an eight-to-fourteen modulation channel bit synchronization field.

30. A method of writing data to a compact disc, comprising:

forming a rectangular product code using the data producing encoded data; and writing the encoded data into contiguous locations on the compact disc in a single sector of plural independently addressable sectors of the disc.

31. A method as recited in claim 30, wherein said forming comprises:

encoding the data into Reed-Solomon C2 codewords;

forming a rectangular array of the C2 codewords; and encoding the rectangular array into Reed-Solomon C1 codewords.

32. A method as recited in claim 31, said forming further comprising:

adding control and display information to the rectangular array C1 codewords; and concatenating seven product codewords.

33. A method as recited in claim 32, further comprising interleaving the product code words at a depth of interleave.

34. An apparatus for writing data to a compact disc, comprising:

a system forming a rectangular product code; and a compact disc writer writing the product code into contiguous locations of a disc sector among a plurality of independently addressable sectors of the disc, wherein said disc is preformatted with sector headers which are produced separately and prior to any subsequent writing of information onto the disc using a CD-DASD drive.

35. An apparatus, comprising:

a CD cross interleaved Reed Solomon decoder including a demodulator demodulating eight-to-fourteen modulated channel data read from a compact disc, a Reed-Solomon C1 decoder and a Reed-Solomon C2 decoder;

a memory storing data transferred between the demodulator, the C1 decoder and the C2 decoder; and an address translator remapping storage and retrieval addresses enabling a rectangular C1/C2 product code that is contiguously written on the disc to be decoded by the C1 and C2 decoders when only the information comprising the rectangular product codeword currently being decoded has been read from the disc.

36. An apparatus as recited in claim 35, wherein said remapping performs reorganization of a data sequence read from the disc into C1 and C2 code words at the input of the C1 and C2 decoders.

37. A method of reading data from a compact disc, comprising:

demodulating the data from the disc;

storing the data in a memory in data-0 out locations;

retrieving the data from data-1 in locations in the memory;

Reed-Solomon C1 decoding the data from the memory;

storing the data that has been C1-decoded in the memory in data-1 out locations;

retrieving the data that has been C1 decoded from data-2 in locations in the memory; and Reed-Solomon C2 decoding the data retrieved from the data-2 in locations.

38. A computer system, comprising:

a computer requesting a direct access storage device data transfer; and a compact disc system performing the direct access storage device transfer using a CD storage format by independently addressing disc sectors, wherein said disc is preformatted with sector headers which are produced separately and prior to any subsequent writing of information onto the disc using a CD-DASD drive.

39. A compact disc, comprising:

a storage media; and data stored on the media in a direct access storage device compact disc encoding, modulation and physical marking format comprising independently addressable sectors, wherein said disc is preformatted with sector headers which are produced separately and prior to any subsequent writing of information onto the disc using a CD-DASD drive.

40. A compact disc, comprising:

a storage media; and data stored on the media in a direct access storage device—compact disc (CD-DASD) format comprising independently addressable sectors, wherein said disc is preformatted with sector headers which are produced separately and prior to any subsequent writing of information onto the disc using a CD-DASD drive.

41. A compact disc system, comprising:

a compact disc storage media;

a compact disc writer forming independently addressable, constant size, contiguously stored sectors on said media, each sector including a header, a preamble with a virtual gap, user specifiable data and a buffer, the users data including an address, variable data, parity and system data, with adjacent sectors spliced together in the buffer, the user data being encoded into rectangular product codes using C1 and C2 codes with the codes being interleaved at an interleave depth, the media having control and display information and eight-to-fourteen modulation of frames; and a compact disc reader including a CD CIRC (Cross Interleaved Reed Solomon Code) decoder and an address translator outputting the user data of said media, wherein said disc is preformatted with the sector headers which are produced separately and prior to any subsequent writing of information onto the disc using a CD-DASD drive.

42. A system, comprising:

a computer initiating a direct access storage device request; and a compact disc drive connected to said computer, receiving the request and including a C1/C2 decoder, said drive accessing a compact disc, decoding contents of the disc using the decoder and providing decoded contents to said computer, the disc comprising data formatted using eight-to-fourteen modulation frames including control and display information, the data being divided into individually addressable sectors, each sector comprising a header, a preamble with a virtual gap, user specifiable data, parity and a buffer, with adjacent sectors spliced together in the buffer, each sector being parsed into logical sub-blocks encoded into contiguously stored, interleaved, C1/C2 rectangular product codes, the header comprising header data interleaved with zero value bytes, the header ending with a mark, and the preamble starting with an eleven bit space sequence.

43. A compact disc, comprising:

a compact disc storage media; and data stored on said media with a compact disc encoding and physical marking in a direct access storage device format comprising independently addressable sectors, wherein said data is recorded, using eight-to-fourteen modulation, as a succession of eight-to-fourteen modulation frames which each include the eight-to-fourteen modulation representation of a Compact Disc control and display byte.

44. An apparatus for writing data to a compact disc, comprising:

a system forming a rectangular product code; and a compact disc writer writing the product code into contiguous locations of a disc sector among a plurality of independently addressable sectors of the disc, wherein data is recorded, using eight-to-fourteen modulation, as a succession of eight-to-fourteen modulation frames which each include the eight-to-fourteen modulation representation of a Compact Disc control and display byte.

45. A computer system, comprising:

a computer requesting a direct access storage device data transfer; and a compact disc system performing the direct access storage device transfer using a CD storage format by independently addressing disc sectors, wherein data is recorded, using eight-to-fourteen modulation, as a succession of eight-to-fourteen modulation frames which each include the eight-to-fourteen modulation representation of a Compact Disc control and display byte.

46. A compact disc, comprising:

a storage media; and data stored on the media in a direct access storage device compact disc encoding, modulation and physical marking format comprising independently addressable sectors, wherein said data is recorded, using eight-to-fourteen modulation, as a succession of eight-to-fourteen modulation frames which each include the eight-to-fourteen modulation representation of a Compact Disc control and display byte.

47. A compact disc, comprising:

a storage media; and data stored on the media in a direct access storage device—compact disc (CD-DASD) format comprising independently addressable sectors, wherein said data is recorded, using eight-to-fourteen modulation, as a succession of eight-to-fourteen modulation frames which each include the eight-to-fourteen modulation representation of a Compact Disc control and display byte.

48. A compact disc system, comprising:

a compact disc storage media;

a compact disc writer forming independently addressable, constant size, contiguously stored sectors on said media, each sector including a header, a preamble with a virtual gap, user specifiable data and a buffer, the users data including an address, variable data, parity and system data, with adjacent sectors spliced together in the buffer, the user data being encoded into rectangular product codes using C1 and C2 codes with the codes being interleaved at an interleave depth; and a compact disc reader including a CD CIRC (Cross Interleaved Reed Solomon Code) decoder and an address translator outputting the user data of said media, wherein said data is recorded, using eight-to-fourteen modulation, as a succession of eight-to-fourteen modulation frames which each include the eight-to-fourteen modulation representation of a Compact Disc control and display byte.

* * * * *